United States Patent [19]

Rengarajan et al.

[11] Patent Number: 5,414,840
[45] Date of Patent: May 9, 1995

[54] METHOD AND SYSTEM FOR DECREASING RECOVERY TIME FOR FAILED ATOMIC TRANSACTIONS BY KEEPING COPIES OF ALTERED CONTROL STRUCTURES IN MAIN MEMORY

[75] Inventors: T. K. Rengarajan; Peter Spiro, both of Nashua, N.H.; Anath Raghavan, San Francisco, Calif.; David B. Lomet, Westford, Mass.

[73] Assignee: Digital Equipment Corporation, Maynard, Mass.

[21] Appl. No.: 905,555

[22] Filed: Jun. 25, 1992

[51] Int. Cl.$^6$ ............... G06F 15/40; G06F 11/00
[52] U.S. Cl. ............... 395/600; 395/650; 364/DIG. 1; 364/281.3; 364/281.4; 364/281.7; 364/281.9
[58] Field of Search ............... 395/600, 650, 575, 425

[56] References Cited

U.S. PATENT DOCUMENTS

| 4,847,754 | 7/1989 | Obermark et al. | 395/600 |
| 5,043,871 | 8/1991 | Nishigaki et al. | 395/600 |
| 5,317,731 | 5/1994 | Dias et al. | 395/600 |

OTHER PUBLICATIONS

Tanenbaum, A., "Operating Systems: Design & Implementation", 1987, pp. 53–67.
"Using Write Protected Data Structures to Improve Software Fault Tolerance in Highly Available Database Management Systems", Sullivan, M. et al., *Proc. VLDB Conf.*, Barcelona, Spain, pp. 171–180 (Sep. 1991).
"The Recovery Box: Using Stable Memory for Fast Recovery of Distributed State", Baker, M. et al., *Presentation at the U.S. Berkeley XPRS Retreat*, (Jan. 1992).
"A Program Structure for Error Detection and Recovery", Horning, J. J., et al., *Lecture Notes in Computer Science* 16, pp. 177–193, Springer–Verlag (1974).
"Process Structuring, Synchronization, and Recovery Using Atomic Actions", Lomet, D. B., *ACM Sigplan Notices* 12, 3, pp. 128–137 (Mar. 1977).
"Aries: A Transaction Recovery Method Supporting Fine–Granularity Locking and Partial Rollbacks using Write–Ahead Logging", Mohan, C. et al., *IBM Research Report RJ* 6649, (Nov. 1990).
"Principles of Transaction-Oriented Database Recovery", Haerder, T. et al., *ACM Computing Surveys*, 15(4):287–317 (Dec. 1983).
"Reliability Issues in Computing System Design", Randell, B., et al., *ACM Computing Surveys*, 10(2):123–165 (Jun. 1978).

Primary Examiner—Thomas G. Black
Assistant Examiner—John C. Loomis
Attorney, Agent, or Firm—Hamilton, Brook, Smith & Reynolds

[57] ABSTRACT

Fast recovery from process terminations during atomic database transactions is accomplished by maintaining global memory after process terminations. Database data stored in global memory is accessed through control data structures. Control data structures are updated within atomic transactions that maintain structure consistency. Should a process fail during an atomic transaction that is updating control data structures, consistency is maintained by recovering the control data structures to their initial state existing immediately prior to the atomic transaction. Transactions involving control data structures are journaled as before-images in a log located in global memory. After a process failure, the before-images are installed to return the control data structures to the consistent state existing before the process failure.

20 Claims, 56 Drawing Sheets

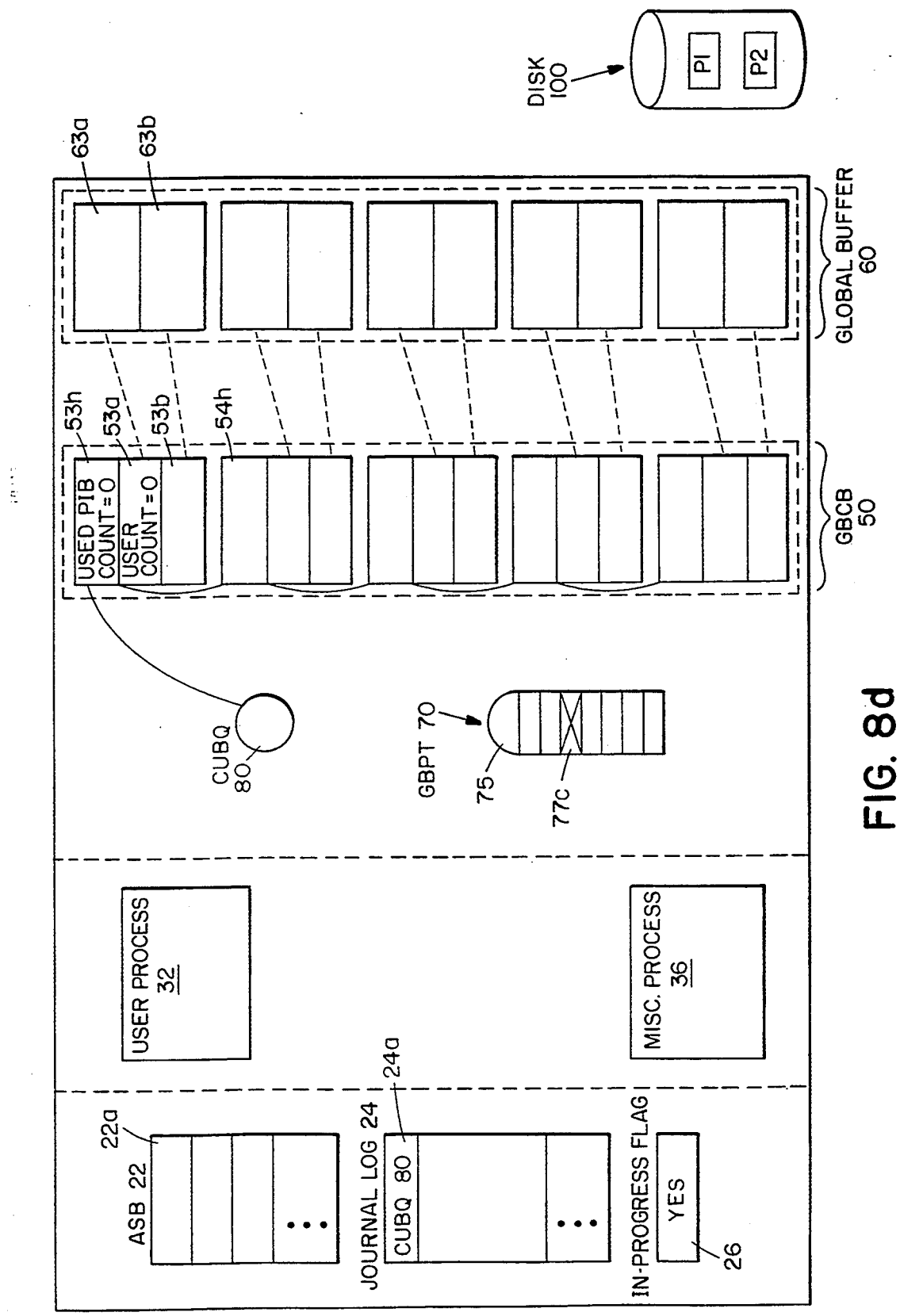

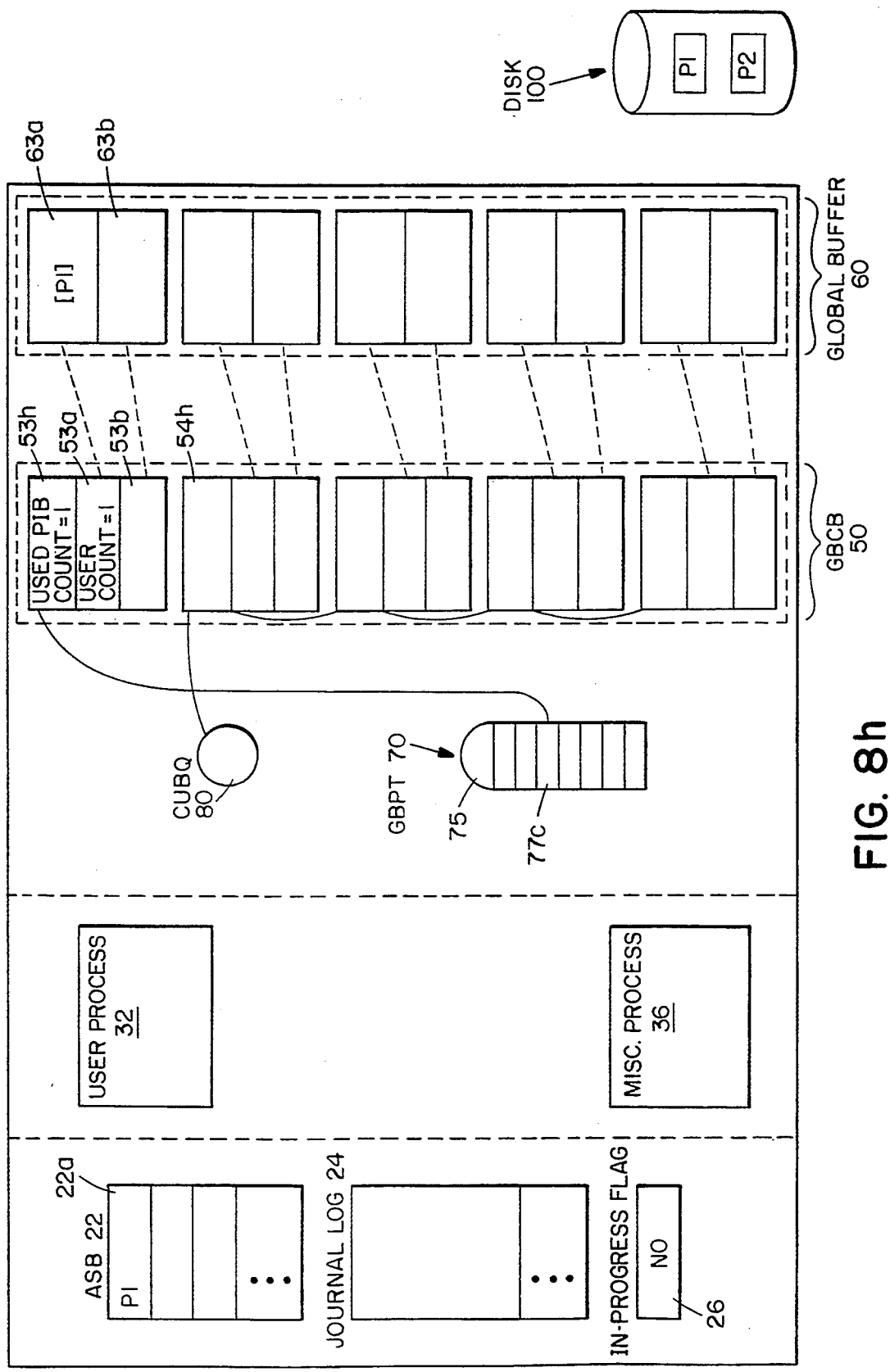

METHOD AND SYSTEM FOR DECREASING RECOVERY TIME FOR FAILED ATOMIC TRANSACTIONS BY KEEPING COPIES OF ALTERED CONTROL STRUCTURES IN MAIN MEMORY

BACKGROUND OF THE INVENTION

A common computer task is to perform operations on a disk-based database. These operations involve moving data from the database on disk into computer memory. While in the computer memory, a user will modify the data. Ideally, the modified data is written back into the database on disk. However, to minimize input/output (I/O) operations to disk, recently used pages or other partitions of data may be retained in buffers within computer memory.

FIG. 1a is a schematic block diagram of a computer using process local buffers that is typical of the prior art. In volatile memory 10 there are a number of user processes 32. To update data from the database 110 on disk 100, each user process 32 in the local process space 30 reads data from disk 100 into an unused local buffer 33a,33b. There is one Buffer Control Block (BCB) 31a,31b for each local buffer 33a,33b. The Buffer Control Blocks 31 act as proxies for the respective local buffers 33. The Buffer Control Blocks 31 contain information about the local buffers 33 and act as pointers to the local buffers 33. Once the data has been modified in the local buffer, the data can be written back to the database 110.

The normal performance of the local buffer approach where each user processes has its own buffer pool and manages them independently has certain disadvantages. Unnecessary database file reads are incurred because each process must read in all the pages it needs even though the same page may have been read by some other process on the same node. The additional reads and writes to disk waste I/O bandwidth. In addition, the use of local memory to hold multiple copies of data wastes memory.

It is desirable to share data in global buffer memory between user processes. One approach is to use a separate buffer manager process. All user requests for data from disk are executed by the buffer manager, instead of the requesting process. The buffer manager thus single threads the buffer operations and serializes all disk I/O operations for one database. The data is stored in the local address space of the buffer manager process. The data is thus centrally located and available to user processes.

FIG. 1b is a schematic block diagram of a computer using a buffer manager that is typical of the prior art. In memory 10 there are user processes 32 which are running concurrently. The user processes 32 do not access the database 110 directly. Also in the local process space 30, there is a buffer manager process 38, containing software instructions 37. In contrast to the local buffers of FIG. 1a, the buffer manager process 38 handles all database-related disk I/O so pages in buffers 39 can be shared by multiple users.

Although the buffer manager process 38 may reduce the amount of disk I/O and may reduce the number of duplicate copies of data in memory, the buffer manager process 38 introduces extra instruction overhead. In particular, the communication between processes is costly in terms of performance. In addition, a failure of the buffer manager process 38, unlike a failure of a user process of FIG. 1a, causes a loss of all database buffers 39.

SUMMARY OF THE INVENTION

Another buffer approach to which the present invention is directed is to store the database data in shared or global buffer memory which may be accessed directly by each user process. Access to the data in memory is through a control data structure which may include global buffer control blocks. As a user updates the database data, the control data structure changes. Unfortunately, the user process may fail before all updates are reflected in shared memory, and when a memory update is only partially completed, the control data structure may be inconsistent with the state of the database. The control data structure is thus unreliable to all users of the buffer.

To avoid a data inconsistency problem, a database system may use privileged software that is part of the operating system to insure that user processes do not terminate while executing instructions in critical regions, such as database updates. The operating system would thus prevent process deletion while a processor is executing critical regions of code. A disadvantage of that approach is the increased overhead due to system service calls.

Traditionally, when a database system fails, system recovery involves discarding the residual state of main memory and rebuilding the system state from data that has been stored in a stable state on disk. Thus, the contents of any database buffers in memory are lost. Such a situation occurs even when there has been no power failure and the volatile main memory control data structures continue to exist. A major reason for this traditional strategy has been that failure of a database system can leave the system in the midst of a state transition, where main memory control data structures are inconsistent. The traditional approach to solving the problem by rebuilding the system state wastes database recovery time though costly I/O operations.

The present invention is directed to solving the problem of maintaining the consistency of the control data structure in memory. Some data have interrelationships with other data in operations such that when one data item changes other data items must change as well. A partial change will leave the data in an inconsistent state. Therefore, either all changes must succeed or none of the changes should occur. In accordance with this invention, operation sequences which must be completed to obtain consistent state transitions are designated as atomic transactions. It is a goal of the present invention to improve database recovery performance by recovering global memory after a failed atomic transaction. The invention preserves system availability even when processes terminate during updates of control data structures. Instead of shutting down a buffer system to restore global data consistency, the invention rolls back transactions in control data structures.

The invention permits fast recovery from premature process terminations by maintaining an in-memory before-image log of each in-progress atomic transaction event operating on buffer control data structures. The system records the before-image of a control data structure to be changed in the log. Upon a process failure, these before images are installed to return the control data structures to a consistent state. Thus, the invention reconstructs the control data structures to the state before the failed atomic transaction began.

The method of the invention manages a database system in a computer. The computer has multiple processes, nonvolatile storage accessed by the multiple processes, and buffer memory shared by the multiple processes for local access to data partitions such as pages retrieved from nonvolatile storage. Each process accessing data partitions from nonvolatile storage (e.g., disk) modifies control data structures through modification transactions. Control data structure images existing prior to a modification transaction are stored in a log. The log maintains a stored image until completion of an atomic modification transaction. If an atomic modification transaction is terminated prior to completion, the control data structures are returned to states determined by the images stored in the log.

Preferably, a process that intends to modify global data controlled by the control data structures first uses an in-progress flag located in global memory to indicate that the process is beginning an atomic modification transaction. The process then obtains a lock on control data structures to be modified. This lock prevents other processes from obtaining a concurrent lock to update the same control data structure. One lock may affect more than one section of the control data structure. The process then writes the control data structure to a journal block in a journal log located in global memory. The process then updates the control data structure by changing the data in the control data structure or changing the organization of the control data structure. Once the update to the control data structure is complete, the process uses the in-progress flag in global memory to indicate the commitment of the atomic modification transaction. Finally, the process unlocks the control data structure to release the data structure for use by other processes.

While the in-progress flag in global memory indicates that a atomic modification transaction is in progress, the control data structures locked by the process may be in an inconsistent state. If the process fails to complete the atomic modification transaction, then the control data structures must be restored to a consistent state. Because the process' failure to complete the atomic modification transaction may be due to a premature termination of the process, a separate database recovery process is used to restore the control data structures to a consistent state.

The database recovery process is created when a process terminates prematurely. The database recovery process reads the in-progress flag in global memory that indicates whether the process had started an atomic modification transaction. If the process had started an atomic modification transaction, then the database recovery process reads the contents of the journal log in reverse order such that the last journal block written to the journal log by the user process is the first journal block read by the database recovery process. After reading each journal block, the database recovery process writes the journal block to the control data structure where the data in the journal block originated. In effect, the database recovery process overwrites any changes made to a control data structure by the user process with the before-image of that control data structure.

The above and other features of the invention including various novel details of construction and combination of parts will now be more particularly described with reference to the accompanying drawings and pointed out in the claims. It will be understood that the particular process embodying the invention is shown by way of illustration only and not as limitation of the invention. The principles and features of this invention may be employed and varied in numerous embodiments without departing from the scope of the invention.

BRIEF DESCRIPTION OF DRAWINGS

FIGS. 8a, 8b, 8c, 8d, 8e, 8f, 8g, 8h and 8i are schematic block diagrams illustrating an example of moving a data page from disk into an allocate set.

FIGS. 13a, 13b, 13c, 13d, 13e, 13f, 13g, 13h, 13i, 13j, 13k, 13l, 13m, 13n and 13o are schematic block diagrams illustrating an example of including a page from disk into an allocate set when the global buffer pool is full.

DETAILED DESCRIPTION OF A PREFERRED EMBODIMENT OF THE INVENTION

In a preferred embodiment, the computer is a Digital Equipment Corporation VAX system computer running under the VAX/VMS operating system. The computer may be clustered with other computers, each such computer forming a node on the cluster. The invention will be described in reference to a single node.

Figure 1A:
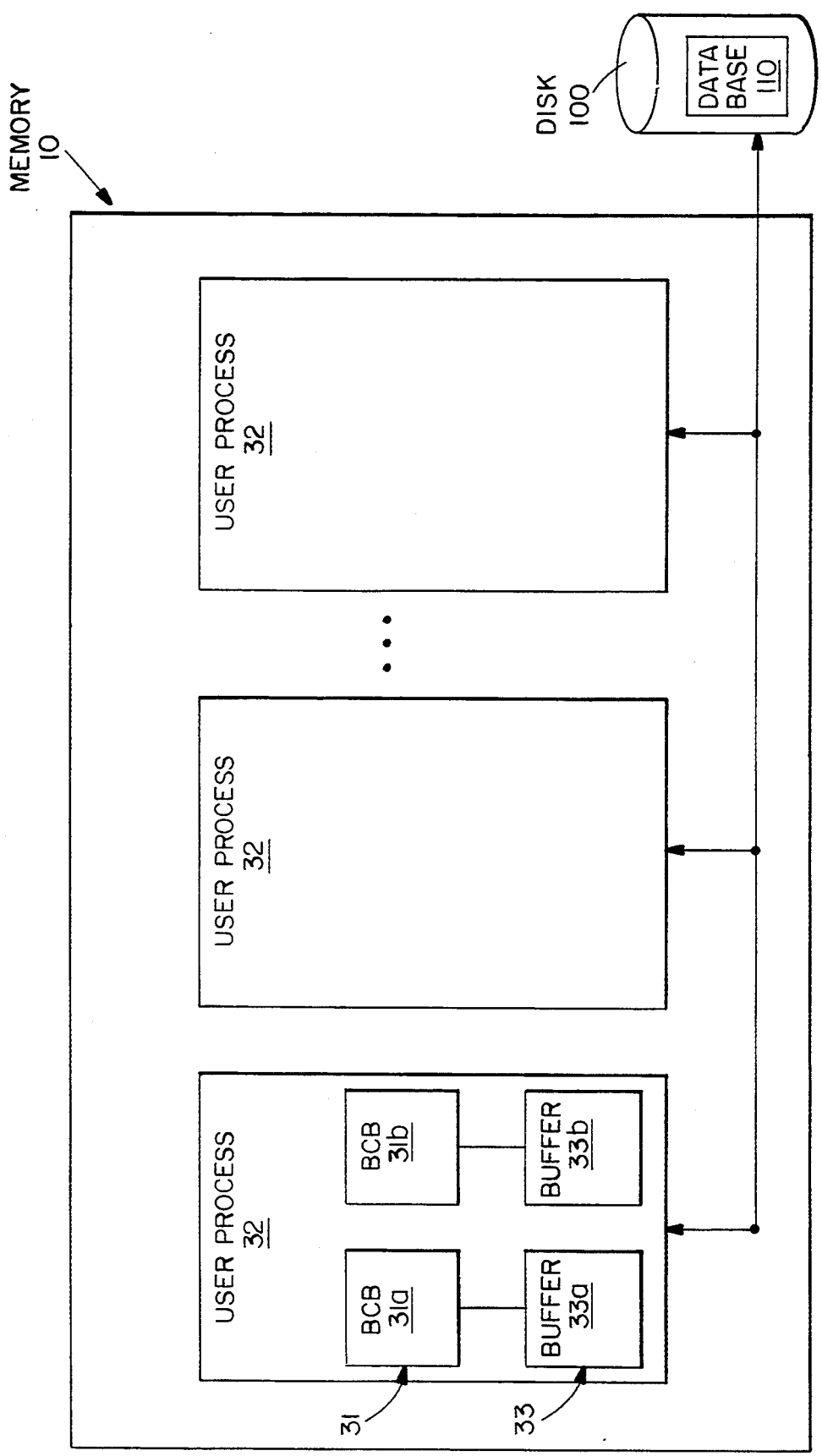
FIG. 1a is a schematic block diagram of a prior art use of local buffers.
Figure 1B:
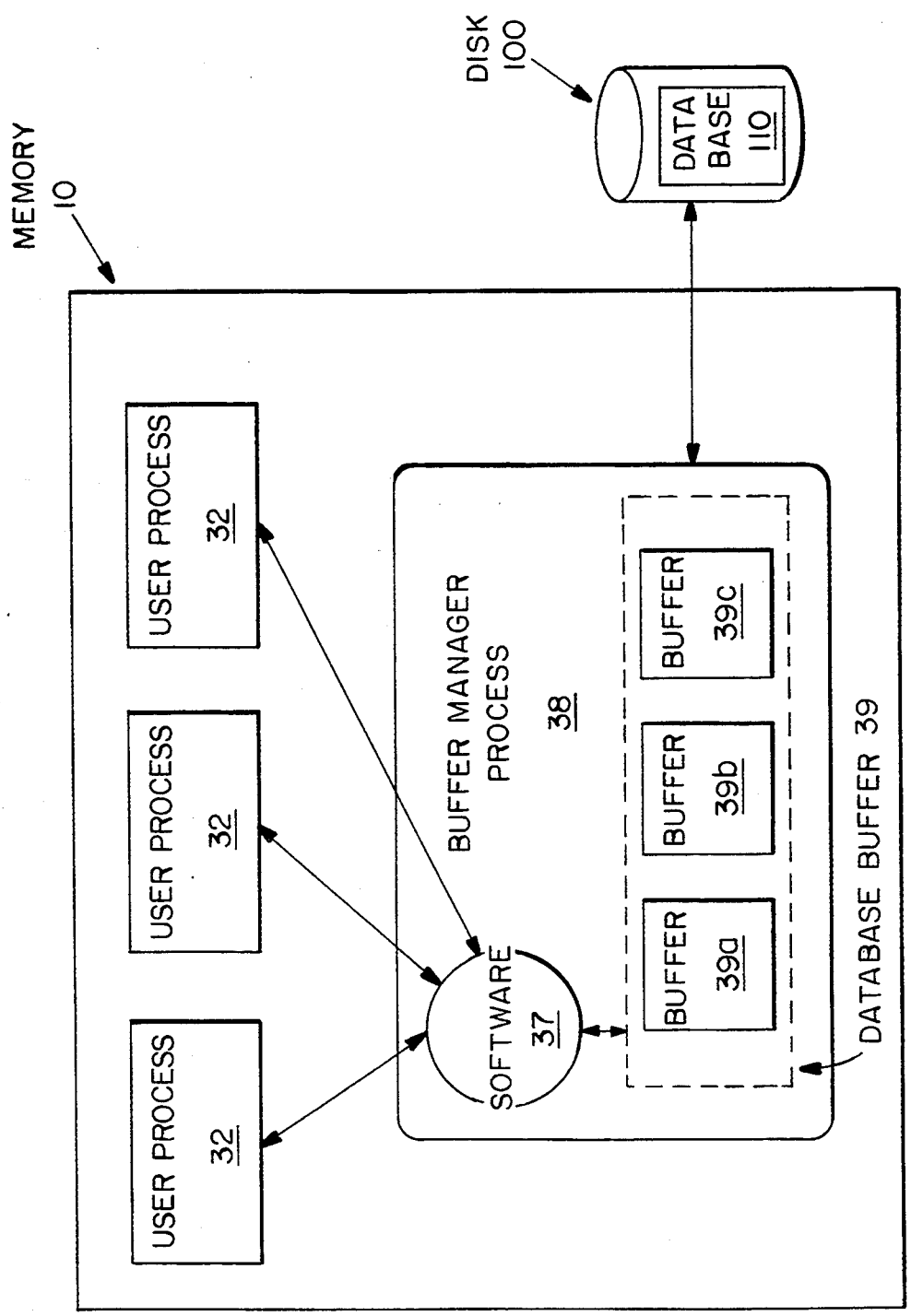
FIG. 1b is a schematic block diagram of a prior art use of a buffer manager process.
Figure 2:
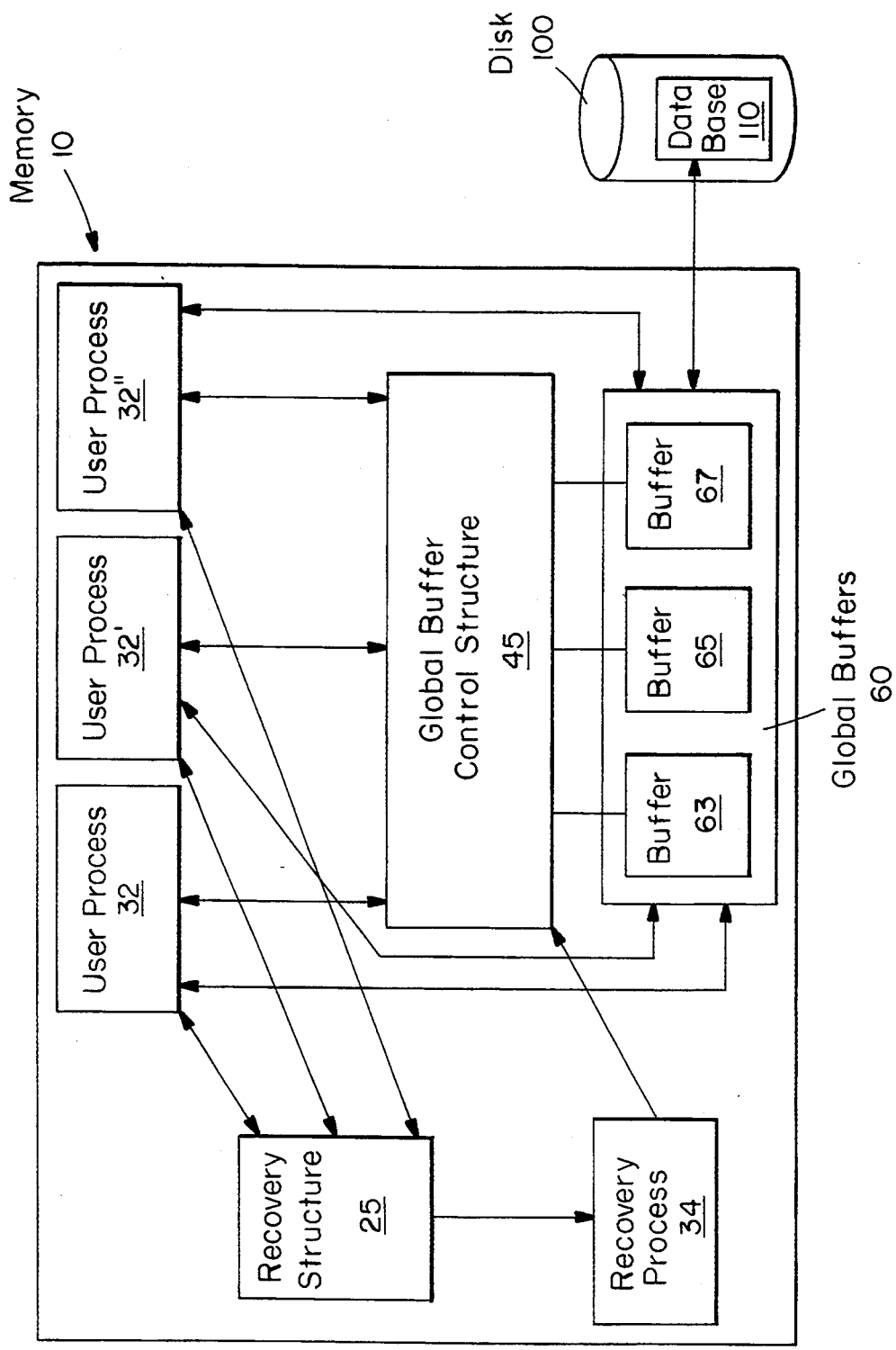
FIG. 2 is a high level schematic block diagram of a preferred embodiment of the present invention.

FIG. 2 is a high level schematic block diagram of the present invention. In memory 10 there are a plurality of user processes 32,32', 32", which are running concurrently. Database data from a database 110 on disk 100 is stored in global buffer pool 60 in memory 10. There may be more than one database in use on the node at any one time. There is one global buffer pool per database per node. For illustration, FIG. 2 shows three buffers 63,65,67, but there may be more or less depending upon the database and other system requirements.

The user processes 32,32',32" access the global buffers 60 using data located in the global buffer control structure 45. The control structure 40 contains information relevant to the state of the data in the global buffers 60. For example, the control structure 45 maintains the physical location of each buffer 63,65,67 in memory 10. The control structure 45 also maintains a count of the number of users using each buffer 63,65,67. The data in the control structure 45 may change as users access data in the global buffers 60.

The user processes 32,32', 32" directly read from and write to the buffers 63,65,67. While a user process operates on data in a buffer, the data in the control structure 45 changes. To allow for recovery, the user processes 32,32', 32" record the prior data in the control structure 45 in a recovery structure 25.

Upon a failure of a user process 32,32', 32", a recovery process 34 reads the failed processes recovery data from the recovery structure 25. The recovery process 34 then writes the recovery data to the control structure 45. The control structure 45 is thereby reconstructed to the prior state as recorded in the recovery structure 25. With the control structure 45 intact, the data held in buffers 63,65,67 remains valid and need not be recovered from disk 100.

Figure 3:
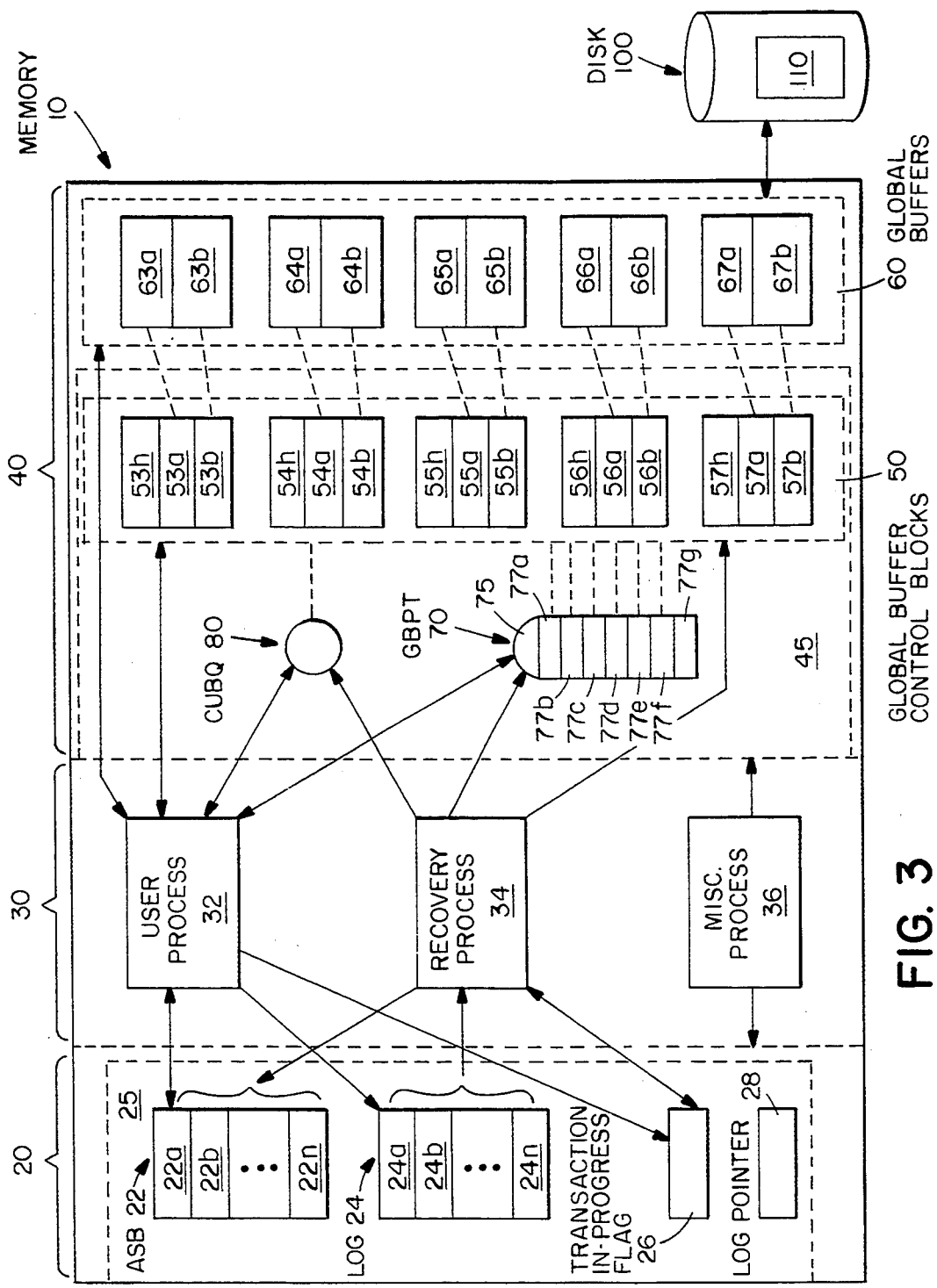
FIG. 3 is a detailed schematic block diagram of a preferred embodiment of the present invention.

FIG. 3 is a detailed schematic block diagram of a computer using the present invention. Computer memory 10 is divided into three primary areas. From available memory 30, memory space is reserved for each process running on the computer. There are three categories of processes that may exist at one time. One category of processes is the user process 32, which can change control data structures. Another category of process is the recovery process 34, which rolls back uncompleted atomic changes made by the user process 32. A third category of processes include all miscellaneous processes 36, which do not affect control data structures. There may be more than one process from each category executing concurrently. For clarity of description, FIG. 3 shows only one process for each category. A process cannot access another process' memory space and any data located in a process' memory space is lost when the process terminates.

Computer memory 10 is referred to as main memory. To allow processes to share data, main memory is divided into two global data sections. In a preferred embodiment, the Temporary Root (TROOT) section 40 contains global data that can be shared between all processes running on the computer. The TROOT section 40 contains control data structures 45 being updated by user processes 32. Also in a preferred embodiment, a process specific global structure section 20 contains process specific global data. Data structures in the process specific global structure section 20 are identifiable to a particular process. Thus, a preferred embodiment places the recovery structure 25 within the process specific global structure section 20. Data in the global data sections 20,40 remains valid upon a process failure. The data in the global data sections 20,40 is only lost when the computer fails or is powered off.

Figure 4:
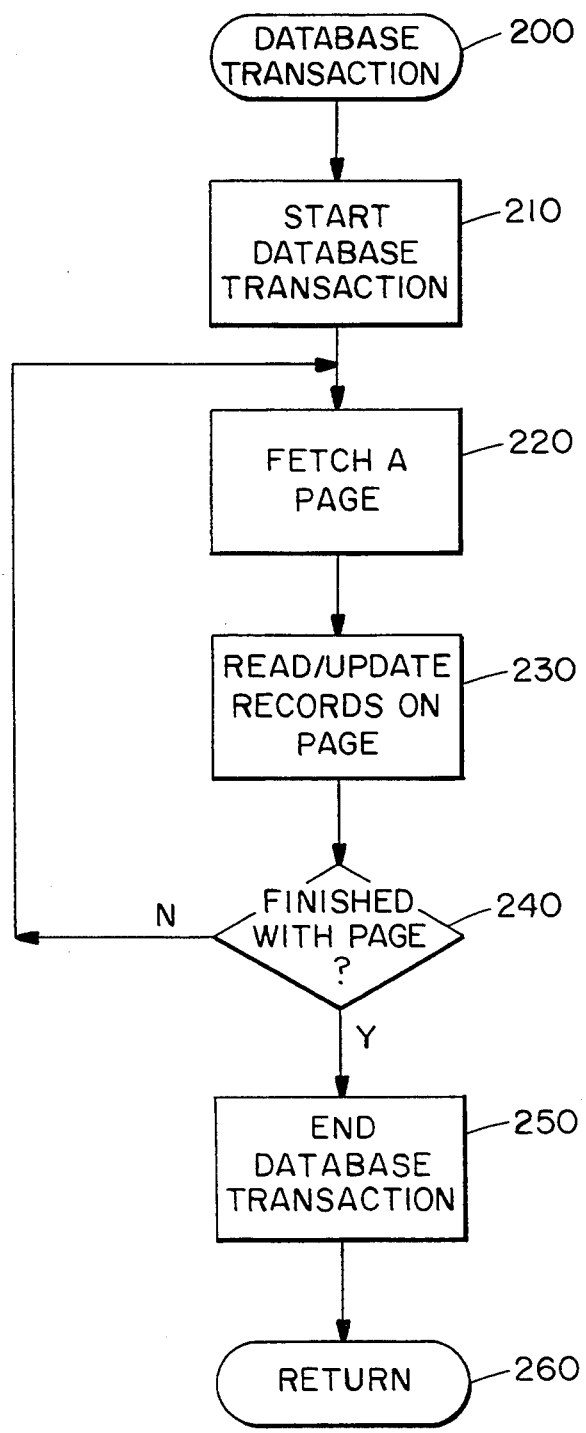
FIG. 4 is a flow chart of a typical database transaction.

Because a database is shared among users, the data from a database 110 is read into main memory 10. FIG. 4 is a flow chart of one view of a typical database transaction 200. First, a database transaction is started 210. After the database transaction is started, the page is fetched 220. The user process 32 then either reads the data from the page or updates data in the page 230. Once the user process 32 is finished using the page 240, the database transaction is ended 250. Ending the database transaction involves committing the changes so that other users can access changed data. The user process 32 then returns 260 to other processing. During a database transaction, there may be a number of page fetches. During a page fetch, a number of atomic modification transactions may occur.

In particular, the data must be read into a global buffer pool 60. When data is retrieved from disk 100, an entire partition of data which includes the requested data is retrieved and stored in a buffer. Thereafter, the computer has rapid access to any other data within the data partition. All user processes 32 on the node share this one global buffer pool 60. Therefore, the global buffer pool 60 is located in the TROOT section 40 of memory 10.

Each buffer in the global buffer pool is sized to store at least one page of data. For simplicity and clarity of description, each buffer in the global buffer pool 60 in FIG. 3 can store two pages. In practice, the particulars of the data will determine the actual size of each data partition, such as pages and buffers. Only one copy of a page exists in memory on one node at a time.

A user process 32 may at any time express an interest in a number of buffers in the global buffer pool 60. A user process 32 uses a buffer if that process 32 uses any pages in that buffer. User processes 32 manage buffers available in the global buffer pool 60 in a cooperative manner. Once a user process 32 expresses an interest in a buffer, that buffer will not be moved from its location in memory and will not be swapped out by another process. The set of buffers in which a certain process 32 is interested is called the allocate set of the process 32.

In general, the global buffer pool 60 acts as an intelligent cache between the allocate set and the area files on disk 100. If a user process 32 looks for a page in the allocate set and finds the page referenced there with the right lock privileges, then the user process 32 already has access to and may use the page in the global buffer pool 60. Only when there is a cache miss in the allocate set does the user process 32 search the global buffer pool 60 for the page. If the page is found in the global buffer pool 60, the user process 32 updates its allocate set to indicate that the user process 32 has access to the subject page. If the page is not found in the global buffer pool 60, the user process 32 fetches the needed page from disk 100. If the allocate set is full, the user process 32 determines which buffer to swap out of the allocate set. If a buffer has to be brought from disk into the global buffer pool 60, the user process 32 selects a global victim to swap out of the global buffer pool 60.

in general, a page first moves from disk 100 to the global buffer pool 60. The page is then included into the allocate sets of different user processes 32 as each process becomes interested in data on that page. The page gets purged from the allocate sets of user processes 32 as the process finishes with that page. While there are no user processes 32 using the buffer (i.e., when the buffer is not in the allocate set of any process), the buffer may be selected as a global victim buffer to be swapped out to disk 100 and replaced by new data read from disk 100. Data swapped out to disk will not be affected by a failure of an atomic transaction.

Figure 5:
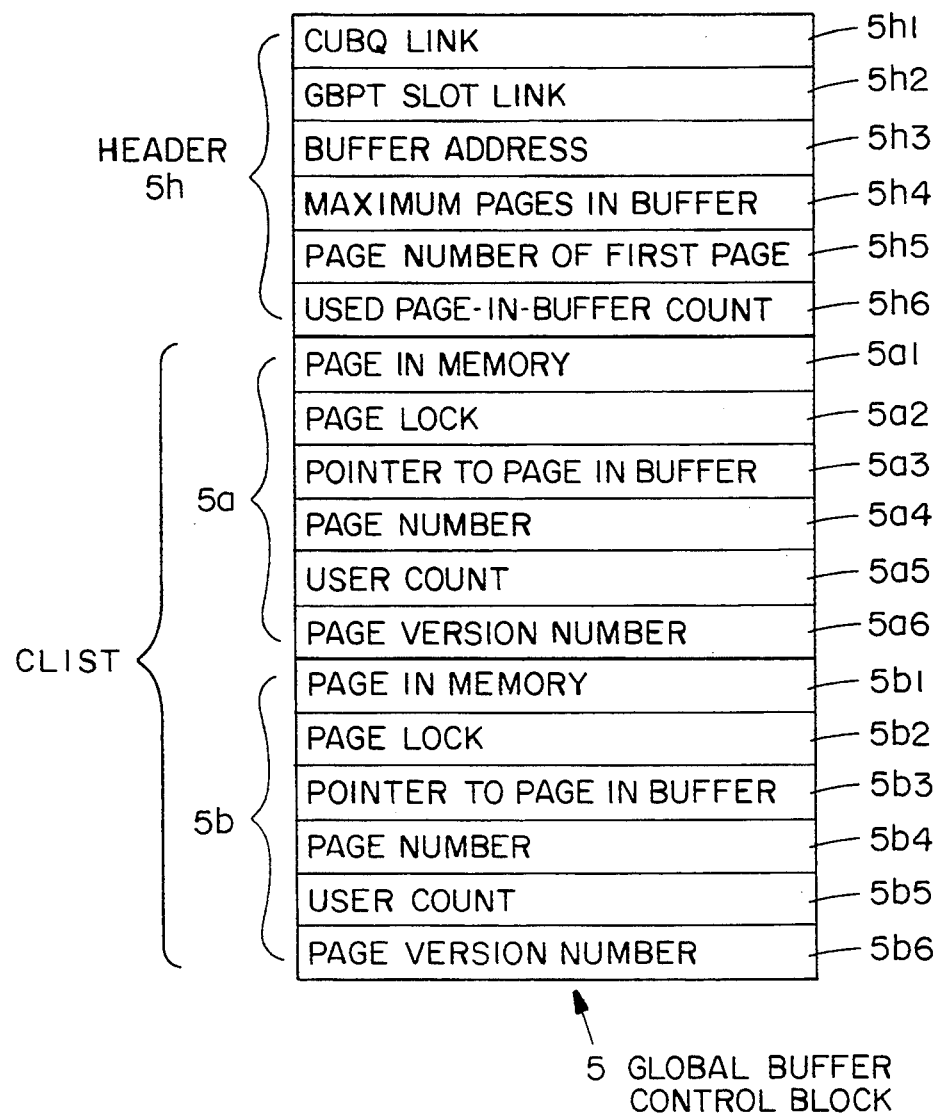
FIG. 5 is a schematic block diagram illustrating the fields of the global buffer control blocks of FIG. 3.

As shown in FIG. 5, a Global Buffer Control Block (GBCB) 5 contains information regarding an associated global buffer. The Global Buffer Control Block header 5h contains information related to the associated buffer as a whole. The Global Buffer Control Block counted list (CLIST) 5a,5b contains information related to the associated pages in the buffer. The Global Buffer Control Block header 5h contains queue link fields 5h1,5h2 for the Candidate Unused Buffer Queue (CUBQ) 80 and the Global Buffer Page Table (GBPT) slot queue 77.

Additional information in the header 5h includes the address of the associated buffer 5h3, the maximum number of pages that the buffer can hold 5h4, the page number of the first page in the buffer 5h5, and the number of pages being used in the buffer 5h6. As illustrated in the example of FIG. 3, there are a maximum of two pages per buffer. Each CLIST entry 5a,5b contains information for a respective page in the buffer. This page information includes a flag indicating whether the page has been read into memory 5a1,5b1. There is also a page lock field 5a2,5b2, a pointer to the page in the buffer 5a3,5b3, an indication of the page number 5a4,5b4, a field indicating the number of users having this page in their allocate set 5a5,5b5, and a page version number field 5a6,5b6.

Because a page and a buffer may be used by many user processes 32 at the same time and, hence, may be in the allocate sets of several user processes 32 at the same time, there are fields in the Global Buffer Control Block header 5h and CLIST 5a,5b to indicate the usage of the buffers and pages at any time. The user count field 5a5,5b5 in the CLIST indicates how many processes are using the page at that time. The used page-in-buffer count field 5h6 in the Global Buffer Control Block indicates how many pages in the buffer are being used by at least one user. If the used page-in-buffer count field 5h6 is zero, then no process is using any of the pages in that buffer. Such a buffer is a candidate for being selected as a global victim to be swapped out. Whenever a user process 32 brings a page into the allocate set, the user process 32 increments the user count field 5a5,5b5 and possibly the used page-in-buffer count field 5h6. Similarly, the user process 32 decrements the user count fields 5a5,5b5 and possibly the used page-in-buffer count field 5h6, when the buffer is purged from the allocate set.

User processes 32 on different nodes update pages as necessary for their transactions. During the course of several transactions, a number of user processes 32 may update the same page many times. The version numbers of the pages are used to maintain cache coherency.

At any time, a user process 32 determines whether to trust the copy of a page in the global buffer pool 60 by comparing version numbers of the page maintained in two places. Every update of a page increments a version number for the page. This version number is not maintained on the page, but rather in the version number field 5a6,5b6 in the CLIST 5a,5b associated with the page. The version number of the page is also maintained in the lock value block 5a2,5b2 for the page. Any time a process updates a page, the version number in the lock value block 5a2,5b2, as well as the version number 5a6,5b6 and data structures associated with the page are incremented.

Whenever a user process 32 fetches a page for update, the process compares the version number found in the lock value block 5a2,5b2 with the version number of the actual page 5a6,5b6 in the global buffer pool 60. If the two version numbers match, then the user process 32 has access to the latest version of the page in the global buffer pool 60. The version number comparison essentially provides a way of invalidating an outdated copy of a page.

The lock value block 5a2,5b2 is only a hint. It may be lost or invalidated under situations like cluster transition and process failure. Whenever the lock value block 5a2,5b2 is lost, the system assumes the copy of the page in the buffer pool 60 is outdated and reads the page from disk 100, which is guaranteed to contain the latest version of the page. This scheme works because user processes 32 have locks on the pages at least in some weak mode while they are referencing the pages. The use of weak mode locks informs the operating system lock manager that there is a process on the node interested in the lock value block 5a2,5b2 for the lock. The lock manager therefore keeps track of the lock value block 5a2,5b2.

The Global Buffer Page Table 70 manages global buffers on the node. The Global Buffer Page Table 70 is a hash structure used to help locate Global Buffer Control Blocks 50. When a user process 32 requires a page, a hash table 75 will hash a particular page request to a the page's corresponding buffer slot 77 in the Global Buffer Page Table 70. The Global Buffer Page Table 70 is an array of buffer slots 77 pointing to Global Buffer Control Blocks 50. That is, each buffer slot 77 is a queue head pointing to a queue of Global Buffer Control Blocks. The hash function for the Global Buffer Page Table 70 hashes all pages in a global buffer to the same buffer slot 77, but a single buffer slot 77 may point to more than one global buffer. A preferred embodiment uses the page number of the first page in the buffer as a reference for all pages in the buffer.

There is one Global Buffer Control Block for each global buffer on the node. In addition to the Global Buffer Page Table 70 queues, the Global Buffer Control Block 50 can be associated with a Candidate Unused Buffer Queue 80. The Candidate Unused Buffer Queue 80 provides a fast way to determine free buffers in the global buffer pool 60 to be swapped out. The Candidate Unused Buffer Queue 80 is guaranteed to contain all buffers that are unused at any time. However, it may also contain buffers that are being used. While a non-empty Global Buffer Control Blocks 50 are always linked to the Global Buffer Page Table 70, they may also be linked to the Candidate Unused Buffer Queue 80. With respect to the Candidate Unused Buffer Queue 80, there are only two states for any Global Buffer Control Block 50: either the Global Buffer Control Block 50 is linked to the Candidate Unused Buffer Queue 80 or the Global Buffer Control Block 50 is not linked to the Candidate Unused Buffer Queue 80.

In a preferred embodiment using VAX/VMS, the same global section may be mapped to different ranges of virtual memory for different users. Thus, all pointers in global memory are adjusted for the differences in starting base addresses of different user processes 32. In other words, all queues in global memory must be self-relative queues. Each user process 32 maintains its starting base address in the process specific global structure section 20.

Consistency of control data structures requires that no two users modify the same Global Buffer Control Block fields at the same time. Also, if two users are interested, at the same time, in reading the same page that is not already in global memory, both user processes 32 must not read the page into different global buffers. To prevent both these problems requires synchronization of access to Global Buffer Control Blocks 50.

Although any intra-node synchronization can be used, a preferred VAX/VMS embodiment's synchronization mechanism uses VMS locks. More specifically, all updates on Global Buffer Control Blocks 50 happen only in the context of an executive mode lock on the buffer slot 77 of the Global Buffer Page Table 70 to which the Global Buffer Control Block 50 hashes. By requiring all pages of a buffer to hash to the same slot, the lock can be obtained on a slot instead of a page. Thus, slot locks reduce the number of locks required in comparison with page locks. Before any update of a Global Buffer Control Block (e.g., incrementing or decrementing user counts on pages), a process obtains the slot lock, performs the update and then releases the lock. In particular, the slot is locked in executive mode. While locked, no other user process can update the Global Buffer Control Block.

With global buffers, it is possible to have a buffer in the global buffer pool 60 that no process is interested in. To guarantee that some user process 32 is holding a lock on every page in the global buffer pool 60 on a node at all times, a preferred embodiment uses the concept of system-owned locks. System-owned locks are locks whose owner is understood to be a node. These locks are not released when processes terminate abnormally. System-owned locks are given up only upon explicit calls or when the node itself terminates or powers down.

In a preferred VAX/VMS embodiment using VMS locks, there are several restrictions on the use of system-owned locks. The system-owned locks should not have process-owned locks as their parents. The system-owned locks should only be in the grant queue of the lock manager and never in wait or conversion queues. Therefore, it is not possible to enqueue a request for a system-owned lock in general. A process can get a system-owned lock only by converting a process-owned granted lock into a system-owned lock in the same mode or weaker mode. However a process can directly request a null mode system page lock because null-mode locks are always grantable. A process only needs to get the system-owned lock once per the life of a page in the global buffer pool 60.

Global Buffer Control Blocks are inserted at the tail of the Candidate Unused Buffer Queue 80 whenever the used page-in-buffer count 5$h$6 becomes zero. This guarantees that all unused buffers are on the Candidate Unused Buffer Queue 80. It does not guarantee that all buffers linked to the Candidate Unused Buffer Queue 80 are actually unused because Global Buffer Control Blocks are not removed by recovery process 34 once inserted onto the Candidate Unused Buffer Queue 80. Indeed, insertions on the Candidate Unused Buffer Queue 80 are not journaled. The insertion is not journaled because the system tolerates used Global Buffer Control Blocks 50 on the Candidate Unused Buffer Queue 80. Whenever a Global Buffer Control Block 50 is needed for buffer replacement, a candidate Global Buffer Control Block 50 is removed from the head of the Candidate Unused Buffer Queue 80 and used if the candidate Global Buffer Control Block 50 is indeed free. If the candidate Global Buffer Control Block 50 is not free, then the Global Buffer Control Block 50 is simply left out of the Candidate Unused Buffer Queue 80. This technique helps to keep used Global Buffer Control Blocks 50 out of the Candidate Unused Buffer Queue 80 and thus makes the Candidate Unused Buffer Queue 80 a good hint to search for unused buffers.

The rules that represent consistency of the control data structures are as follows:

1. The number of users of a page in the global buffer is guaranteed to be accurate. In addition all the processes owning a page in the buffer are active.

2. All unused Global Buffer Control Blocks 50 are guaranteed to be on the Candidate Unused Buffer Queue 80.

3. All non-empty Global Buffer Control Blocks 50 are linked onto the Global Buffer Page Table 70 at all times, except during Global Buffer Control Block movement between Global Buffer Page Table Slots 77.

4. Every non-empty page in the global buffer pool 60 is guaranteed to be locked at all times.

During operations of bringing a page into the allocate set and purging a page from the allocate set of a user process 32, the control data structures are modified to leave them in a consistent state after the operation. The operations of bringing the page into the allocate set and purging a page from allocate set involves many steps. As a result, a process may fail between any of the steps. To maintain the above consistency rules in the presence of user process failures requires that update operations be performed atomically: either all such updates to control data structures happen or none of the updates happen.

The system maintains consistent control data structures in the presence of user process 32 failures by performing before-image journal logging and having a recovery process 34 clean up the control data structures based on the before-image journal log 24. Any operation that updates the control data structures is performed in the context of an atomic modification transaction.

An atomic modification transaction allows user processes 32 to update control data structures atomically. The locks on the Global Buffer Page Table buffer slots 77 are two-phase locks for the duration of the atomic modification transaction. These locks are subject to freeze protocols to prevent concurrent updates of the data. Using freeze protocols, if a user process 32 holding locks fails, the recovery process 34 executes before any other processes can get the locks. In other words, the other processes wanting the locks freeze while the recovery process 34 is executing. All updates to control data structures are performed in the context of locks on the buffer slots 77. A slot lock controlling a Global Buffer Control Block is first acquired and then the Global Buffer Control Block is updated. A transaction in-progress flag 26 in the process specific global structure maintains the state of atomic modification transactions for each user process 32.

The journal log 24 for atomic modification transactions is in memory 10. In particular, the journal log 24 is located in the process specific global structure 20 because the data contained in the journal log 24 is specific to a user process 32. The journal log 24 will be used by the recovery process 34 to clean up the control data structures 45 located in the TROOT section 40. There is no need to swap the journal log 24 to disk 100 when a user process 32 fails because a process failure does not affect the journal log 24 located in the process specific global structure 20. In addition, if the node fails, the global buffer pool 60 is lost and the journal log 24 can be lost as well. The global buffer journal log records 24$n$ are written before the updates are made to control data structures because the updates destroy the previous data in the control data structure.

The journaling of the journal log records 24$n$ must be performed atomically because the recovery process 34 relies on the data in the journal log records 24$n$ to restore the control data structures to a consistent state. A pointer 28 located in the process specific global structure section 20 is used by the user process 32 to write to the journal log 24. The pointer 28 indicates the beginning of the next available memory address to be used to store the next journal log record 24n. In other words, the pointer 28 points to the beginning of the next journal log record 24n. To maintain atomicity of the journal log 24, the pointer 28 is not updated until the data to be journaled has been completely written to the journal log 24.

In global memory, each user process 32 has an associated Allocate Set Block (ASB) 22, which is sized to reference a maximum number of global buffers. The Allocate Set Block 22 contains a list of pages in the allocate set of the associated user process 32. The Allocate Set Block 22 contains an entry 22n for each referenced buffer. Each Allocate Set Block entry 22n contains the list of page numbers being used by the associated user process 32 and stored in the referenced buffer in the global buffer pool 60.

The associated user process 32 uses the Allocate Set Block 22 to identify pages to which the user process 32 already has access. The Allocate Set Block 22 is also used by the recovery process 34 to perform database recovery. Because the Allocate Set Block 22 is associated with a user process 32 and must be used by the recovery process 34, the Allocate Set Block 22 is located in the process specific global structure section 20. Preferably, the allocate set of each user process 32 are assigned a maximum size, such that the sum of the allocate set sizes of all user processes 32 is smaller than or equal to the number of global buffers on the node. Therefore, a user process 32 is guaranteed to find unused buffers in the global buffer pool 60 to use at any time.

Figure 6:
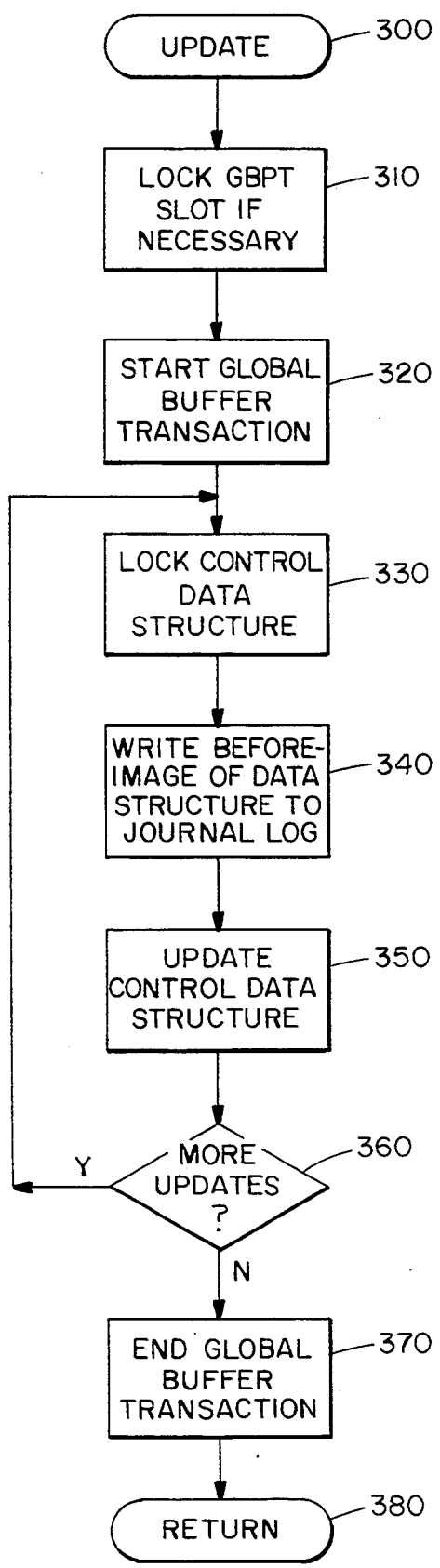
FIG. 6 is a flow chart of the global data update portion of the present invention.

FIG. 6 is a flow chart of the global data update portion 300 of the present invention executed by any user process 32 updating a control data structure. The first step 310 involves obtaining a lock on a Global Buffer Page Table slot 77 if such a lock is necessary. An atomic modification transaction is then started 320. The transaction in-progress flag 26 indicates the start of the atomic modification transaction.

The routine then enters a loop to lock 330, before-image journal 340 and update 350 the subject control data structures. The user process 32 obtains locks 330 on the control data structures to be changed. The particular embodiment dictates the types of locking needed.

In general, control data structures must be journaled before being updated. The journaling 340 is done either physically or operationally, depending upon the type of control data structure being journaled. The user process 32 makes physical updates to the control data structure. The loop continues 360 for each control data structure being updated by the user process 32.

When the updates are completed 360, the final step of ending the atomic modification transaction 370 occurs. The ending of the atomic modification transaction involves removing the atomic modification transaction indication from the transaction in-progress flag 26, clearing the journal log 24, and releasing the locks on control data structures.

Global operations must be done atomically to preserve the consistency of the control data structures and the global buffer pool 60. The invention identifies the following atomic updates:

1. Global Buffer Control Block and CLIST updates;
2. allocate set updates;
3. Global Buffer Control Block movement between Global Buffer Page Table slots 77;
4. request and release of system owned locks;
5. input/output to read buffer;
6. Candidate Unused Buffer Queue 80 operations.

Figure 7A:
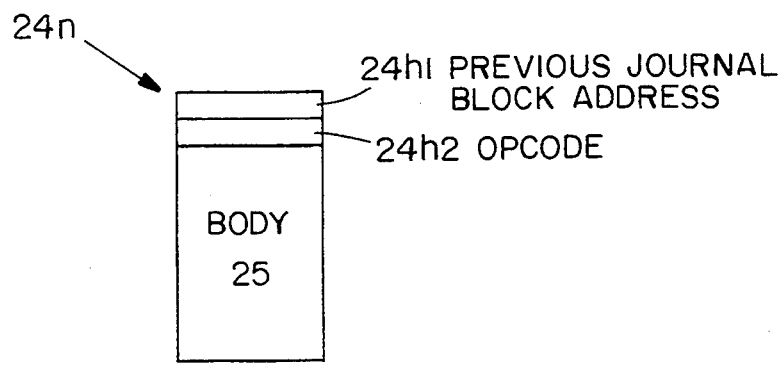
FIGS. 7a, 7b and 7c are schematic block diagrams illustrating the fields of the journal blocks of FIG. 3.

To provide for recovery from the identified atomic updates, both physical logging and operation logging are performed in the journal log 24. The log records in the journal 24 are called journal blocks, 24n. FIG. 7a illustrates the general structure of a journal block 24n of journal log 24. The field 24h1 containing the address of the previous journal block is used by the recovery process 34 to read backward through the journal blocks.

There are two classes of journal blocks 24n: physical log records and interlocked queue operation log records. The opcode field 24h2 indicates the type of class data contained in the body 25 of the journal block 24n. The contents of the body 25 depend on the opcode 24h2. There is a different overlay structure for the body 25 for each opcode 24h2.

Figure 7B:
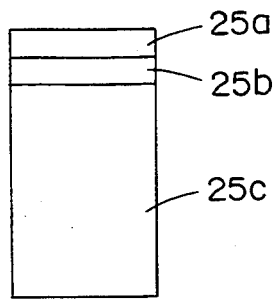
Figure 7C:
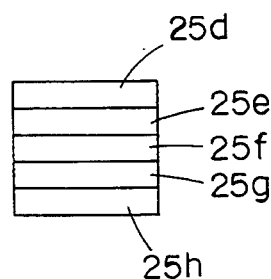

FIGS. 7b-c illustrate the structure of body 25 for each opcode 24h2. FIG. 7b illustrates the body structure 25 for a physical journal record. In FIG. 7b, there are fields for the address of the data structure 25a, the length of the data structure being stored 25b, and the contents of the data structure 25c. FIG. 7c illustrates the body structure 25 for queue operations. In FIG. 7c, there are fields for the sub-opcode for the runtime queue operation 25d, the address of the queue head 25e, the address of the queue entry 25f, a literal identifying the queue field 25g, and an end of block 25h for the sub-opcode.

The Global Buffer Control Block, CLIST and allocate set updates are physically logged. That is, the previous image of the memory location is logged before the updates and the previous image is installed by the recovery process if the user process fails. When a global buffer is chosen as the victim to be swapped out and another buffer is read in its place, the Global Buffer Control Block is moved from the old location to a new location corresponding to the new buffer.

The removal of a Global Buffer Control Block from the queue at the old Global Buffer Page Table slot 77 and the insertion into the queue at the new Global Buffer Page Table slot 77 are logged as queue operations. Candidate Unused Buffer Queue operations are logged as special operations that exploit the semantics of interlock queue operations on the Candidate Unused Buffer Queue. Because the queue operations are handled as distinct events, the queue fields $5h1, 5h2$ of the Global Buffer Control Blocks are not logged when the Global Buffer Control Block is physically logged.

Not all atomic operations are logged. Changes to system-owned locks are not logged, but the order of updates is carefully structured so that there is never a page in the buffer pool 60 without any locks on it. In addition, reading a page from disk 100 is not logged. The proper recovery operation for a disk read is to invalidate a page wherever the Global Buffer Control Block page version number may not correspond to the version number of the page actually in the buffer.

The implementation of a global data update routine 300 is computer and operating system specific. An implementation of global data update routine 300 in a preferred VAX/VMS embodiment is described next.

Figure 11A:
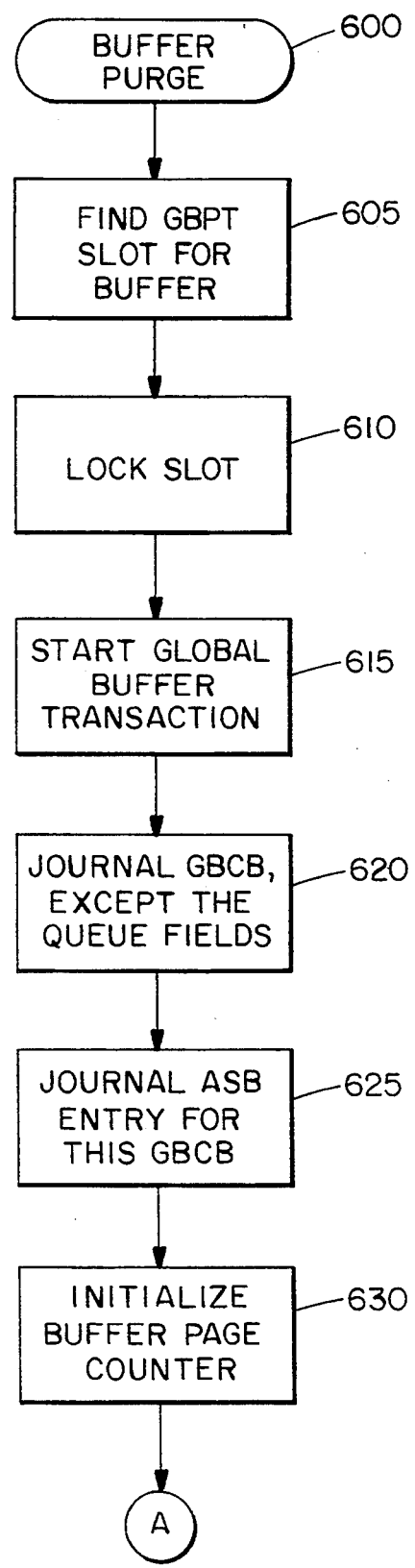
FIGS. 11a, 11b and 11c are a flow chart of purging a buffer.

FIGS. 8a-i illustrate an atomic movement of a data page P1 from disk 100 to the allocate set of user process 32. FIG. 11a shows the initial state of computer memory. The Allocate Set Block 22a, the journal log 24a, and the transaction in-progress flag 26a are associated with user process 32. Note that all global buffers 63,64,65,66,67 are empty and all associated Global Buffer Control Blocks 53,54,55,56,57 are initialized and linked on the Candidate Unused Buffer Queue 80.

In this particular embodiment, the transaction in-progress flag 26a is a boolean flag. As illustrated, the transaction in-progress flag 26a indicates that an atomic modification transaction is in progress when the flag 26a is set to "Yes" and that an atomic modification transaction is not in progress when the flag 26a is set to "No".

Figure 8A:
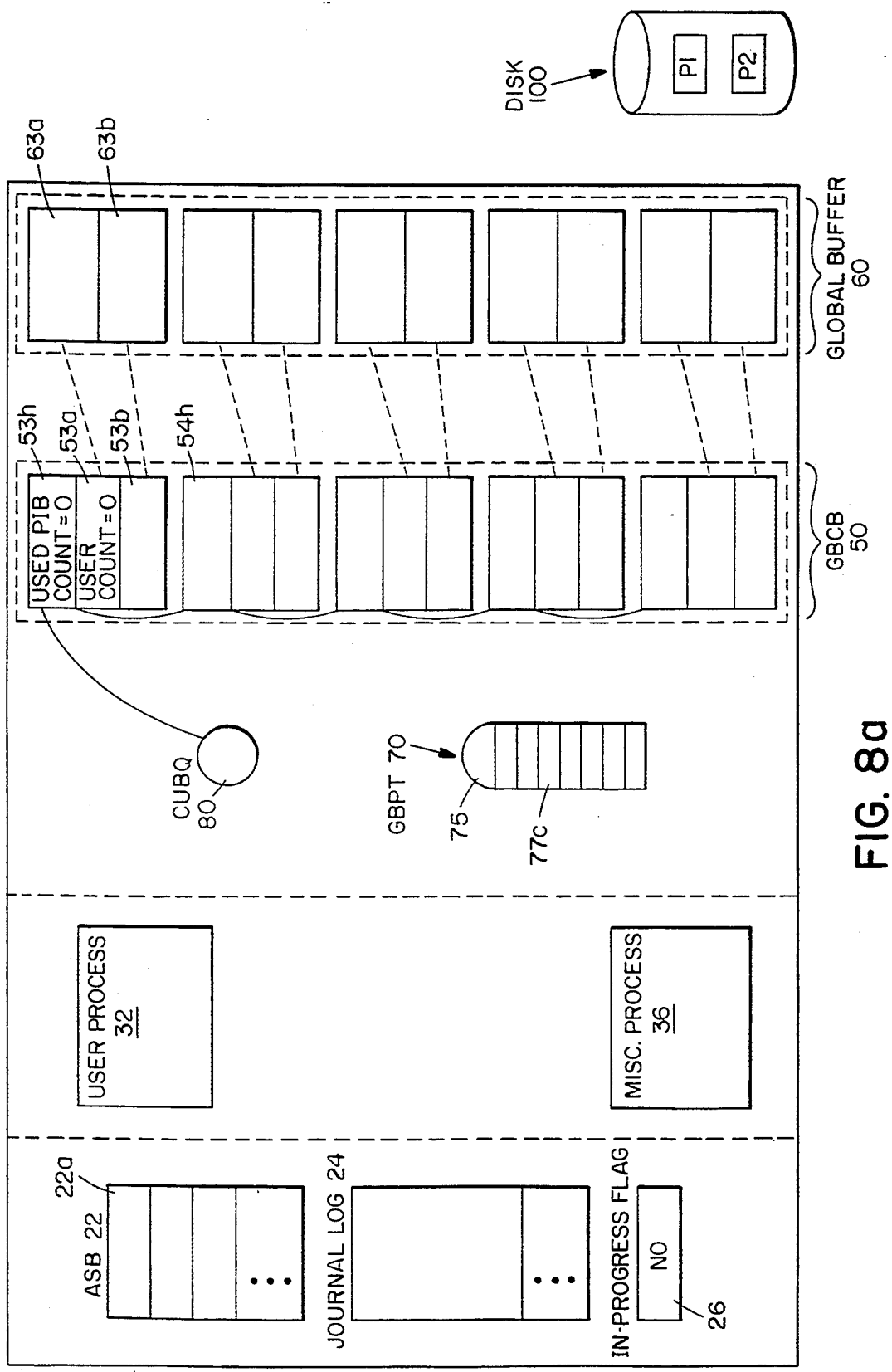
Figure 8B:
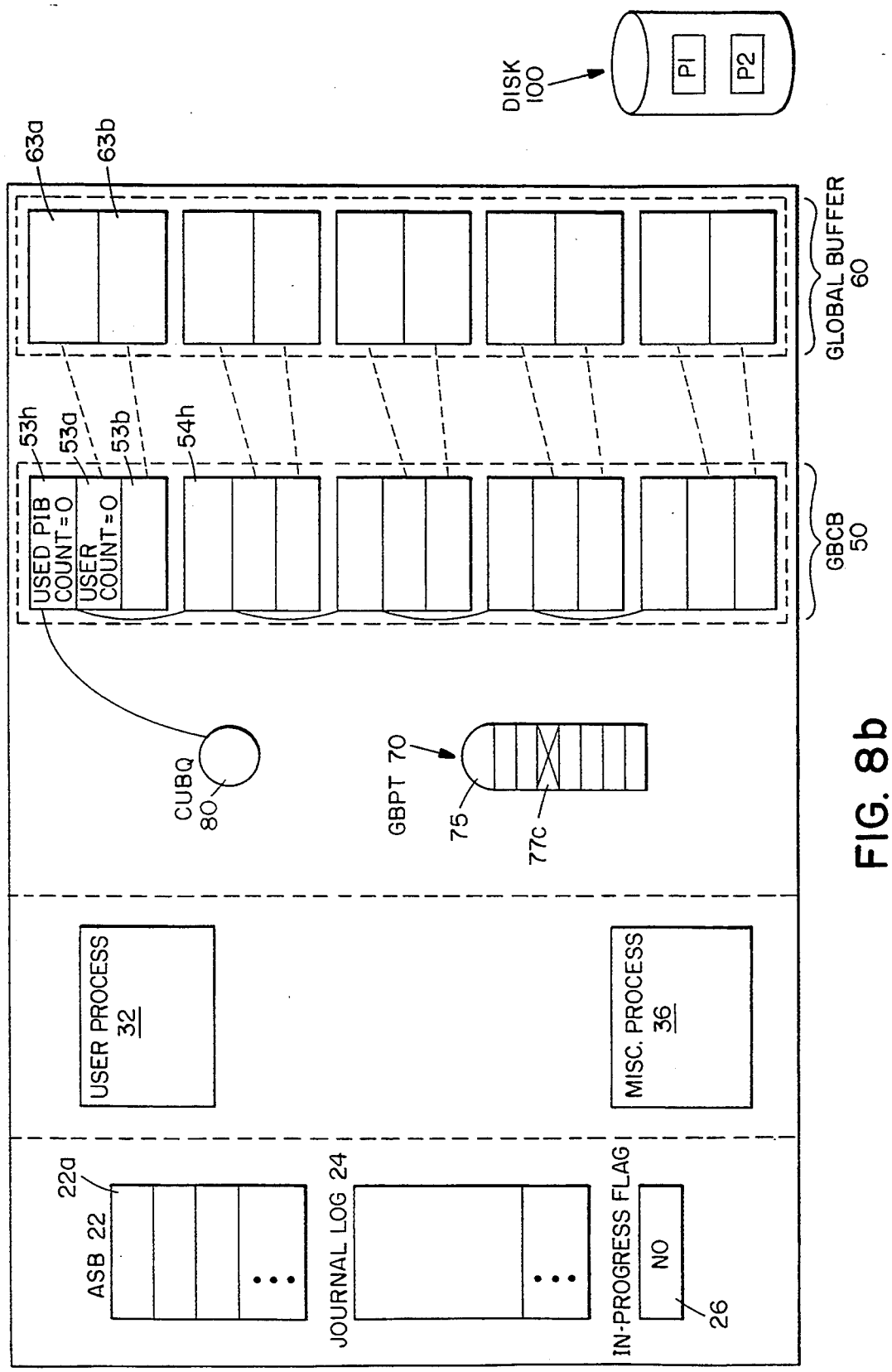

To locate the page P1 in the global buffer pool 60, the user process 32 accesses the Global Buffer Page Table 70. The hash table 75 hashes the page P1 to buffer slot 77c. In FIG. 8b, the user process 32 locks 310 the identified buffer slot 77c. The lock is indicated in the figure by an "X" mark. If page P1 is in the global buffer pool 60, the reference to page P1 will be found in the Global Buffer Control Block queue pointed to by the buffer slot 77c. In this example, the page P1 is not on the queue for buffer slot 77c because the page P1 is not in the global buffer pool 60. The user process must select a Global Buffer Control Block to act as a proxy to the target page.

Figure 8C:
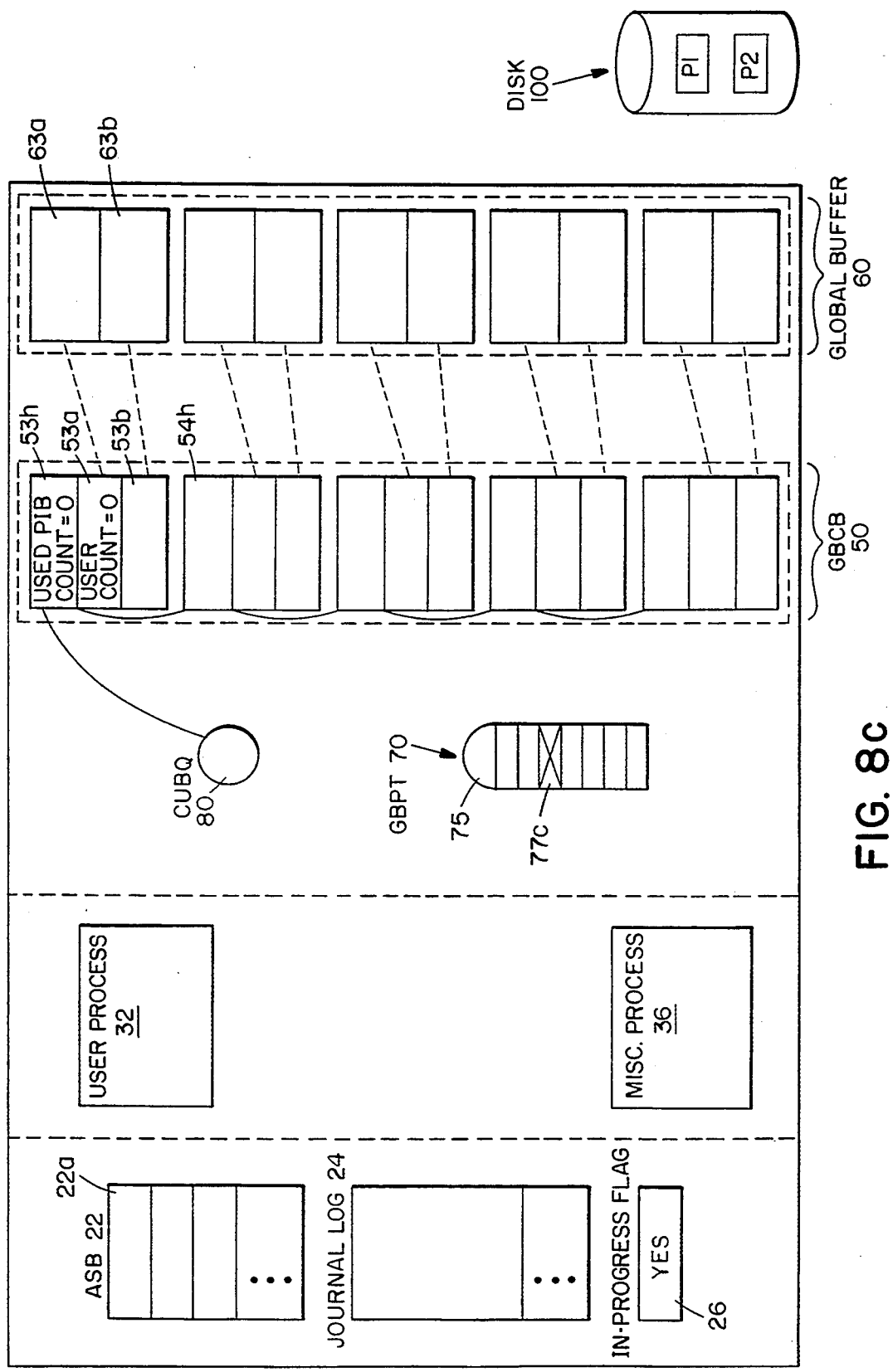

In FIG. 8c, the transaction in-progress flag 26a is set to "Yes" to indicate the start 320 of an atomic modification transaction.

FIG. 8d illustrates the journaling 340 of the queue operation to journal log 24a. Because the page P1 is not in memory, the Candidate Unused Buffer Queue 80 must be searched for a free buffer to read the page P1 into. Because a candidate Global Buffer Control Block may be removed from the Candidate Unused Buffer Queue 80, the removal is recorded in journal log 24a. The queue request is journaled as an operation function.

Figure 8E:
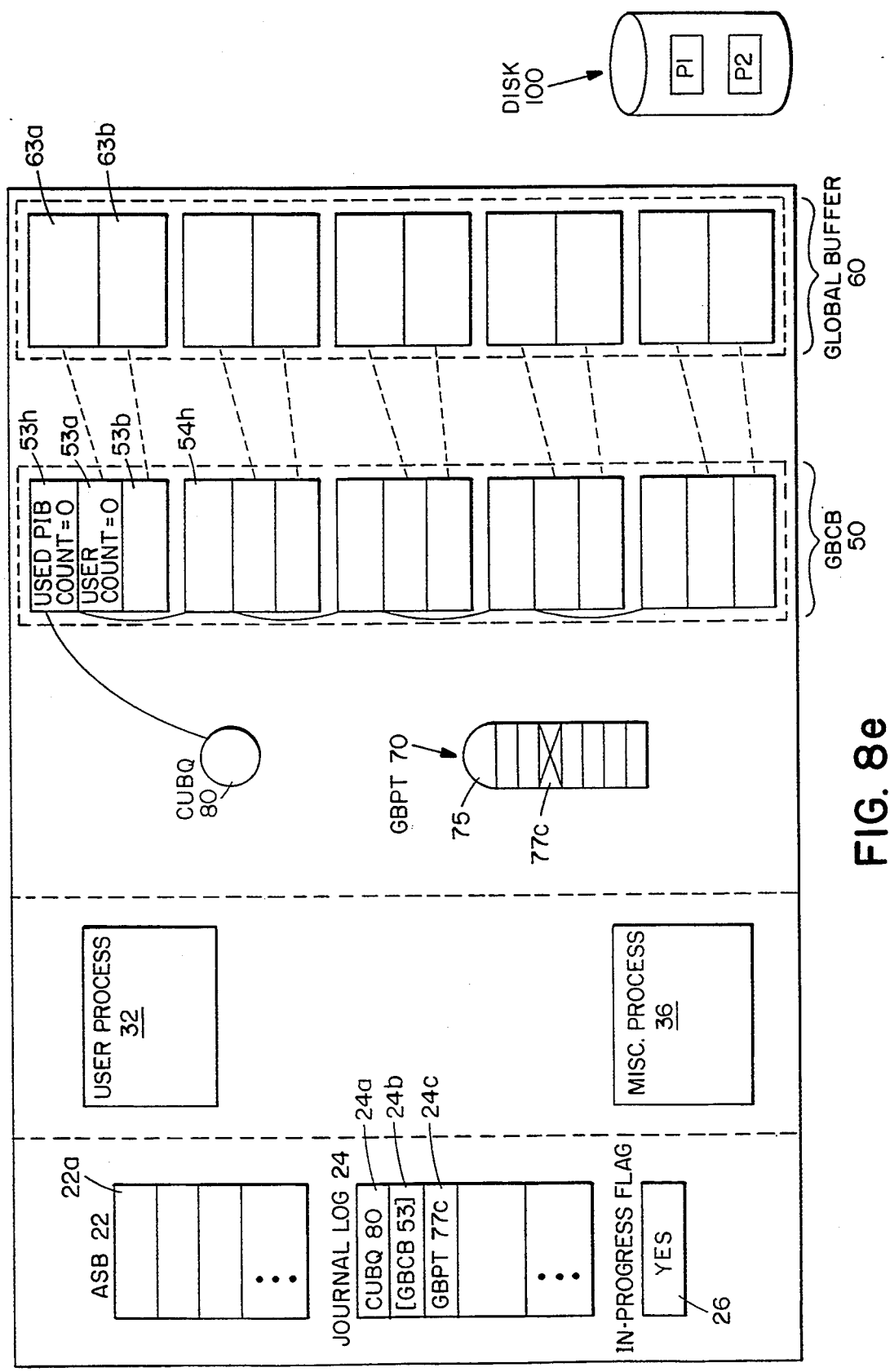

In FIG. 8e, the process has found a candidate Global Buffer Control Block 53 that is free. The data from the candidate Global Buffer Control Block 53 is journaled 340 in journal log 24b. Note that Global Buffer Control Blocks are physically logged, as indicated by the use of brackets. In anticipation of inserting a Global Buffer Control Block onto the buffer slot 77c, the buffer slot 77c insertion is journaled 340 in the journal log 24c. As a queue request, the insertion into buffer slot 77c is logged as an operation function.

Figure 8F:
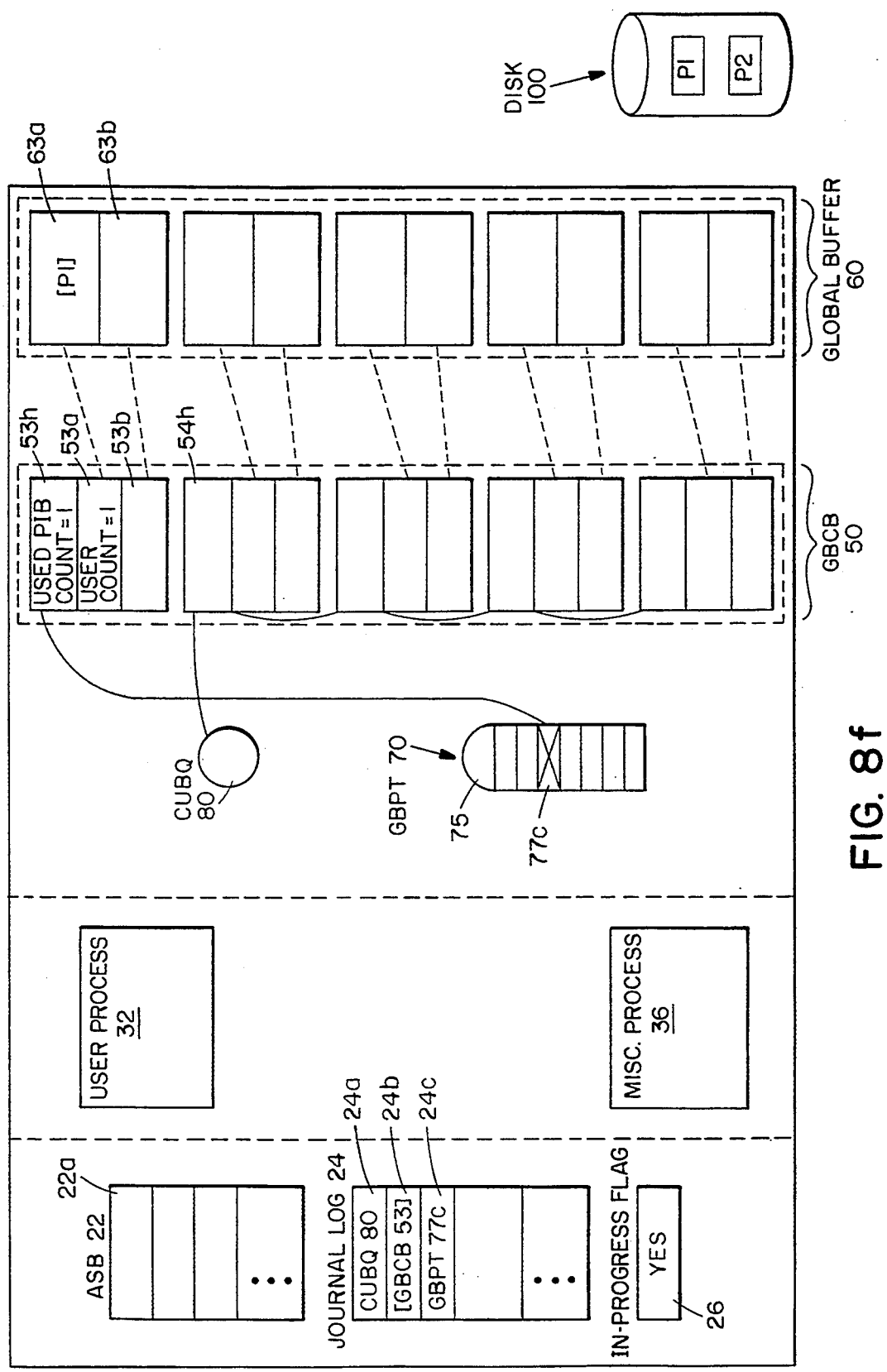

The resulting movement 350 of the Global Buffer Control Block 53 from the Candidate Unused Buffer Queue 80 to the buffer slot 77c is shown in FIG. 8f. The Global Buffer Control Block 53 is first linked to the buffer slot 77c. Then the link to the Candidate Unused Buffer Queue 80 is broken. The head of the Candidate Unused Buffer Queue 80 queue is now occupied by Candidate Unused Buffer Queue 54. The user process 32 then increments the page user count 5a5 in the CLIST 53a. Because the user process 32 is the first user of this page, the process increments the used page-in-buffer count 5h6 in the Global Buffer Control Block header 53h. The contents of the page P1 is then fetched from disk 100 into the global buffer 63a.

Figure 8G:
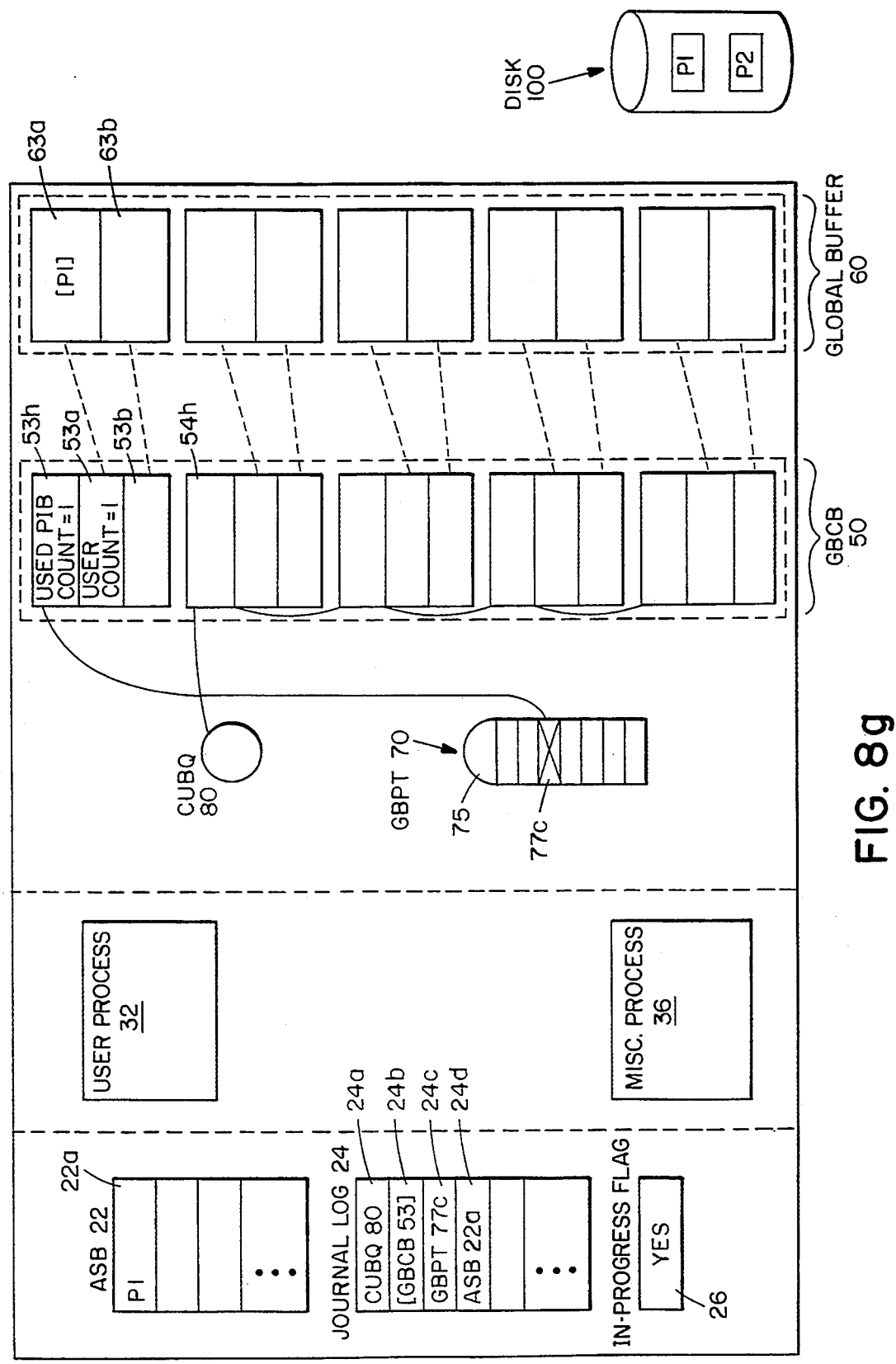

FIG. 8g shows the page being entered in the user process' 32 allocate set. The before-image contents of the Allocate Set Block 22a is physically recorded 340 into journal log 24d. As illustrated in the figure, the before-image of the Allocate Set Block 22a is empty. The Allocate Set Block 22a is then updated 350 to indicate that the page P1 is in the user process' 32 allocate set. The process has now accomplished all needed atomic updates 250.

FIG. 8h shows the user process 32 ending the atomic modification transaction 370. The buffer slot 77c is unlocked, the journal log 24a is cleared and the transaction in-progress flag 26a is set to "No". The user process 32 is now ready to perform updates to the page P1 in the global buffer 63.

Figure 8I:
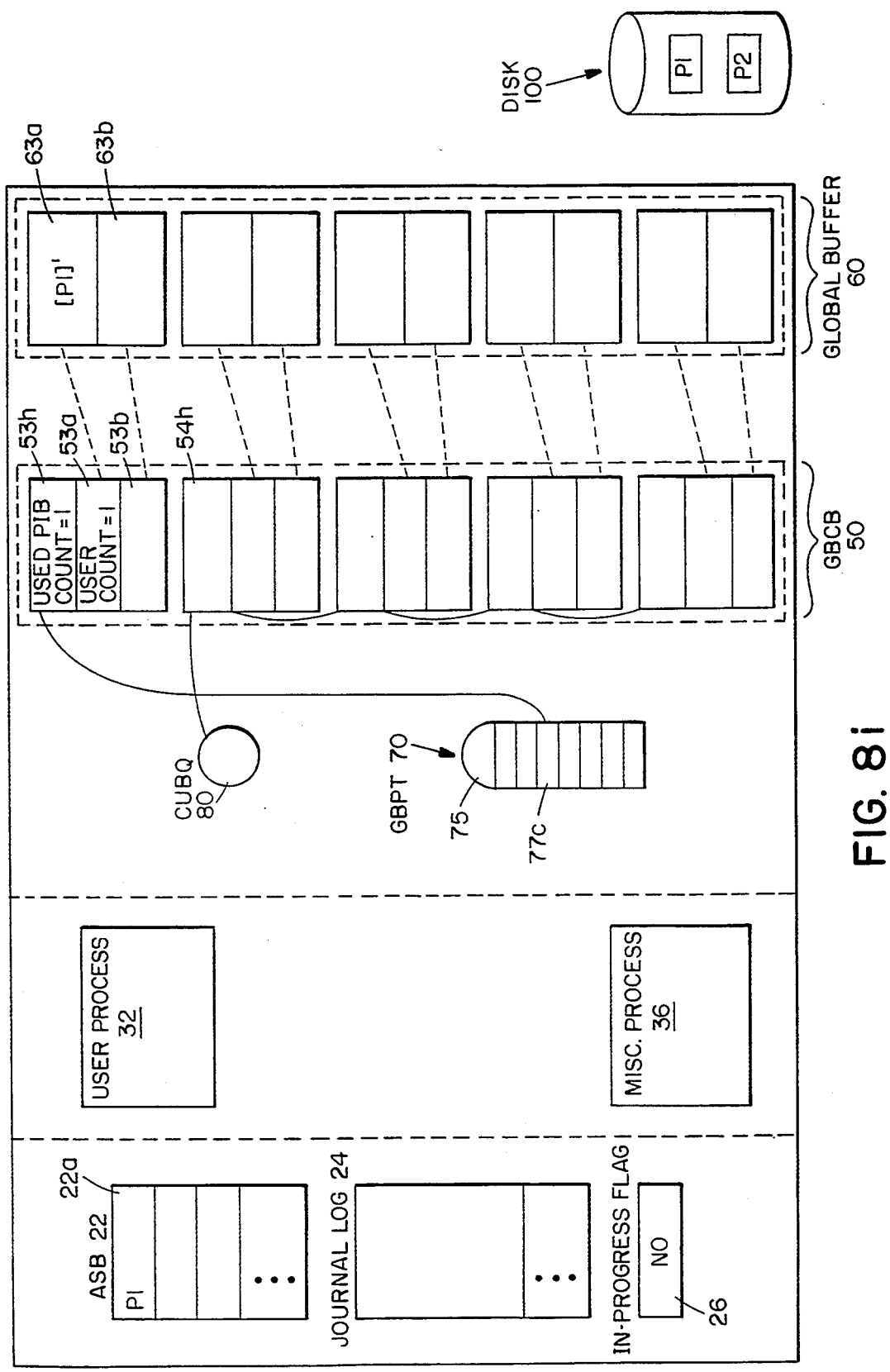

In FIG. 8i, the user has updated the data in page P1 in the page buffer 63a, as indicated by the prime character ('). After a user modifies the data in the global buffer pool 60, the user will usually desire to make the modifications visible to other processes. To make the changes available, the user process 32 commits the database transaction. Once the commit completes, other users will have access to the new data in page P1 in the global buffer 63a.

The identified atomic updates occur during atomic modification transactions. There are four atomic modification transaction scenarios identified by the invention. In each scenario, the logging for the updates or queue operations must proceed the operation itself.

In the first atomic modification transaction scenario, a desired page is not in the allocate set of the user process 32, but the page is found in the global buffer pool. In this case, the atomic modification transaction involves incrementing the user count in the CLIST for the page in the Global Buffer Control Block. The atomic modification transaction also involves updating the Allocate Set Block entry 22n for the page to indicate that the page is in the allocate set of the user process 32.

In the second atomic modification transaction scenario, a desired page is not in the allocate set of the user process 32 and the page is not in the global buffer pool 60. In this case, there are several steps in a single atomic modification transaction. First, a Global Buffer Control Block 50 is removed from the Candidate Unused Buffer Queue 80. The removal is logged as an interlocked queue operation. Second, the user count in the CLIST is incremented. Thirdly, the Global Buffer Control Block is removed from the current buffer slot 77 in the Global Buffer Page Table 70. Fourthly, the Global Buffer Control Block is inserted into the proper buffer slot 77 in the Global Buffer Page Table 70. Finally, the Allocate Set Block entry 22n is updated to indicate allocate set membership.

In the third atomic modification transaction scenario, an existing buffer must be purged from a user process' 32 allocate set before another buffer is brought into the allocate set. In this case, the user count in the CLIST is decremented and the Allocate Set Block entry 22n is updated to reflect non-membership in the allocate set of the user process 32.

In the fourth atomic modification transaction scenario, a page in a buffer is fetched that is not in the allocate set of a user process 32. In this case, that page is brought into the user process' 32 allocate set. The atomic modification transaction involves incrementing the user count in the CLIST for the page in the Global Buffer Control Block. The atomic modification transaction also involves updating the Allocate Set Block entry 22n for the page to indicate that the page is in the allocate set of the user process 32. The fourth scenario is similar to the first scenario, except that in this case the buffer is in the allocate set but the page wanted is not in the allocate set.

Figure 9A:
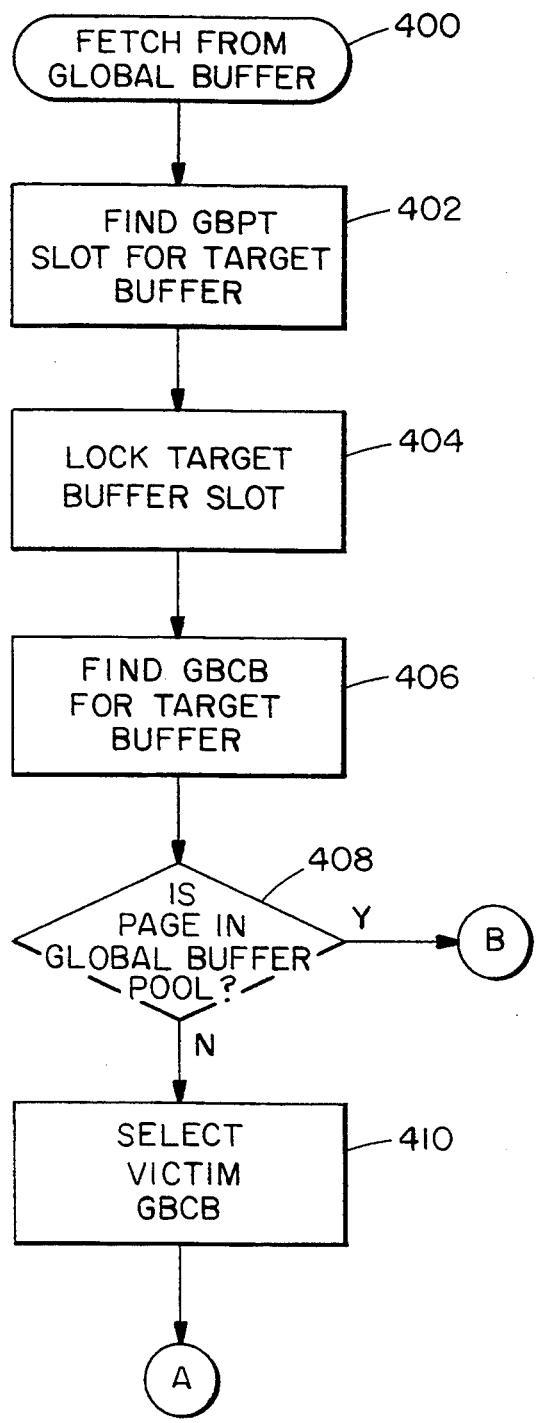
FIGS. 9a, 9b and 9c are flow chart of a page fetch from a global buffer.
Figure 9B:
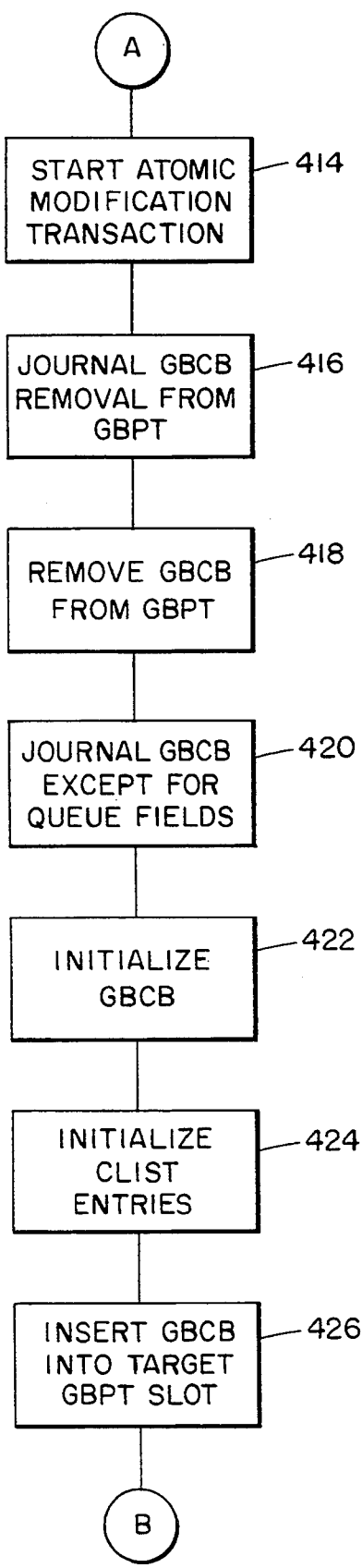
Figure 9C:
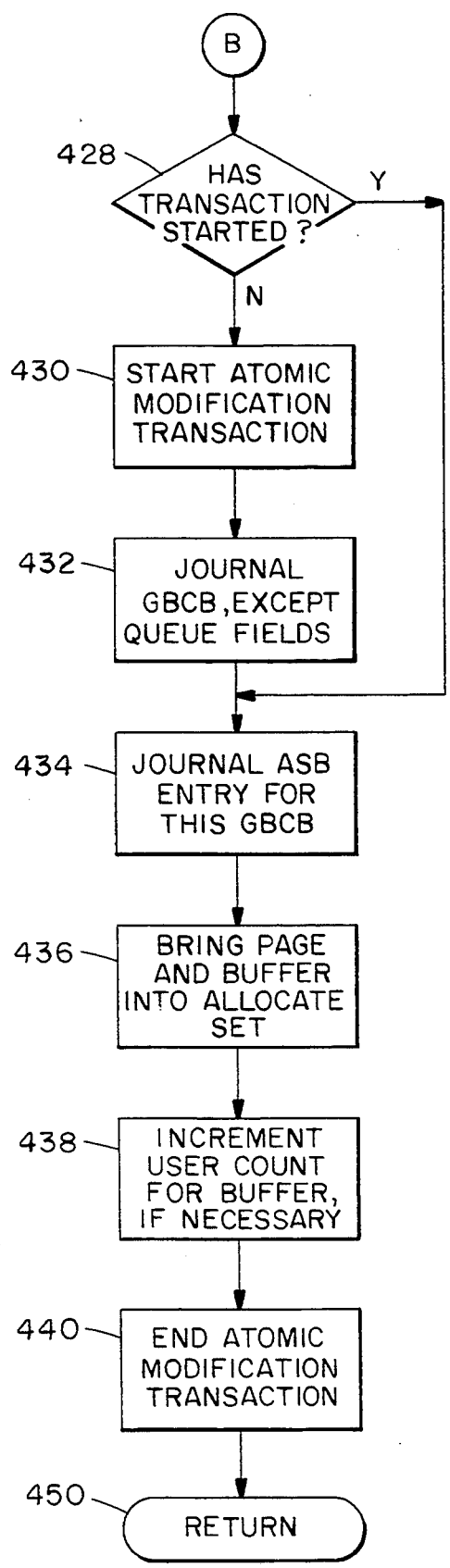

FIG. 9 is a flow chart of a routine 400 for fetching a page from the global buffer pool 60. The target Global Buffer Page Table buffer slot 77 is determined 402 from the page number of the target page being fetched. Once the buffer slot 77 is determined, the user process 32 locks 404 the buffer slot 77. The queue for that buffer slot 77 is searched 406 for a Global Buffer Control Block 50 for the target page. The Global Buffer Control Blocks 50 in the buffer slot 77 will indicate whether the target page is in the global buffer pool 60.

If 408 the buffer slot 77 queue indicates that the target page is not in the global buffer pool 60, then a Global Buffer Control Block 50 victim is selected 410 to be swapped to disk 100. The details of selecting a victim buffer is discussed in FIG. 9. Once a victim is selected the process will typically have two buffer slots 77 locked. One lock will be on the buffer slot 77 corresponding to the target page. Another lock will be on the buffer slot 77 corresponding to the victim buffer, unless the target page and the victim buffer hash to the same buffer slot 77.

After the victim buffer is selected, the user process 32 starts 414 an atomic modification transaction. Once the atomic modification transaction is started, the user process 32 journals 416 the victim Global Buffer Control Block 50 removal from the buffer slot 77 queue. The removal is journaled as a queue operation. After the journaling, the user process 32 actually removes 418 the victim Global Buffer Control Block 50 from the buffer slot 77 queue.

Once the queue removal is completed, the user process 32 operates on the freed Global Buffer Control Block 50. The user process 32 first journals 420 the freed Global Buffer Control Block 50. The data contents of the Global Buffer Control Block 50 are physically journaled. The queue fields 5h1,5h2 are not journaled. After the journaling, the user process 32 initializes 422 the Global Buffer Control Block 50 header 5h. The user process 32 then initializes 424 the CLIST entries 5a,5b in the Global Buffer Control Block 50. Finally, the Global Buffer Control Block 50 is inserted 426 into the target buffer slot 77 queue. The target page is now in the global buffer pool 60.

Once the target page is in the global buffer pool 60, the page must be brought into the user process' 32 allocate set. If an atomic modification transaction has already started 428, then a victim buffer was selected and the target page has just been moved into the global buffer pool 60. In that case, the target Global Buffer Control Block 50 has already been journaled. If an atomic modification transaction is not in progress 428, then the user process 32 must start an atomic modification transaction 430 and journal 432 the target Global Buffer Control Block 50. The Global Buffer Control Block 50 is physically journaled without the queue fields 5h1,5h2.

Once the atomic modification transaction is in-progress and the target Global Buffer Control Block 50 is journaled, then the process of moving the target page into the user process' 32 allocate set begins. The user process 32 journals 434 the Allocate Set Block entry 22n for the target Global Buffer Control Block 50. The Allocate Set Block 22 is journaled physically. After the journaling, the user process 32 brings 436 the target page into the allocate set. Bringing the page into the allocate set involves updating the Allocate Set Block entry 22n. If necessary, the user process' 32 increments 438 the CLIST user count 5a5. Finally, the user process 32 ends 440 the atomic modification transaction and returns 450.

Figure 10A:
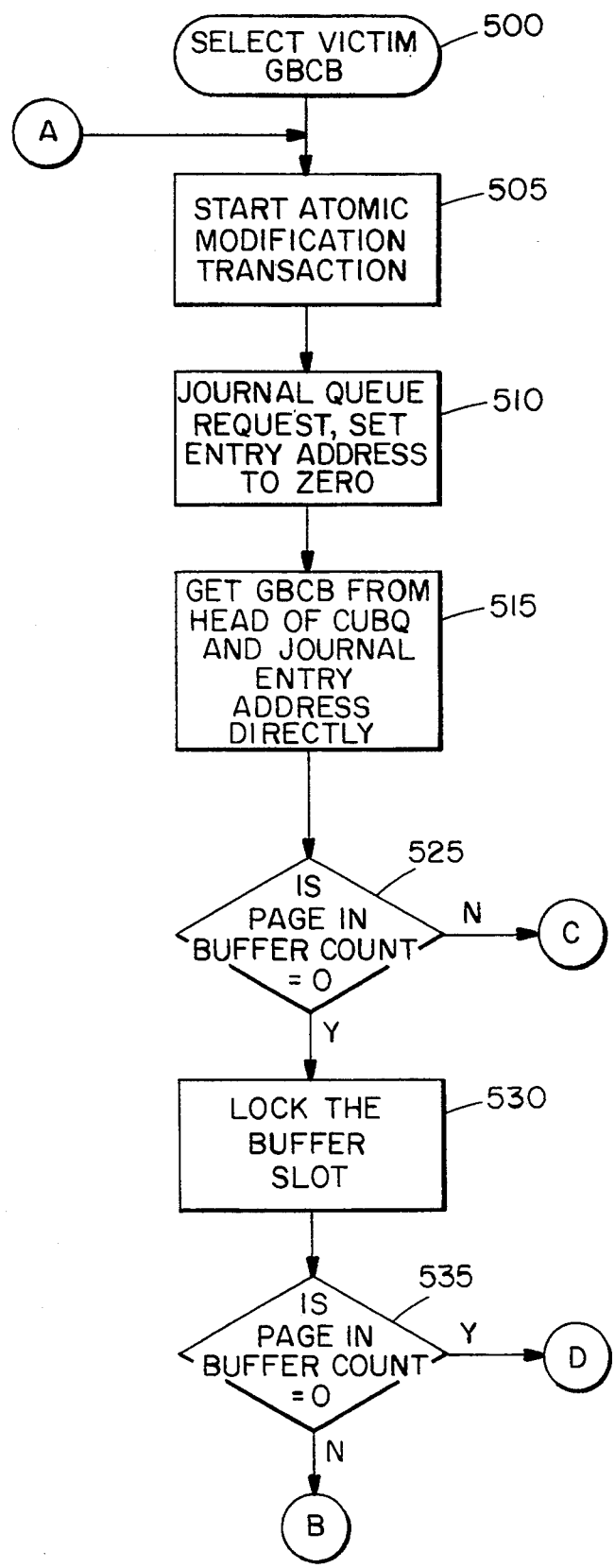
FIGS. 10a and 10b are a flow chart of selecting a global buffer control block victim.
Figure 10B:
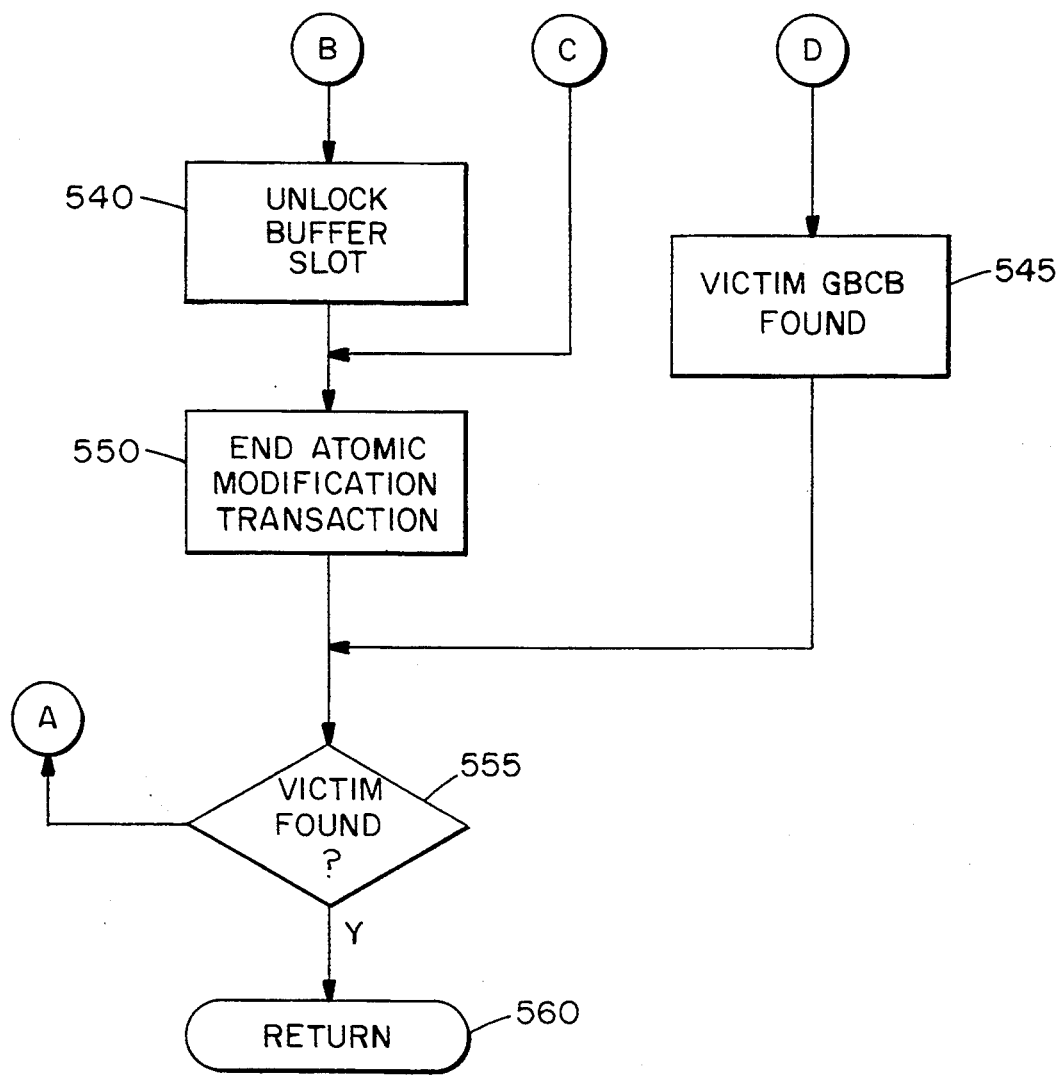

FIG. 10 is a flow chart of a routine 500 for selecting a victim Global Buffer Control Block 50. The routine loops 555 until a suitable victim is found. First, the user process 32 starts 505 an atomic modification transaction.

After the atomic modification transaction is started, the user process 32 journals the removal of a Global Buffer Control Block from the head of the Candidate Unused Buffer Queue 80. The entry address is journaled as a zero. If the User process fails now, the zeroed entry address will cause the recovery process 34 to ignore this journal block 24n. The candidate Global Buffer Control Block 50 is removed 515 from the head of the Candidate Unused Buffer Queue 80. The entry address obtained during the removal is directed into the journal block to replace the zeroed entry address. The removal of Global Buffer Control Blocks 50 from the Candidate Unused Buffer Queue 80 head is done atomically with the logging of the entry address in the journal 24. This atomicity is guaranteed by the VAX architecture.

If no other user process has this Global Buffer Control Block in their allocate set, then the page-in-buffer count 5h6 will be zero. If the page-in-buffer count 5h6 is zero 525, then this Global Buffer Control Block 50 may become a victim. The user process 32 obtains a lock on the buffer slot 77 for this Global Buffer Control Block 50. Once the lock is obtained, the user process 32 reexamines 535 the page-in-buffer count 5h6 because another user process may have incremented the count since the last check (525). If the page-in-buffer count 5h6 is still zero, then the user process 32 has found a victim buffer. If a victim was found 555, then the routine returns 560 the address of the victim Global Buffer Control Block 50.

If the page-in-buffer count 5h6 is not zero, then this Global Buffer Control Block 50 cannot be selected as a victim. In that case, the buffer slot 77 is unlocked 540. Because the page-in-buffer count 5h6 is non-zero, the Global Buffer Control Block 50 is not put back on the Candidate Unused Buffer Queue 80.

If a victim Global Buffer Control Block 50 was not found on this loop, then the atomic modification transaction is ended 550 and the routine continues the loop 555 for the next entry on the Candidate Unused Buffer Queue 80.

Figure 11B:
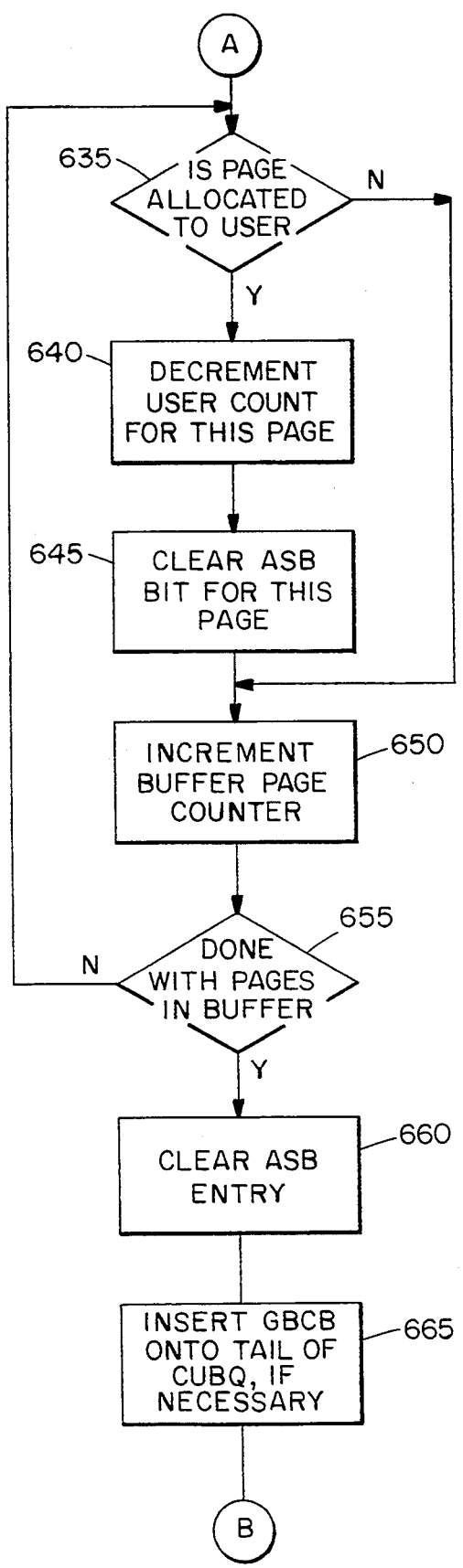
Figure 11C:
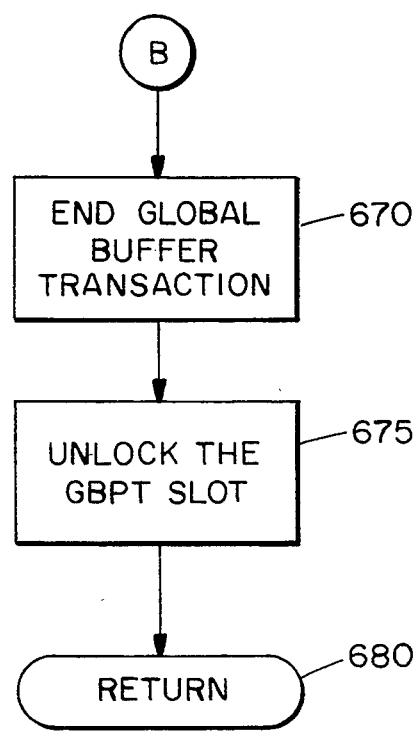

FIG. 11 is a flow chart of a routine 600 for purging a buffer from the allocate set of a user process 32. The user process determines 605 the correct buffer slot 77 for the buffer being purged. After the buffer slot 77 is found, the user process 32 locks 610 the buffer slot 77. After the lock is obtained, the user process 32 starts 615 an atomic modification transaction.

After the atomic modification transaction is started, the user process 32 journals 620 the Global Buffer Control Block 50, except that the queue fields are not journaled. Next, the user process 32 journals 625 the respective Allocate Set Block entry 22n for the Global Buffer Control Block 50.

After the journaling, the user process 32 loops 655 through each CLIST 5a,5b in the Global Buffer Control Block. A CLIST counter is initialized 630 to point to the first CLIST 5a in the Global Buffer Control Block. If the page referenced by the CLIST 5a4 is not allocated 635 to the user process 32 then the CLIST counter is incremented 650 to point to the next CLIST 5b in the Global Buffer Control Block.

If the page referenced by the CLIST 5a4 is allocated 635 to the user process 32, then the user count 5a5 in the CLIST for the page is decremented 640 to reflect one less user. After decrementing the user count 5a5, the page reference is removed 645 from the Allocate Set Block entry 22n. The CLIST counter is then incremented 650 to point to the next CLIST in the Global Buffer Control Block.

When all pages in the buffer have been examined 655, the Allocate Set Block entry 22n is cleared 660 so the entry 22n can be used for another Global Buffer Control Block 50. The Global Buffer Control Block 50 is inserted 665 on the tail of the Candidate Unused Buffer Queue 80 if the used page-in-buffer count 5h6 becomes equal to zero. The user process 32 then ends the atomic modification transaction 670. After the atomic modification transaction is ended, the buffer slot 77 is unlocked 675 and the routine returns 680.

In a typical system, the steps illustrated in FIGS. 8a–i are continued until the global buffer pool 60 is filled. Once the global buffer pool 60 is filled, no other pages can be read from disk 100 into the global buffer pool 60 without swapping a page to disk 100 from the global buffer pool.

Figure 12A:
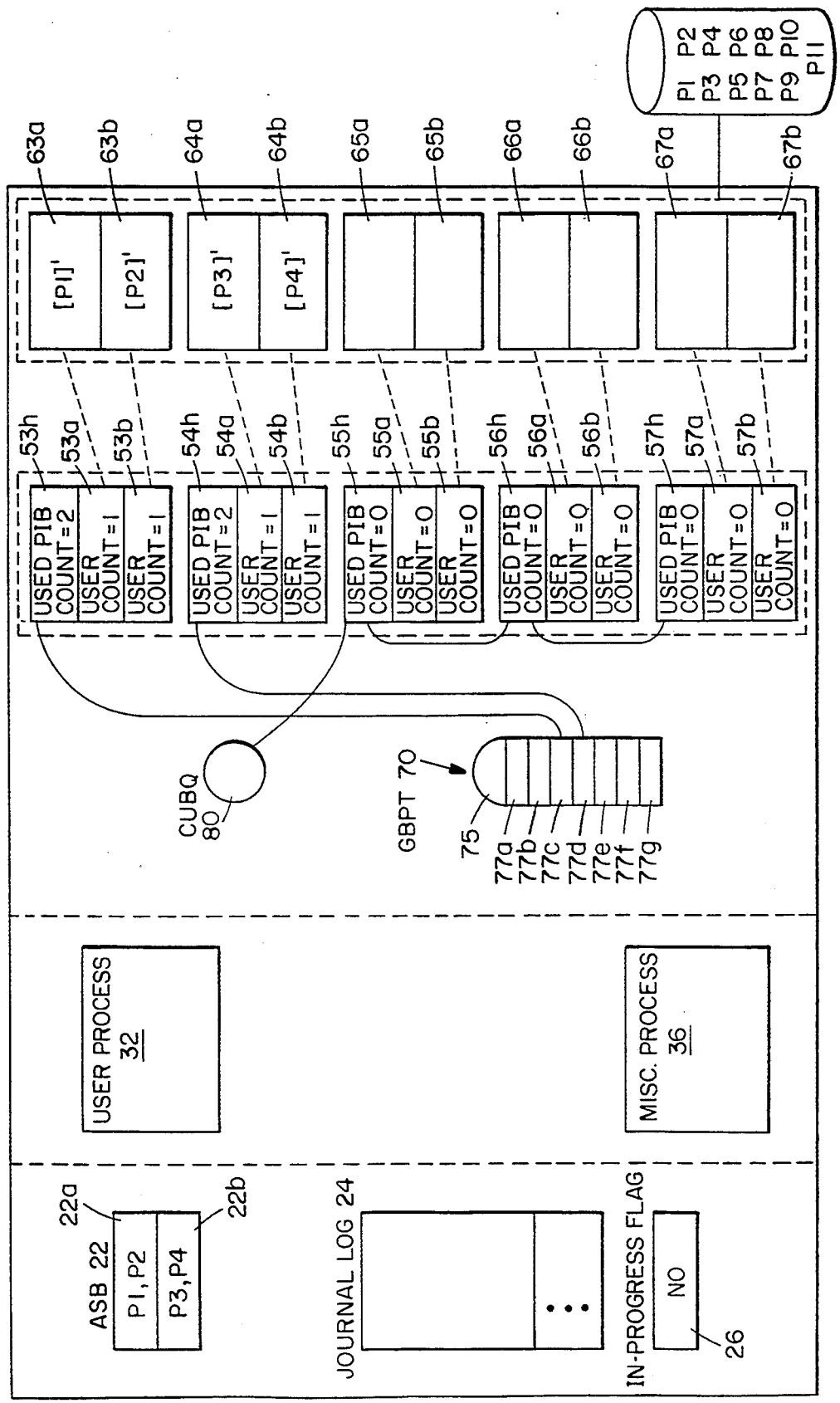
FIGS. 12a, 12b, 12c, 12d, 12e, 12f, 12g, 12h, 12i, 12j, 12k, 12l, 12m and 12n, 12o are schematic block diagrams illustrating an example of purging a buffer from an allocate set.
Figure 12B:
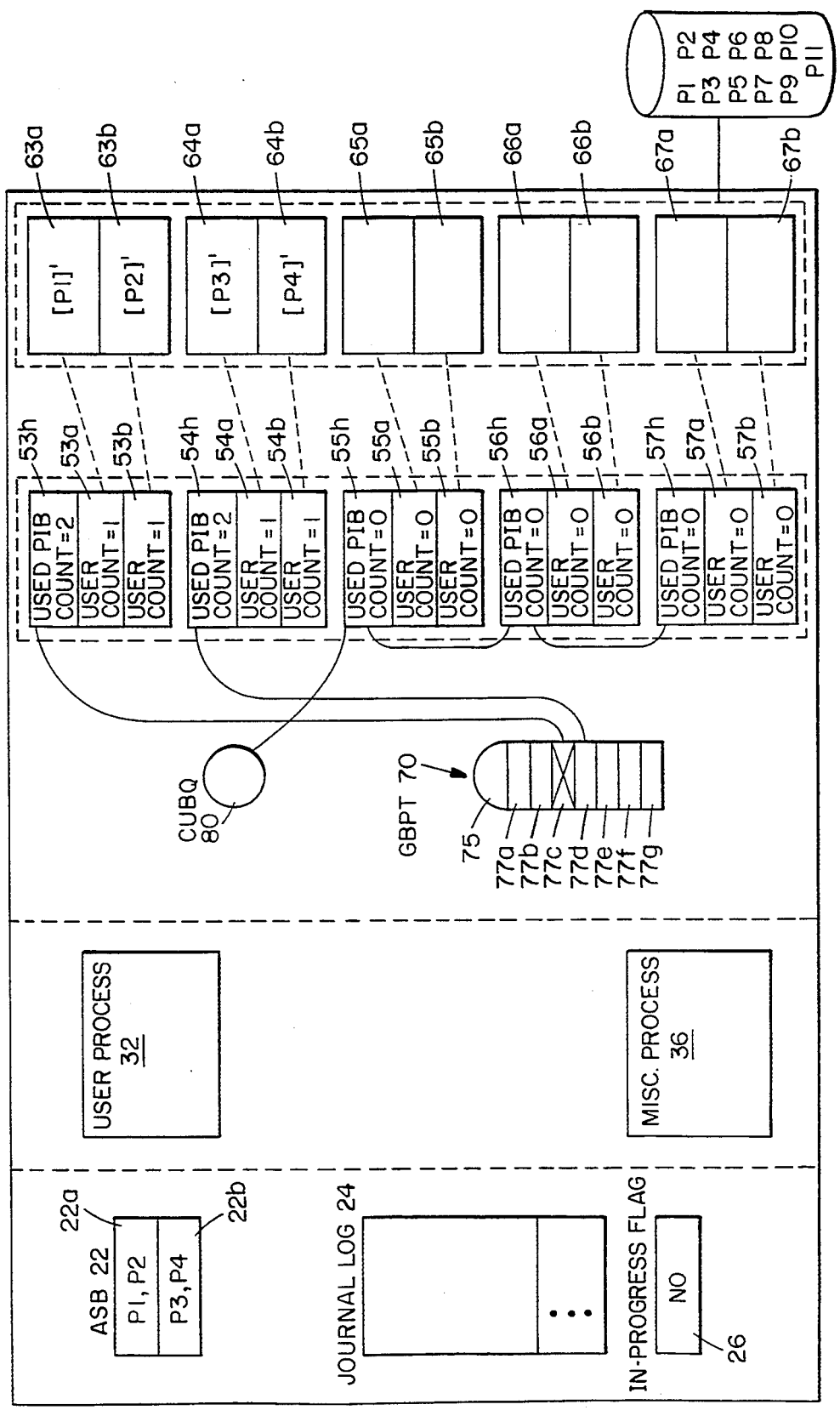
Figure 12C:
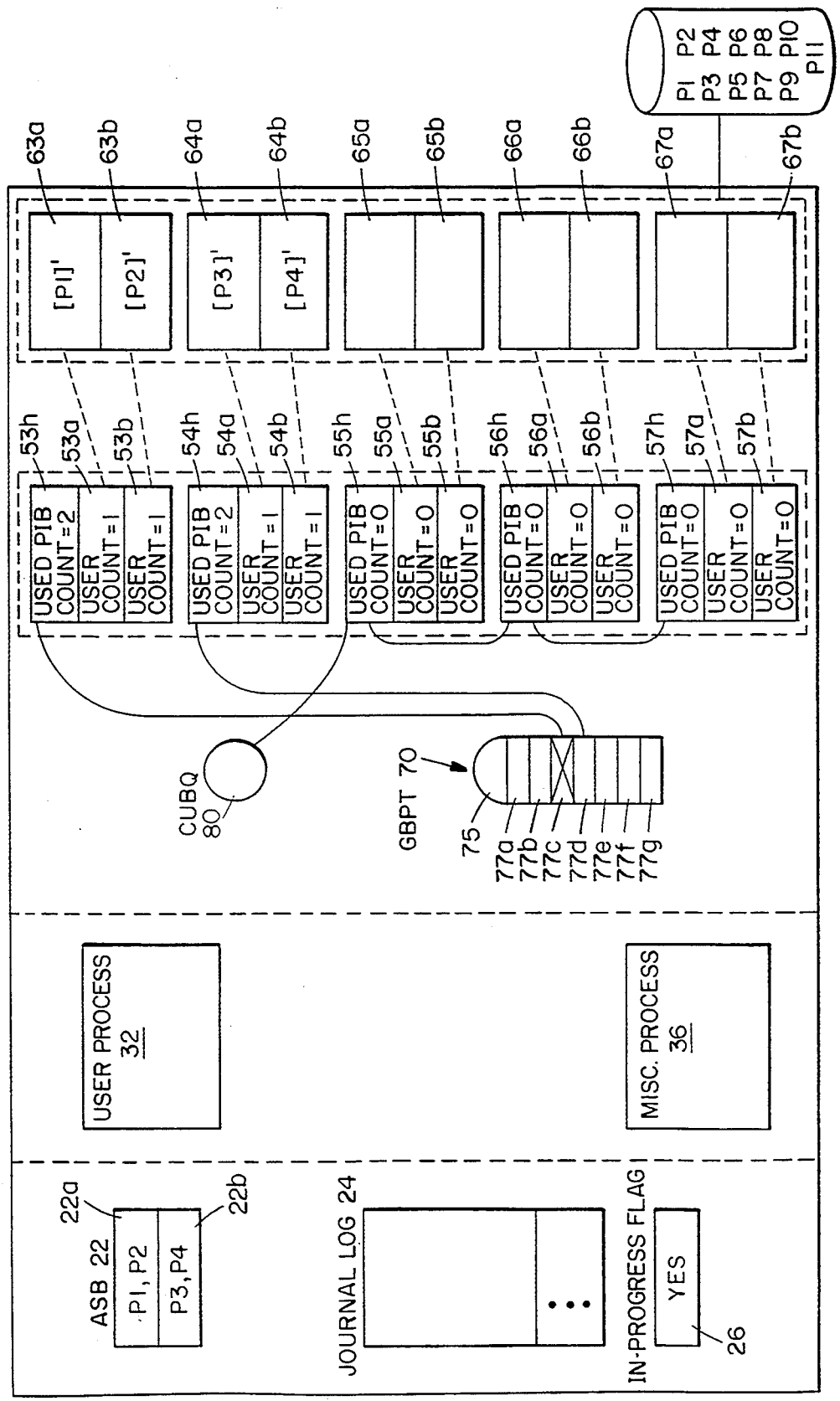
Figure 12D:
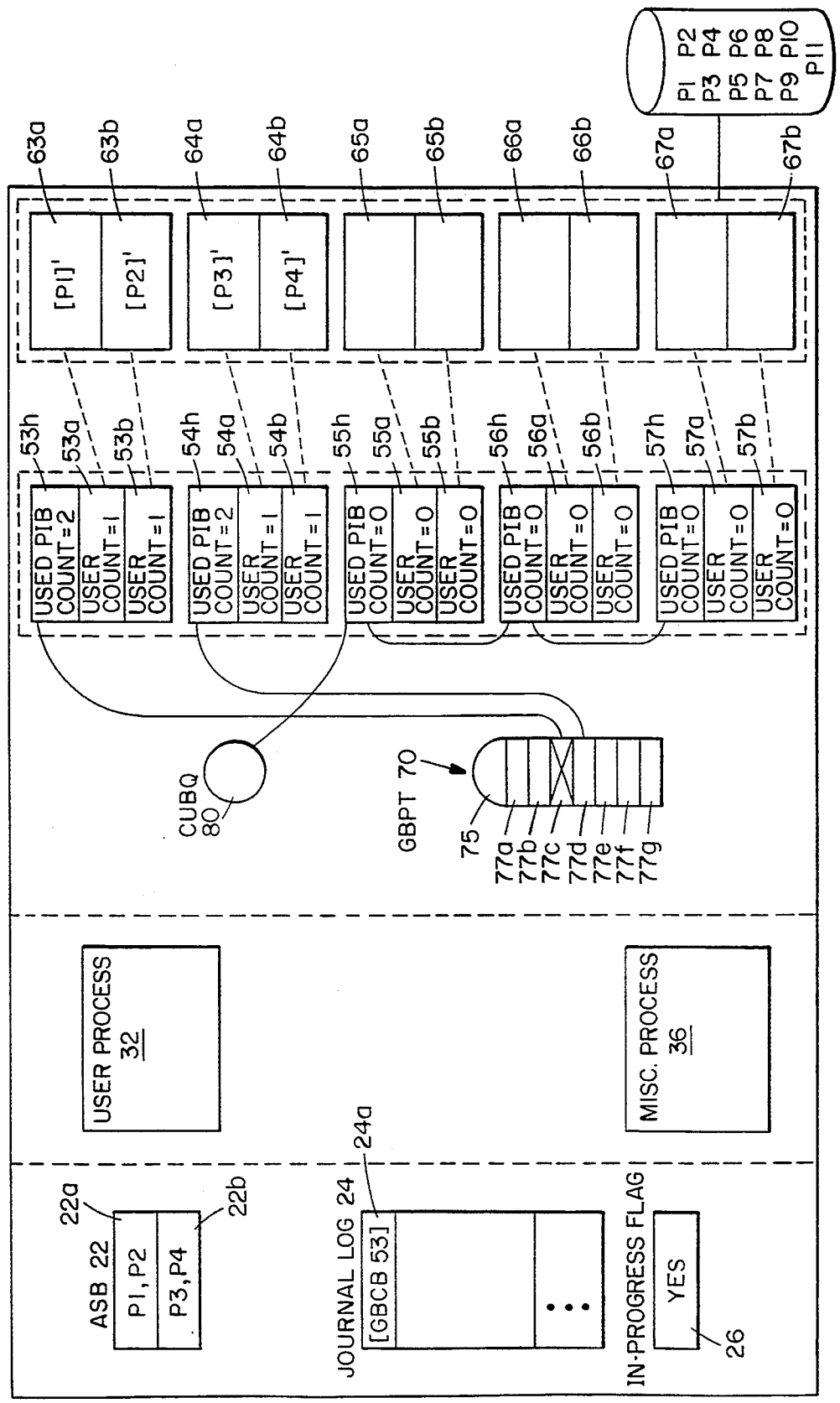
Figure 12E:
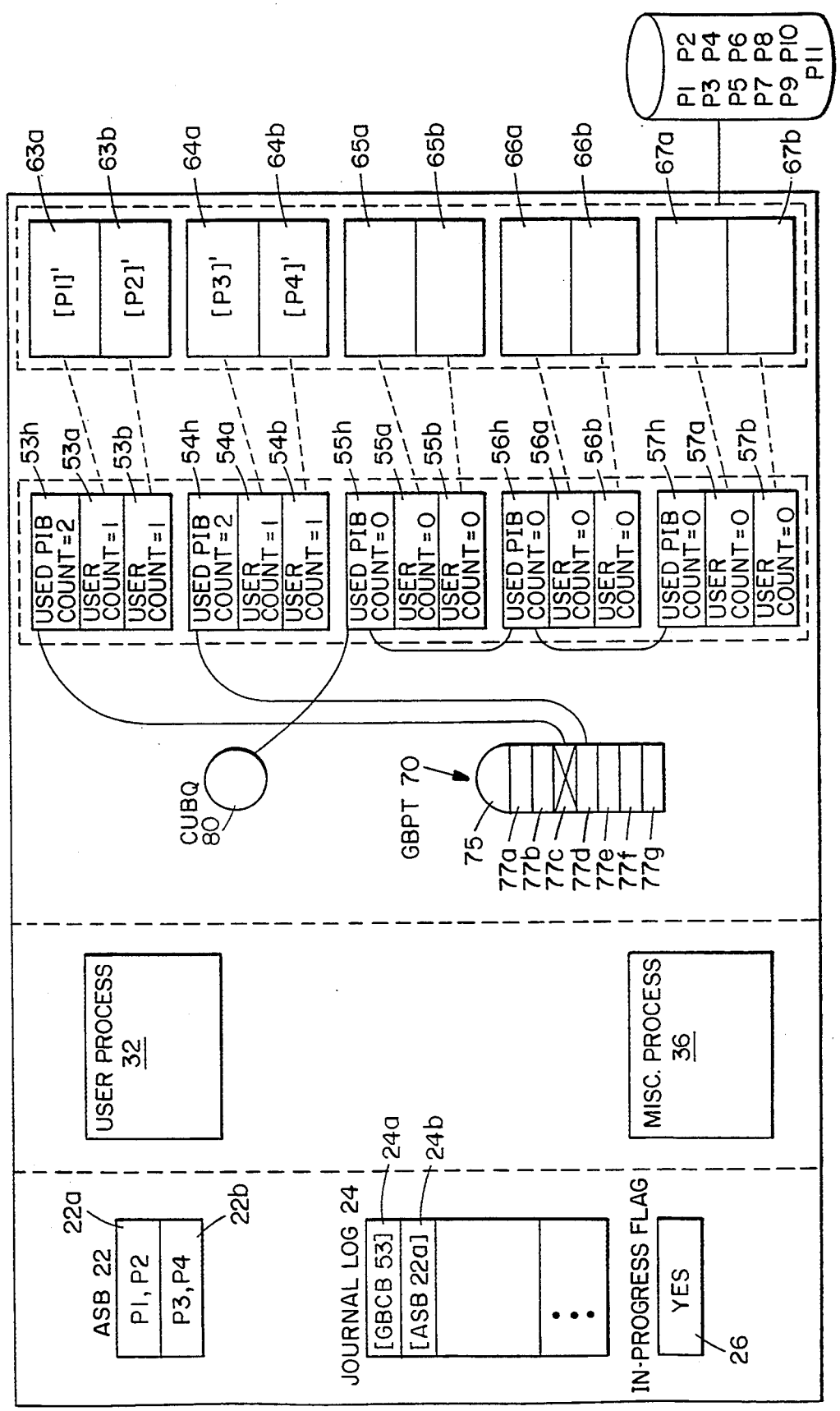
Figure 12F:
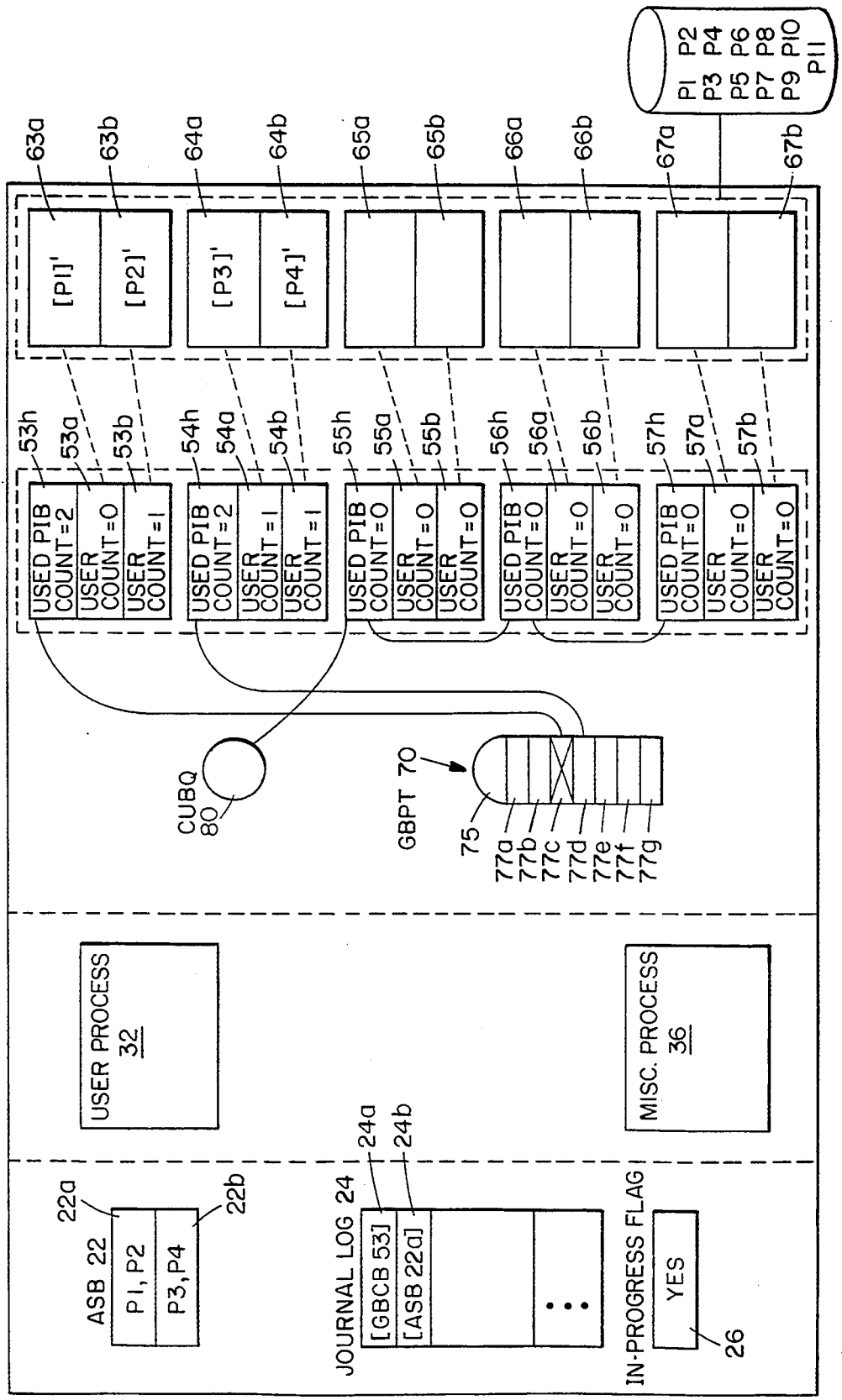
Figure 12G:
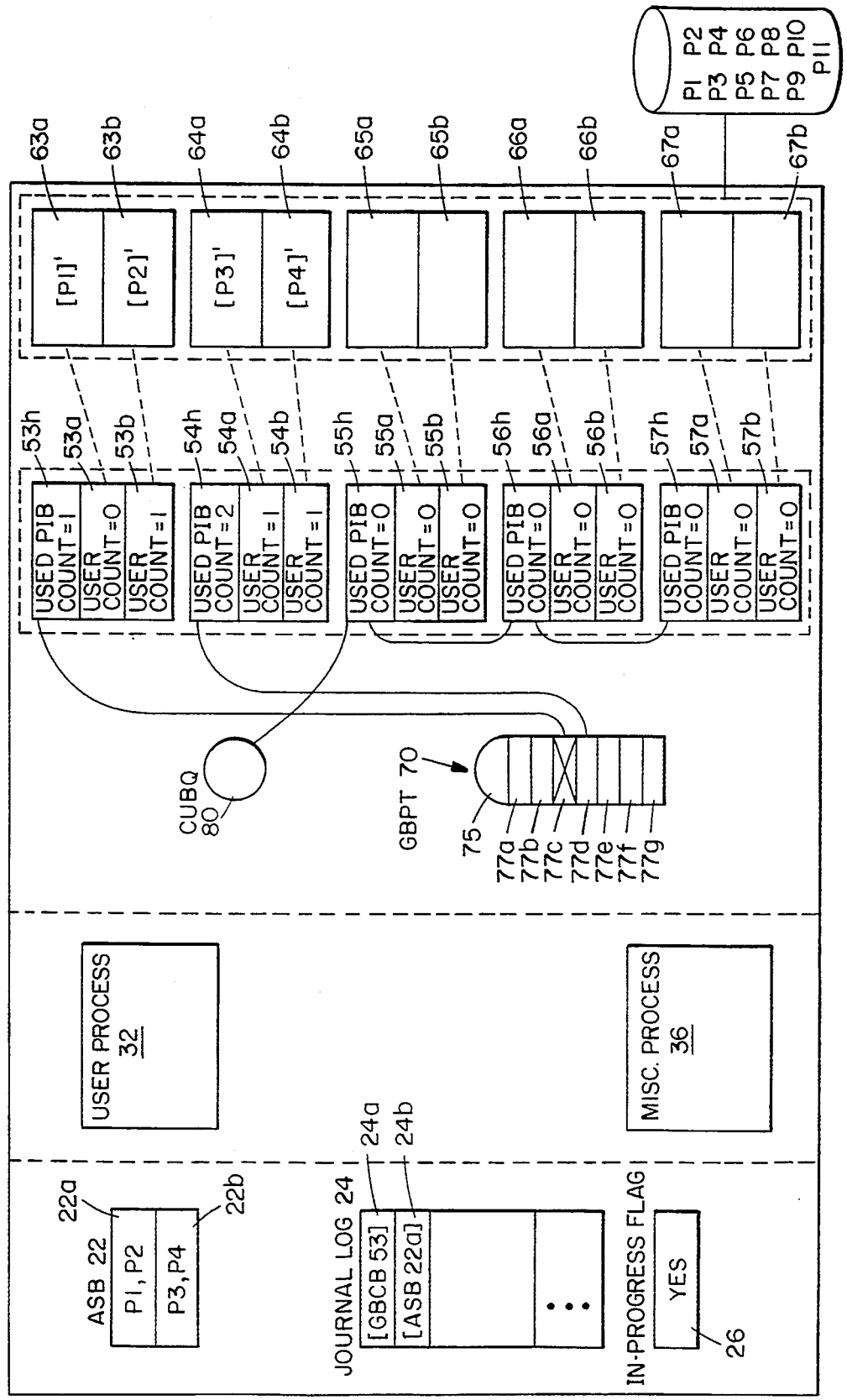
Figure 12H:
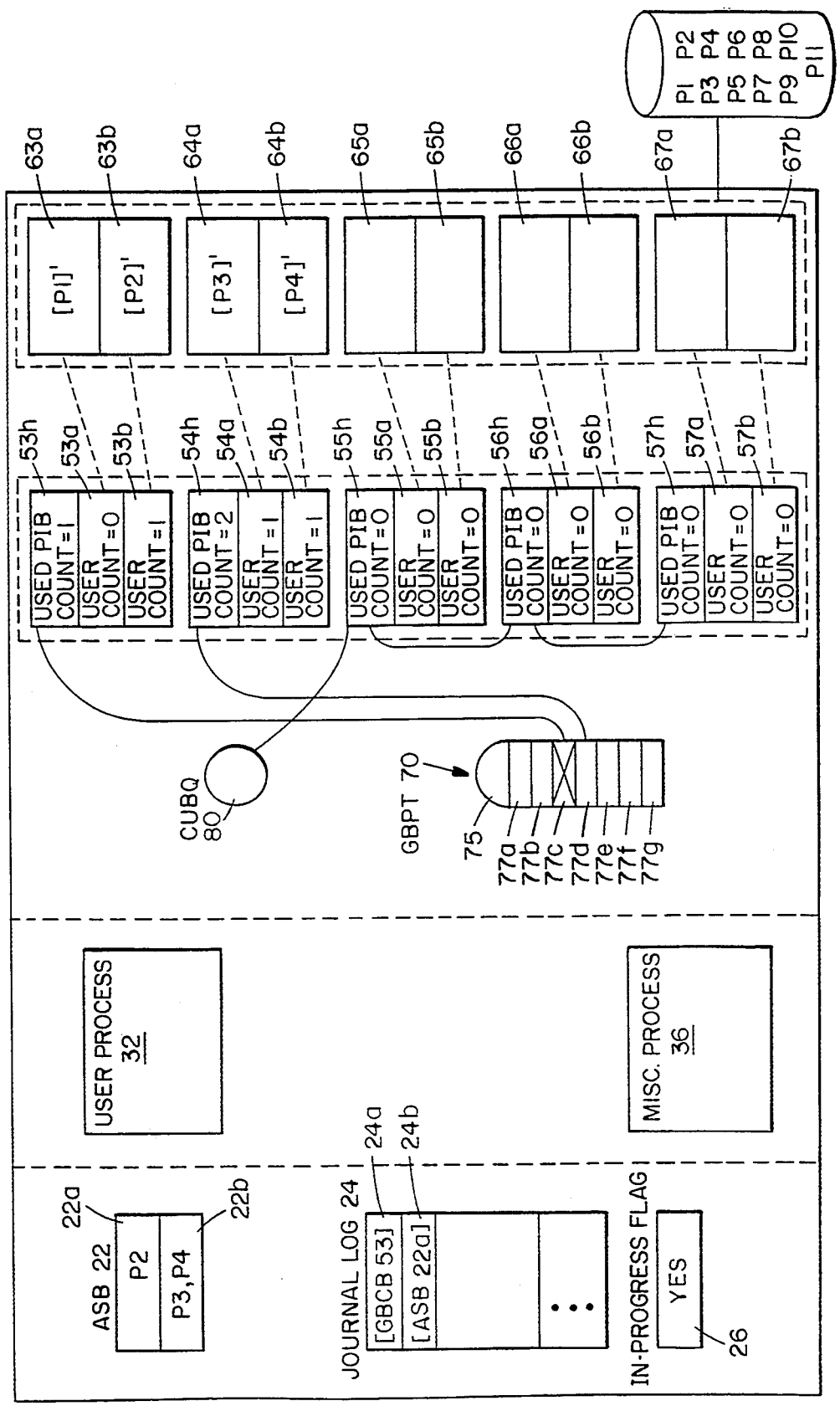
Figure 12:
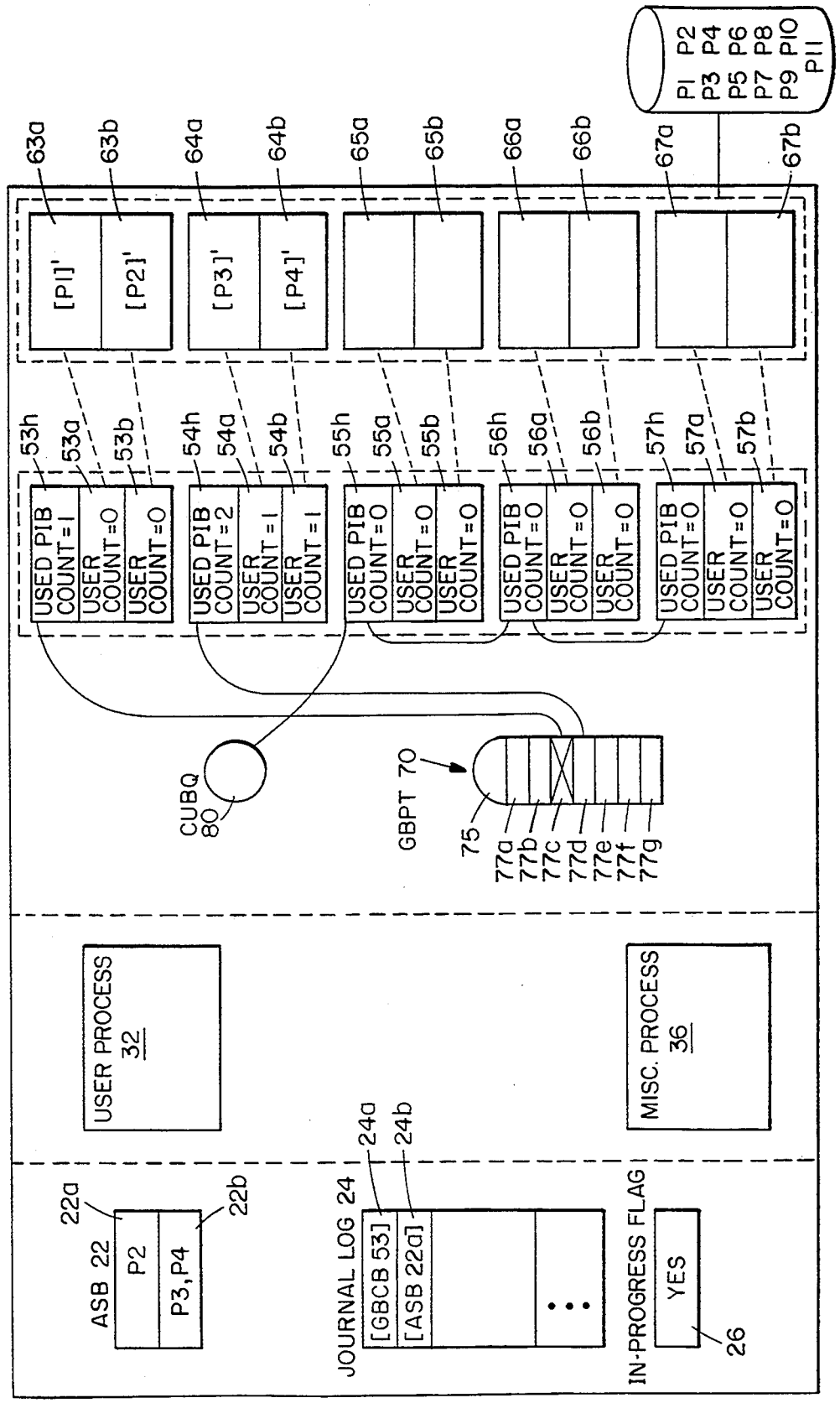
Figure 12J:
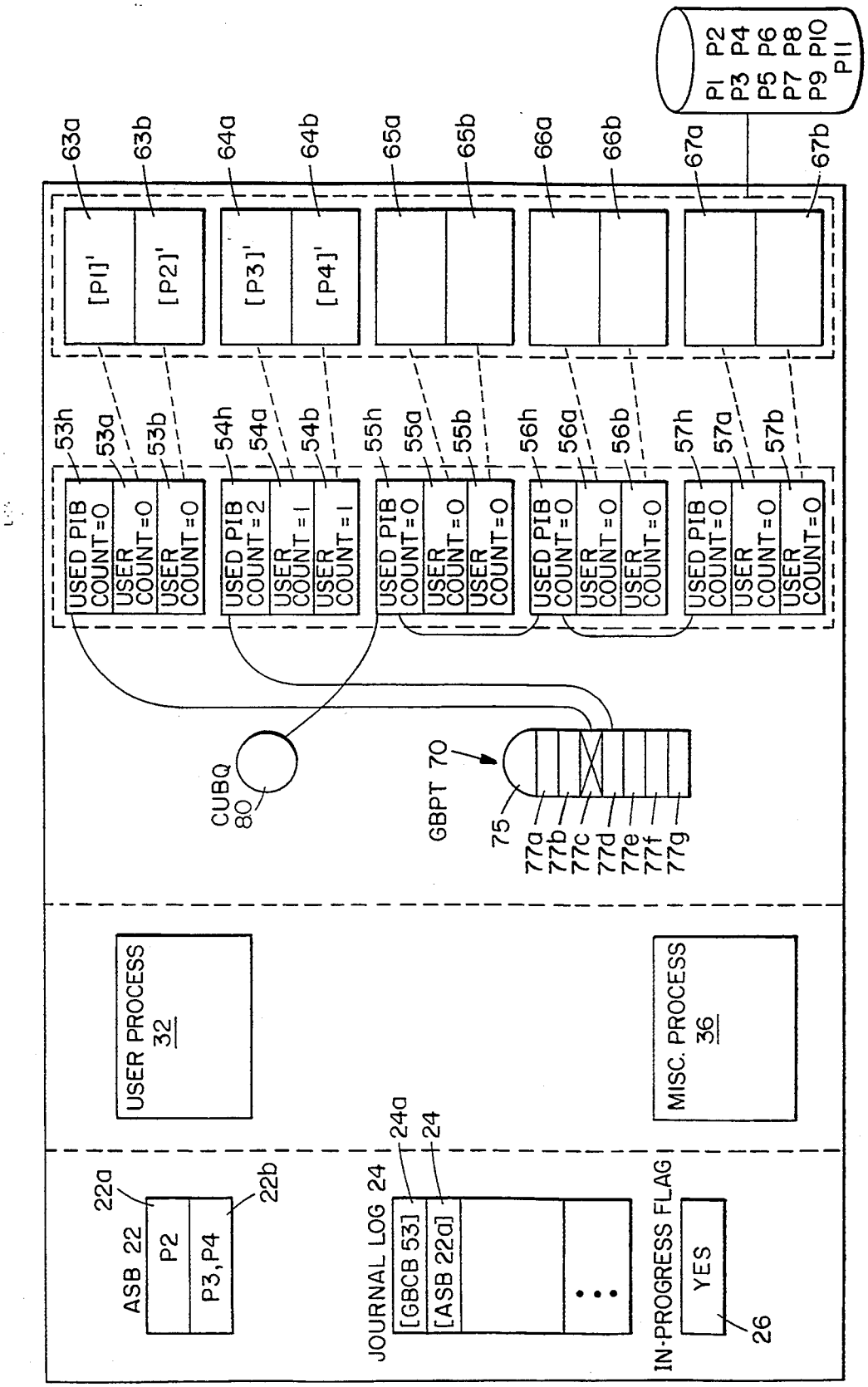
Figure 12K:
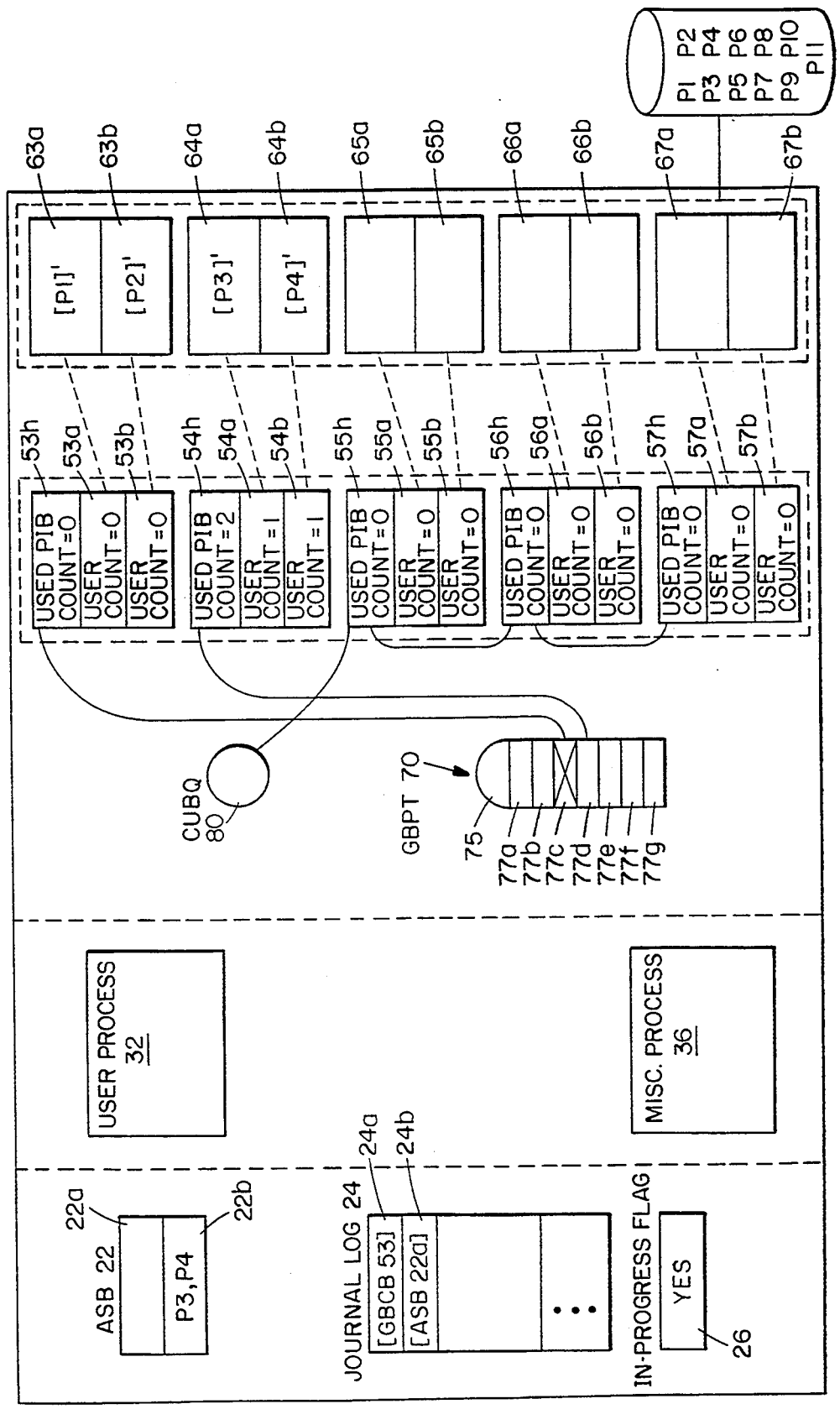
Figure 121:
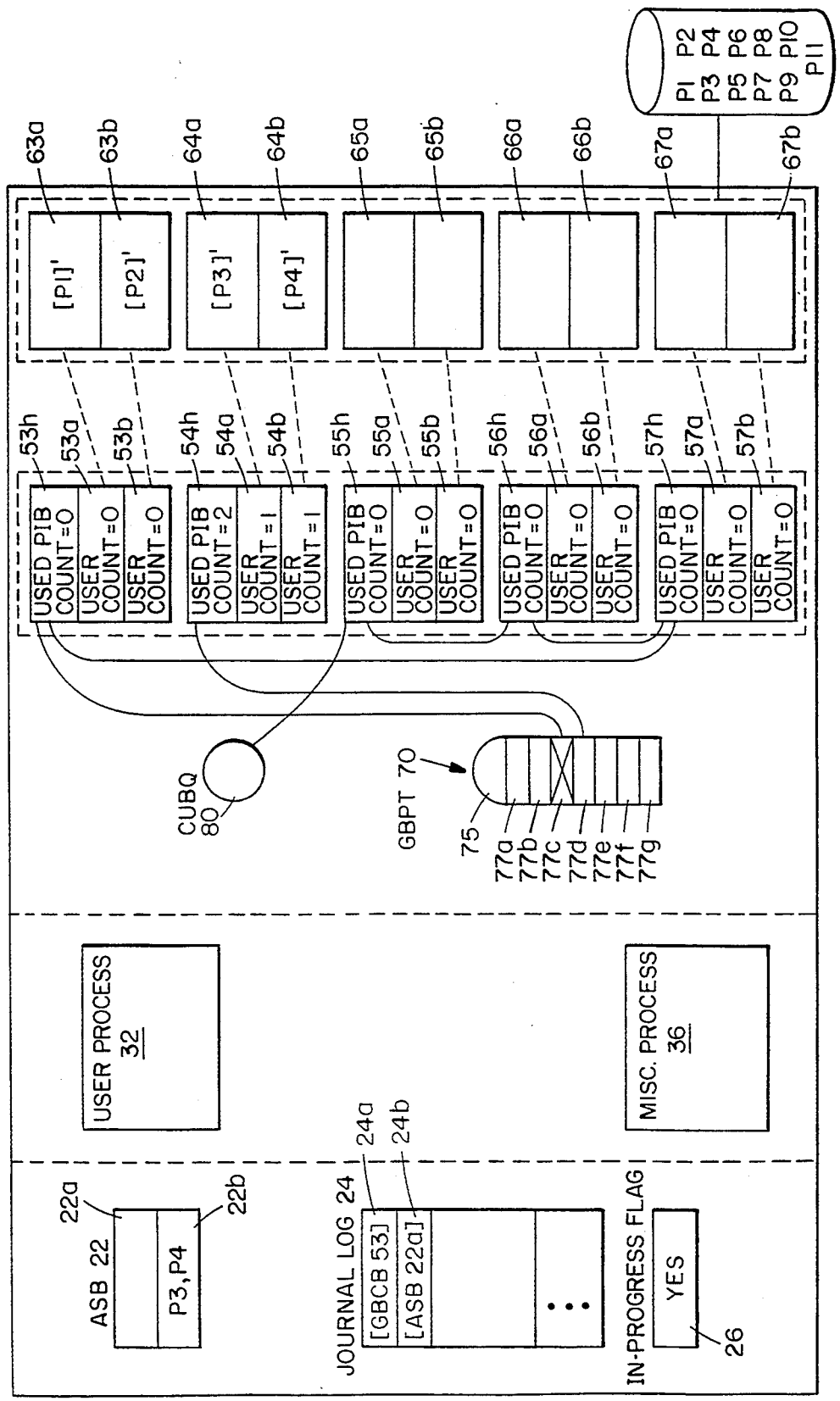
Figure 12M:
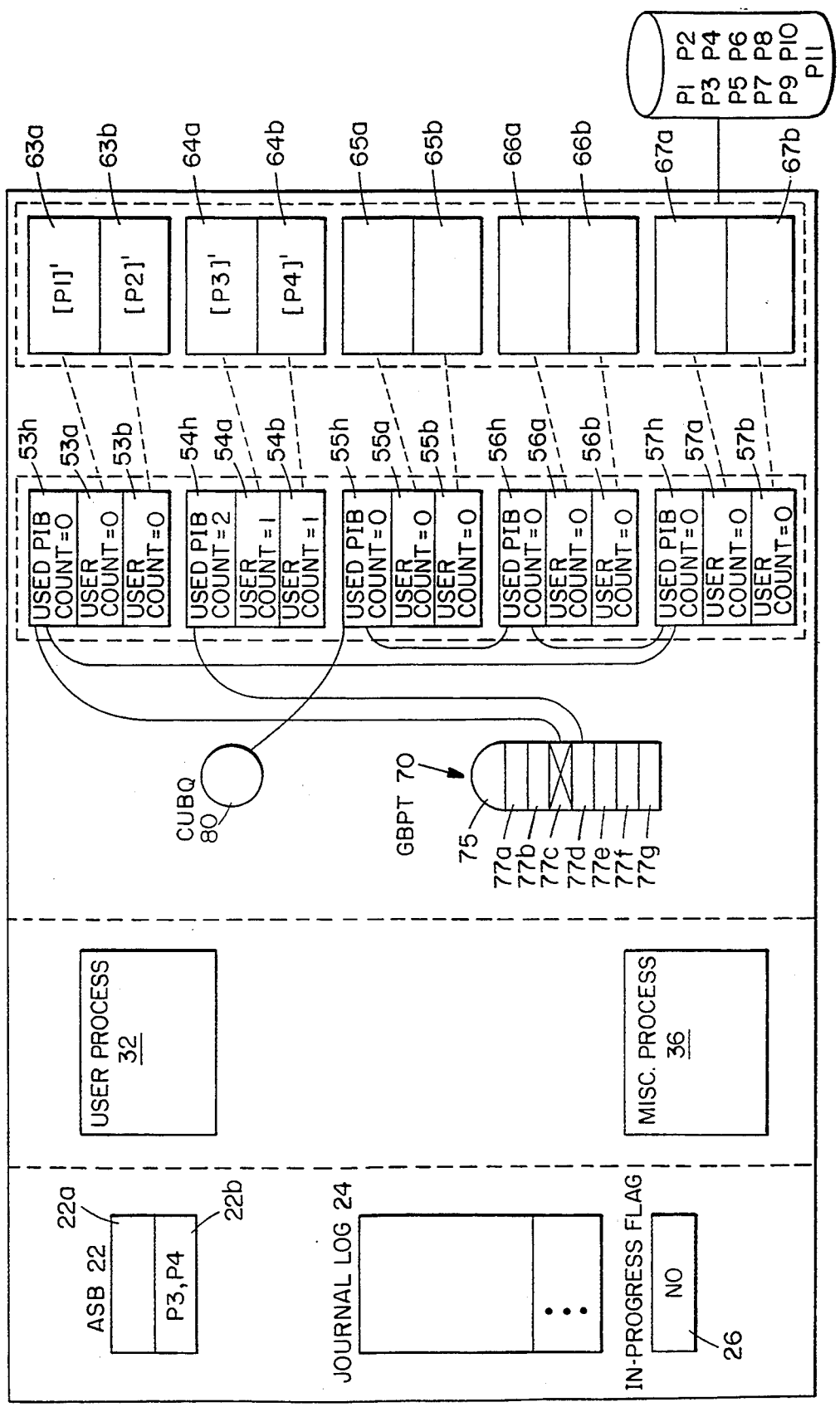
Figure 12N:
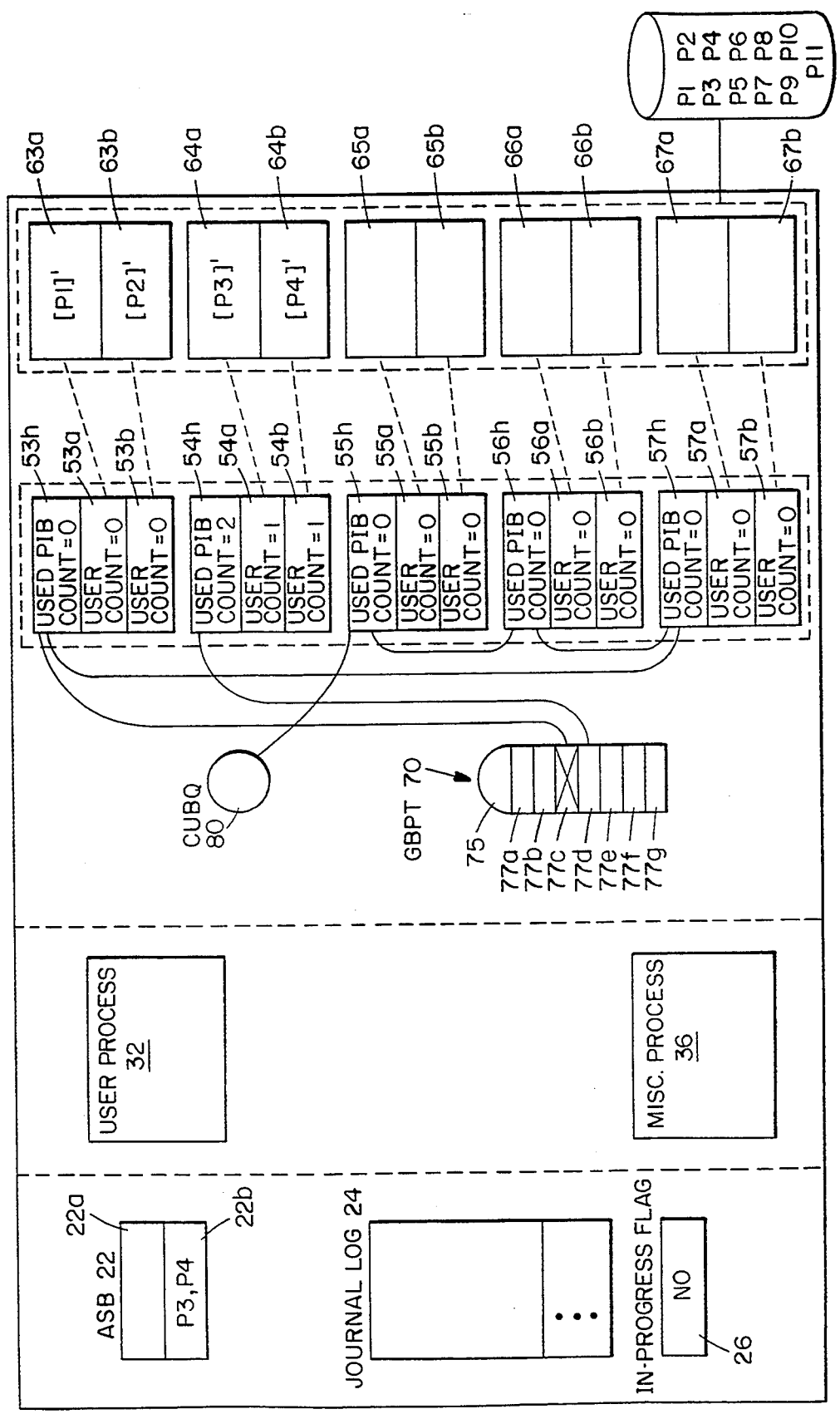

FIGS. 12a–n illustrate the steps of purging 600 a buffer 63 from the user process' 32 allocate set. FIG. 12a illustrates the initial condition. The global buffers 63,64 are occupied by pages referenced by one user process 32. As indicated by the prime character ('), the pages in the global buffer pool 60 have all been updated since they were read from disk 100. For clarity of description, user process 32 has an allocate set sized to hold two buffers. One Allocate Set Block entry 22a refers to the pages in global buffer 63. The other Allocate Set Block entry 22b refers to the pages in global buffer 64. Because the user process' 32 allocate set is full, the user process 32 must purge a buffer from the allocate set before another page can be brought into the allocate set.

In FIG. 12b, the user process 32 determines 605 the buffer slot 77c associated with the pages P1,P2 in global buffer 63 using hash function 75. The user process 32 locks 610 the buffer slot 77c. The lock is indicated by an "X" character.

In FIG. 12c, the user process starts an atomic modification transaction 615. The atomic modification transaction is indicated by setting the in-progress flag 26 to "Yes".

In FIG. 12d, the user process 32 journals 620 the Global Buffer Control Block 53 associated with the global buffer 63 storing the pages being purged P1,P2. As indicated by the brackets, the contents of the Global Buffer Control Block 53 are physically logged. Note that the queue fields 5h1,5h2 are not logged.

In FIG. 12e, the user process 32 journals 625 the Allocate Set Block entry 22a that refers to the pages P1,P2 in the global buffer 63 being purged from the allocate set. As indicated by the brackets, the contents of the Allocate Set Block entry 22a are physically logged.

Once the Global Buffer Control Block 53 and the Allocate Set Block entry 22a have been journaled, the user process 32 begins the atomic updates necessary to remove the pages P1,P2 in the global buffer 63 from the allocate set. The user process 32 loops through 655 each page in the global buffer 63, beginning with the first 630 page P1.

FIGS. 12f–i illustrate the removal of page P1 from the allocate set of user process 32. The user process determines the page number of the first page in the global buffer 63 from the page number field 5a4 in the first CLIST 53a of Global Buffer Control Block 53. The user process 32 compares 635 the page number from the CLIST field 5a4 with the Allocate Set Block entry 22a. Because page P1 is the first page in the global buffer 63, the page number in the CLIST field 5a4 will match a page referenced in the allocate set of the user process 32, namely page P1. In FIG. 12f, the user count field 5a5 in the CLIST 53a is decremented 640 from 1 to 0. Because the user count field 5a5 now indicates that the page P1 is no longer being used by any user, the used page-in-buffer count field 5h6 must also be decremented to indicate one less used page in the buffer 63. FIG. 12g illustrates the decrementing of the page-in-buffer count from 2 to 1. In FIG. 12h, the reference to page P1 is removed 645 from the user process' 32 Allocate Set Block entry 22a. The user process 32 now looks to the next page 650 in the global buffer 63.

FIGS. 12j–l illustrate the removal of page P2 from the allocate set of user process 32. The user process determines the page number of the next page in the global buffer 63 from the page number field 5b4 in the next CLIST 53b of Global Buffer Control Block 53. The user process 32 compares 635 the page number from the CLIST field 5b4 with the Allocate Set Block entry 22a. Because page P2 is the next page in the global buffer 63, the page number in the CLIST field 5b4 will match a page referenced in the allocate set of the user process 32, namely page P2. In FIG. 12j, the user count field 5b5 in the CLIST 53b is decremented 640 from 1 to 0. Because the user count field 5b5 now indicates that the page P2 is no longer being used by any user, the used page-in-buffer count field 5h6 must also be decremented to indicate one less used page in the buffer 63. FIG. 12k illustrates the decrementing of the page-in-buffer count from 1 to 0. In FIG. 12l, the reference to page P2 is removed 645 from the user process' 32 Allocate Set Block entry 22a. The user process 32 now looks for the next page 650 in the global buffer 63.

Because there are no more pages in the global buffer 63, the loop ends 655. Because all pages for this global buffer 63 have been removed from the allocate set, the entire Allocate Set Block entry 22a is initializes 660 to clear all remaining references to the global buffer 63. The Allocate Set Block entry 22a can now be reused to include pages into the user process' 32 allocate set.

Because the used page-in-buffer count 5h6 is equal to zero, no users have a page P1,P2 stored in the global buffer 63 in their allocate sets. Thus, the pages P1,P2 are candidates to be swapped to disk. Therefore, the Global Buffer Control Block 53 is inserted 665 onto the tail of the Candidate Unused Buffer Queue 80, as shown in FIG. 12m. Note that the Global Buffer Control Block 53 remains linked to the buffer slot 77c because the pages P1,P2 are in memory. A user looking for page P1 or P2 will find the page in the global buffer 63, instead of accessing the disk 100.

The user process has now completed the atomic update. In FIG. 12n, the user process ends the atomic modification transaction 670. Ending the atomic modification transaction causes the in-progress flag 26 to be set to "No" and the journal log 24 to be cleared. Finally, the user process releases the lock 675 on the buffer slot 77c in FIG. 12o.

Figure 12O:
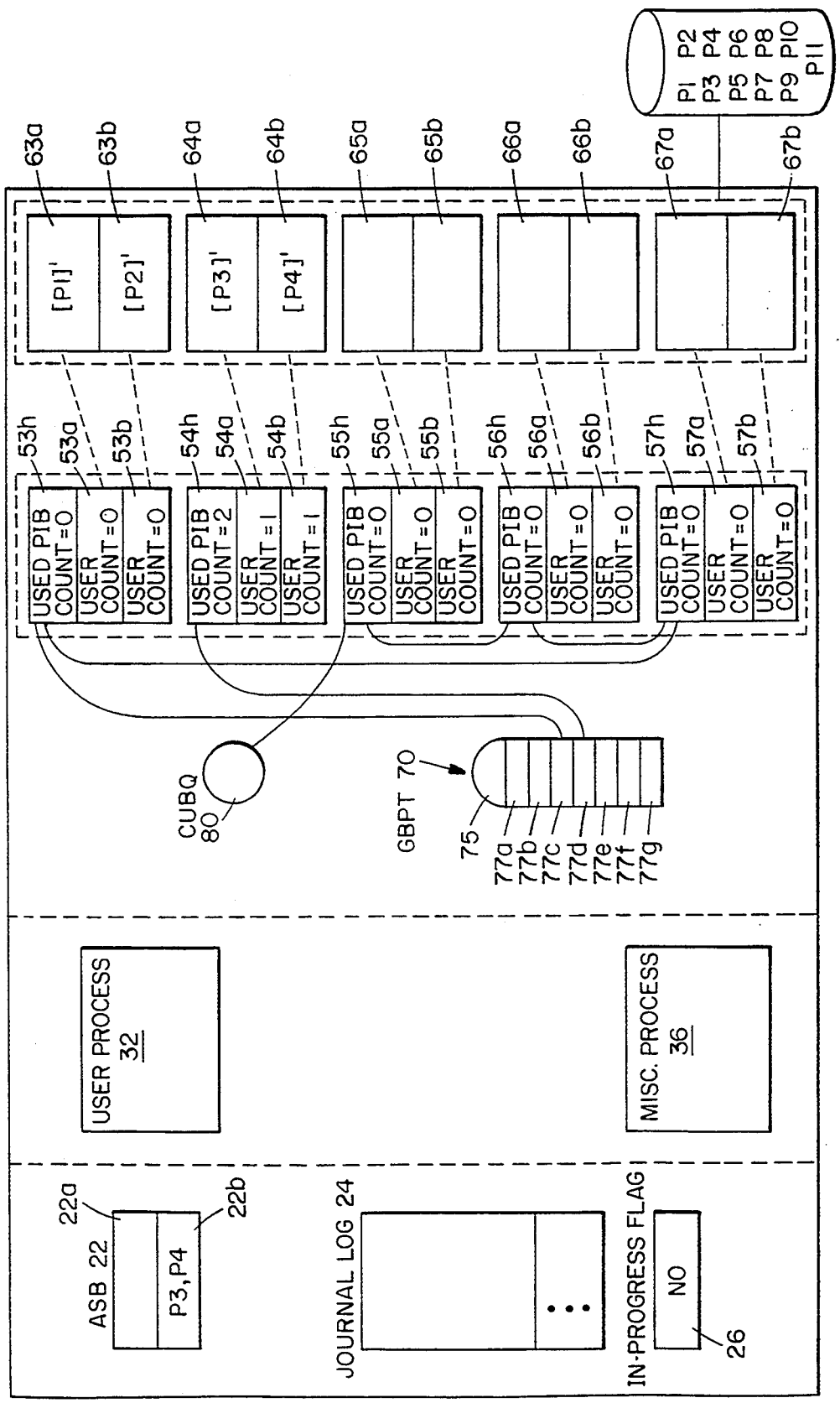
Figure 13A:
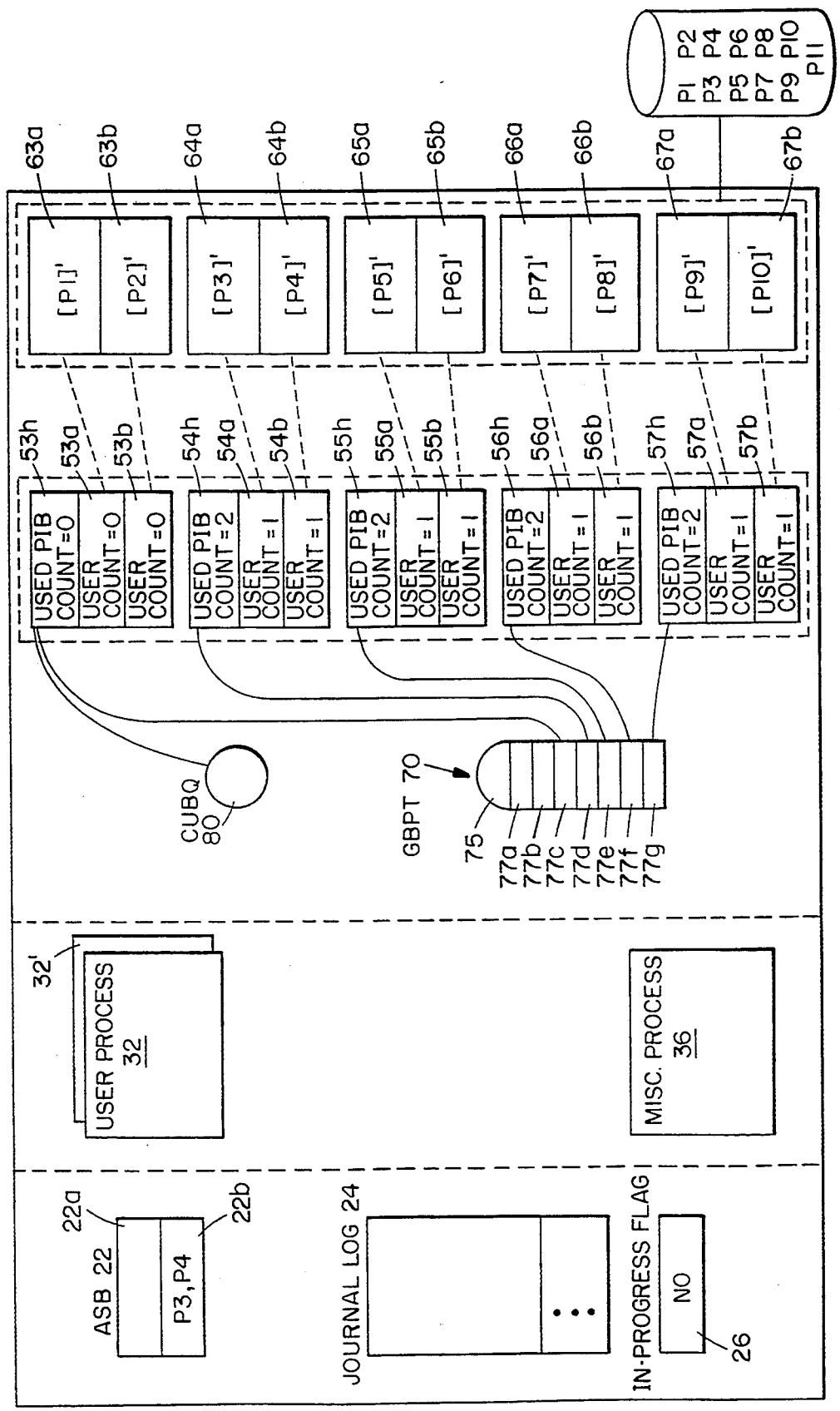

FIGS. 13a–q logically continues from FIG. 12o, and illustrate the user process including page P11 from disk 100 into the allocate set when the global buffer pool 60 is full. The user process 32 has an empty Allocate Set Block entry 22a. The initial condition is illustrated in FIG. 13a.

In FIG. 13a, there is at least one other user process 32′ with the remaining pages from the global buffer pool 60 in that other user process' 32′ allocate set. If only one other user process 32′ is active, as shown in FIG. 12a, then that user process' 32′ allocate set is sized to hold three buffers. For clarity of description, the other user process 32′ maintains its allocate set throughout this example.

Figure 13B:
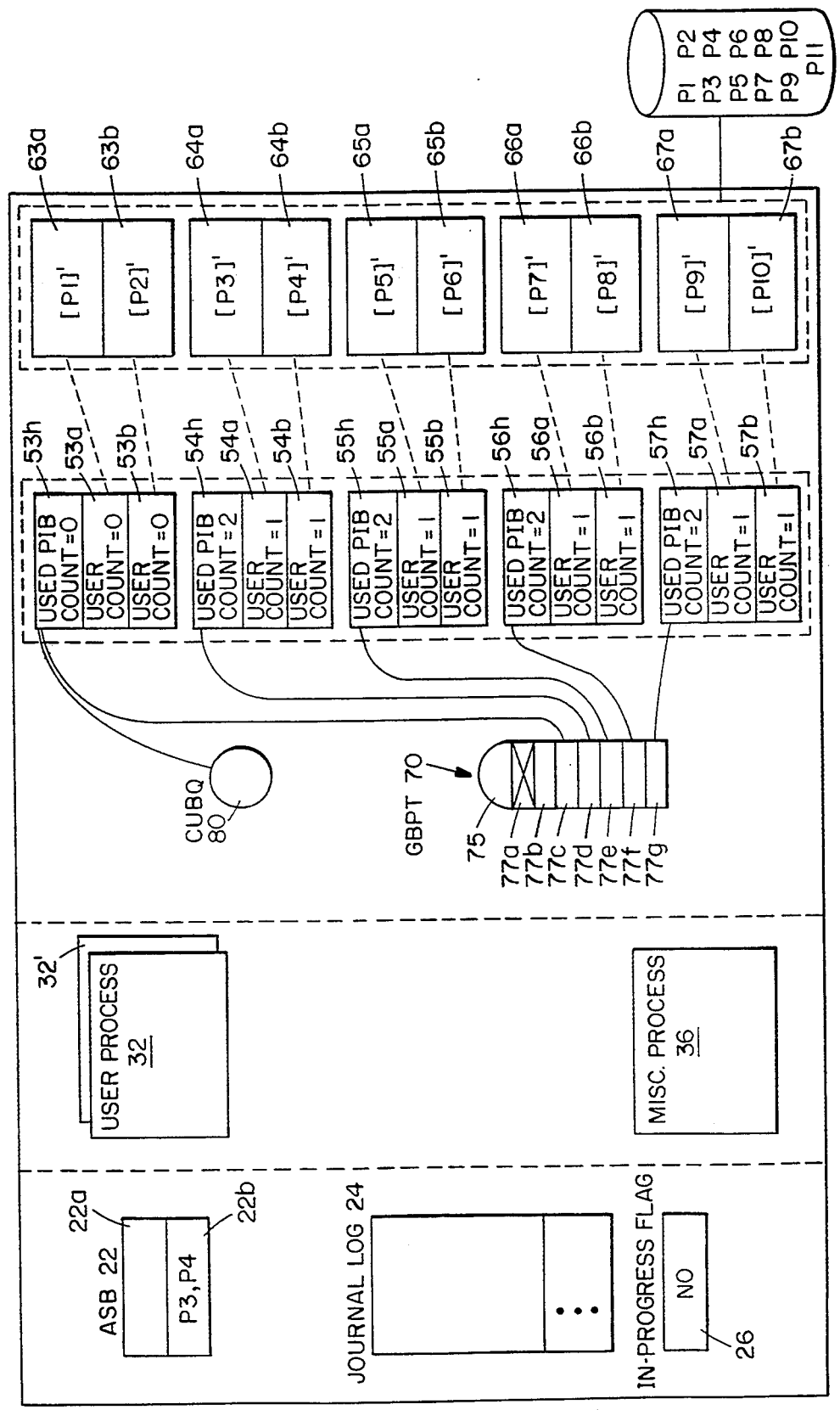

In FIG. 13b, the user process 32 has hashed 402 to the buffer slot 77a corresponding to the target page P11 to be fetched into the allocate set. The buffer slot 77a is locked 404 by the user process 32. The user process then searches 406 the buffer slot 77a queue for the Global Buffer Control Block 50 associated with target page P11. As illustrated, there are no Global Buffer Control Blocks 50 on the buffer slot 77a queue. Therefore, the target page P11 is not in the global buffer pool 60.

Because the target page P11 is not in 408 the global buffer pool 60, a victim Global Buffer Control Block 50 must be found so the target page P11 can be read into the global buffer pool 60. FIGS. 13c–g illustrate the steps of selecting a victim Global Buffer Control Block, as outlined in FIG. 9.

Figure 13C:
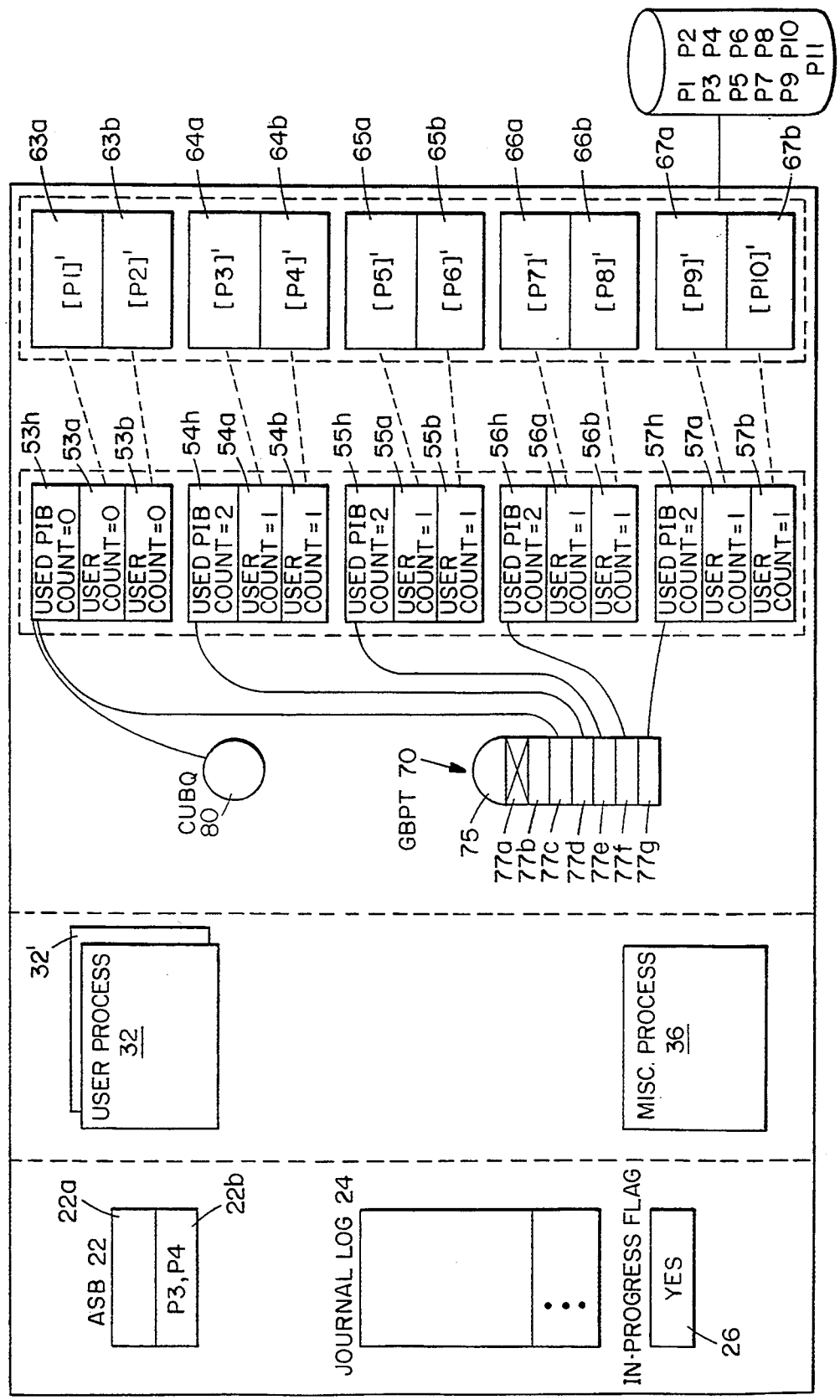
Figure 13D:
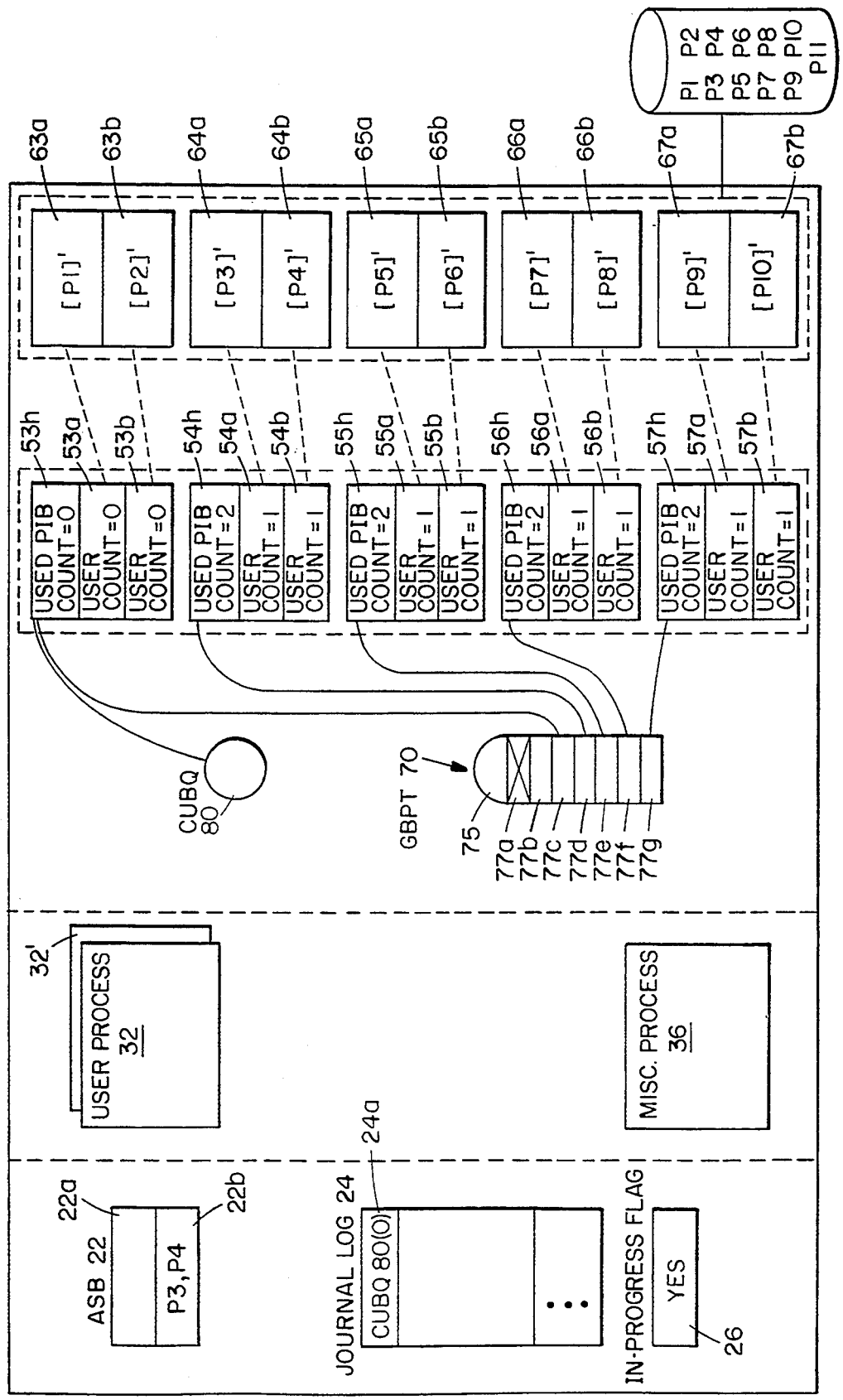
Figure 13E:
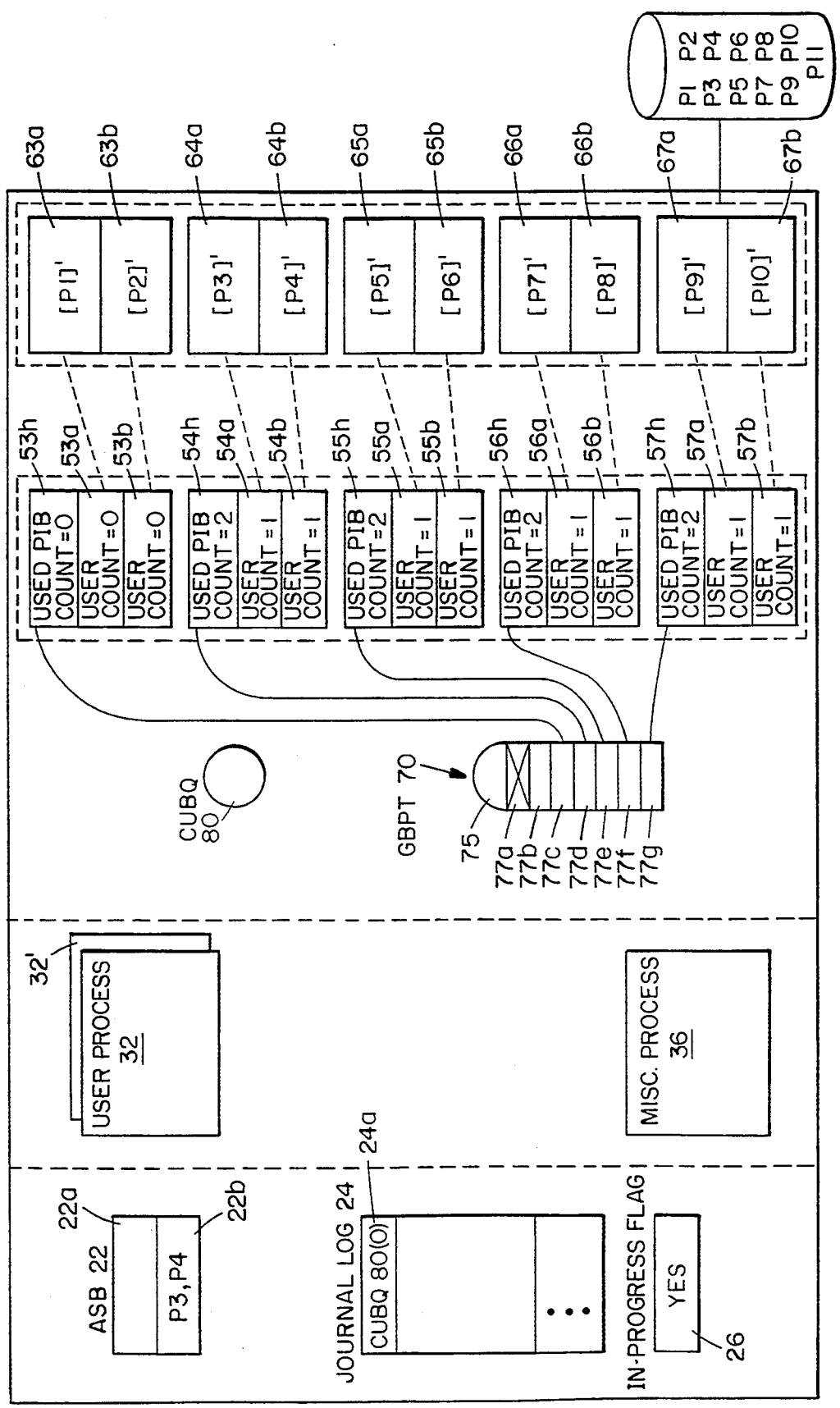
Figure 13F:
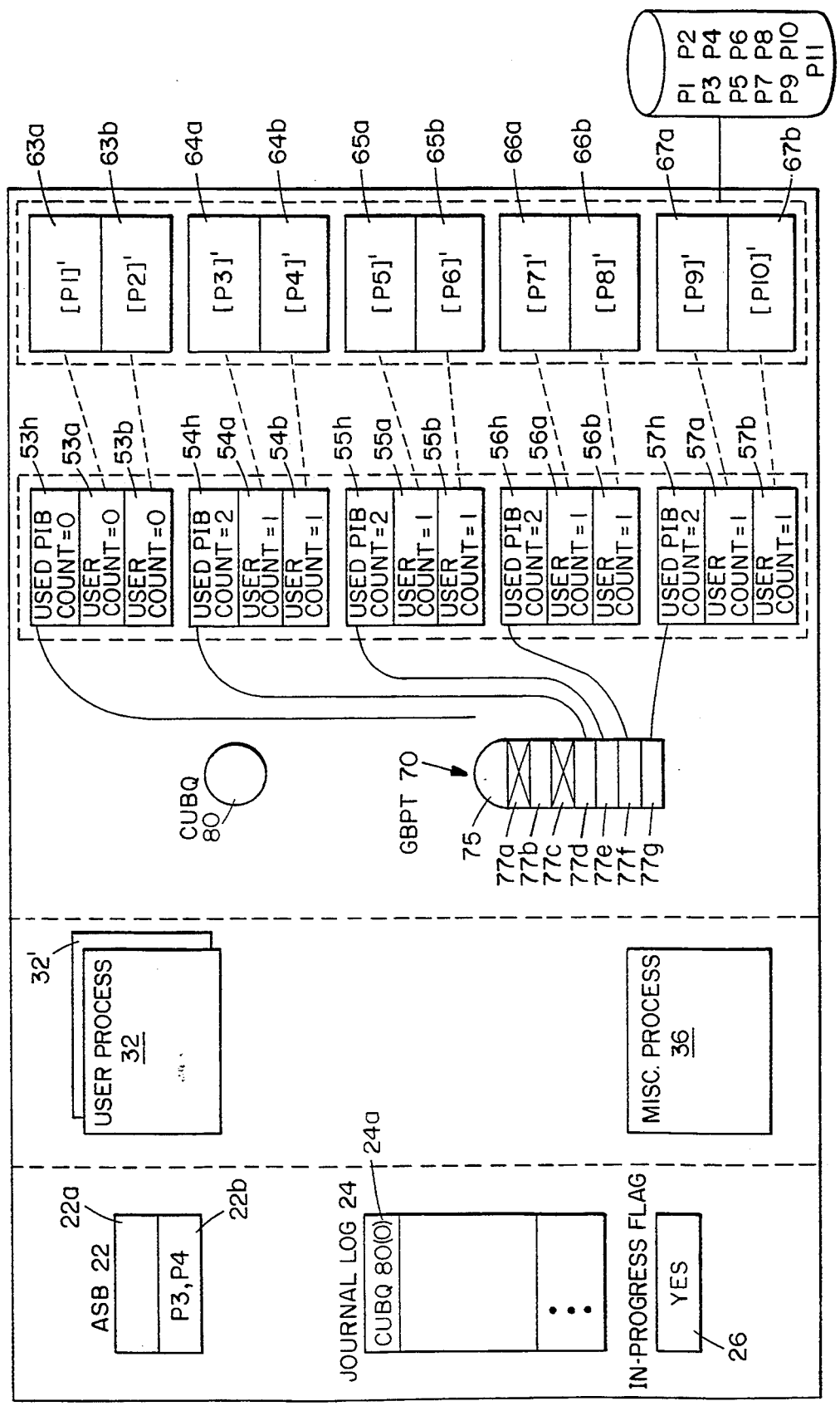

In FIG. 13c, the user process 32 has started 505 an atomic modification transaction, which causes the in-progress flag 26 to be set. In FIG. 13d, the user process has journaled 510 the Candidate Unused Buffer Queue 80 into a journal block 24a as a queue operation. Note that the entry address is zero. In FIG. 13e, a Global Buffer Control Block 53 is removed 515 from the head of the Candidate Unused Buffer Queue 80. The entry address of the removed Global Buffer Control Block 53 is obtained from the removal operation and stored directly 520 into the journal block 24a. The user process 40 checks 525 the used page-in-buffer count field 5h6 of the removed Global Buffer Control Block 53 to verify that the associated global buffer 63 is not being used by any process. Because the used page-in-buffer count 5h6 is zero, the removed Global Buffer Control Block 53 is a genuine candidate. FIG. 13f shows the buffer slot 77c for the removed Global Buffer Control Block 53 being locked 530 by the user process 32. The user process 32 again checks 535 the used page-in-buffer field 5h6 in the Global Buffer Control Block 53 to verify that the count has remained equal to zero. Because the global buffer 63 is still not being used by any users, the Global Buffer Control Block 53 becomes the selected victim 545.

If a victim is found, then the user process 32 will continue doing more atomic modification transactions. Because more modifications will occur, the user process 32 does not end the atomic modification transaction. After the victim Global Buffer Control Block 53 is found, the new page can be brought into the global buffer 63. Note that the user process has two buffer slots 77a,77c locked, a source buffer slot 77c and a target buffer slot 77a.

Figure 13G:
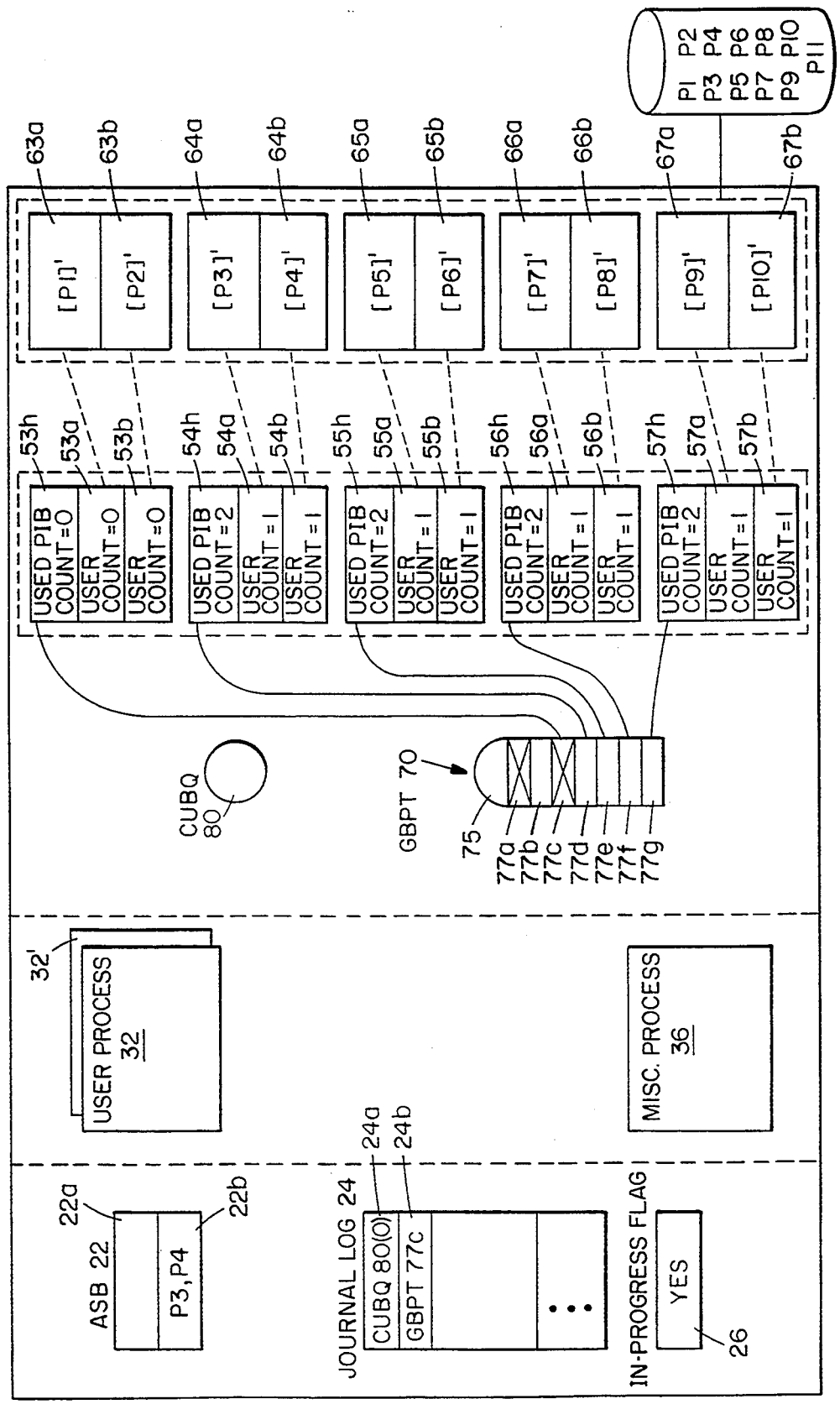
Figure 13H:
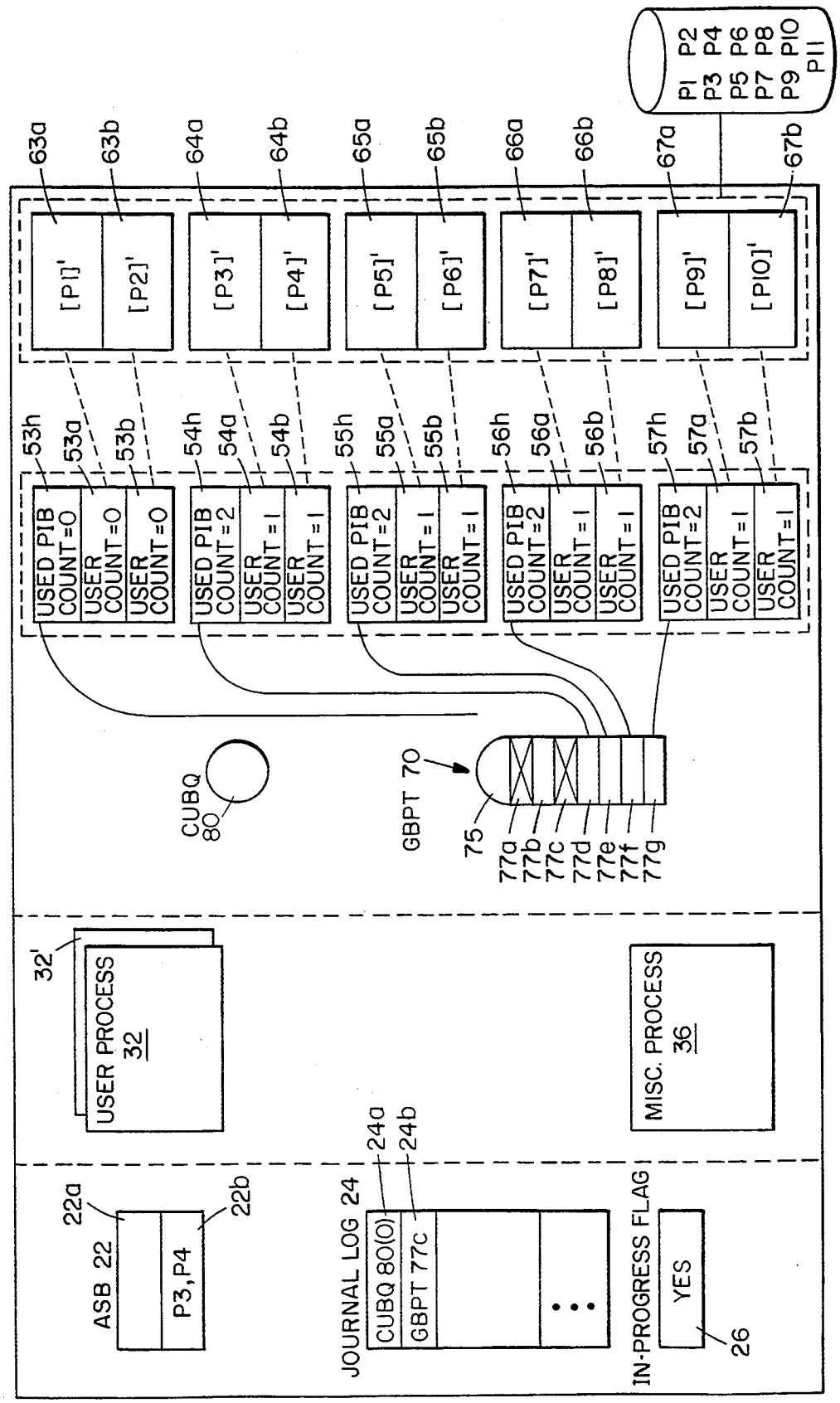
Figure 13I:
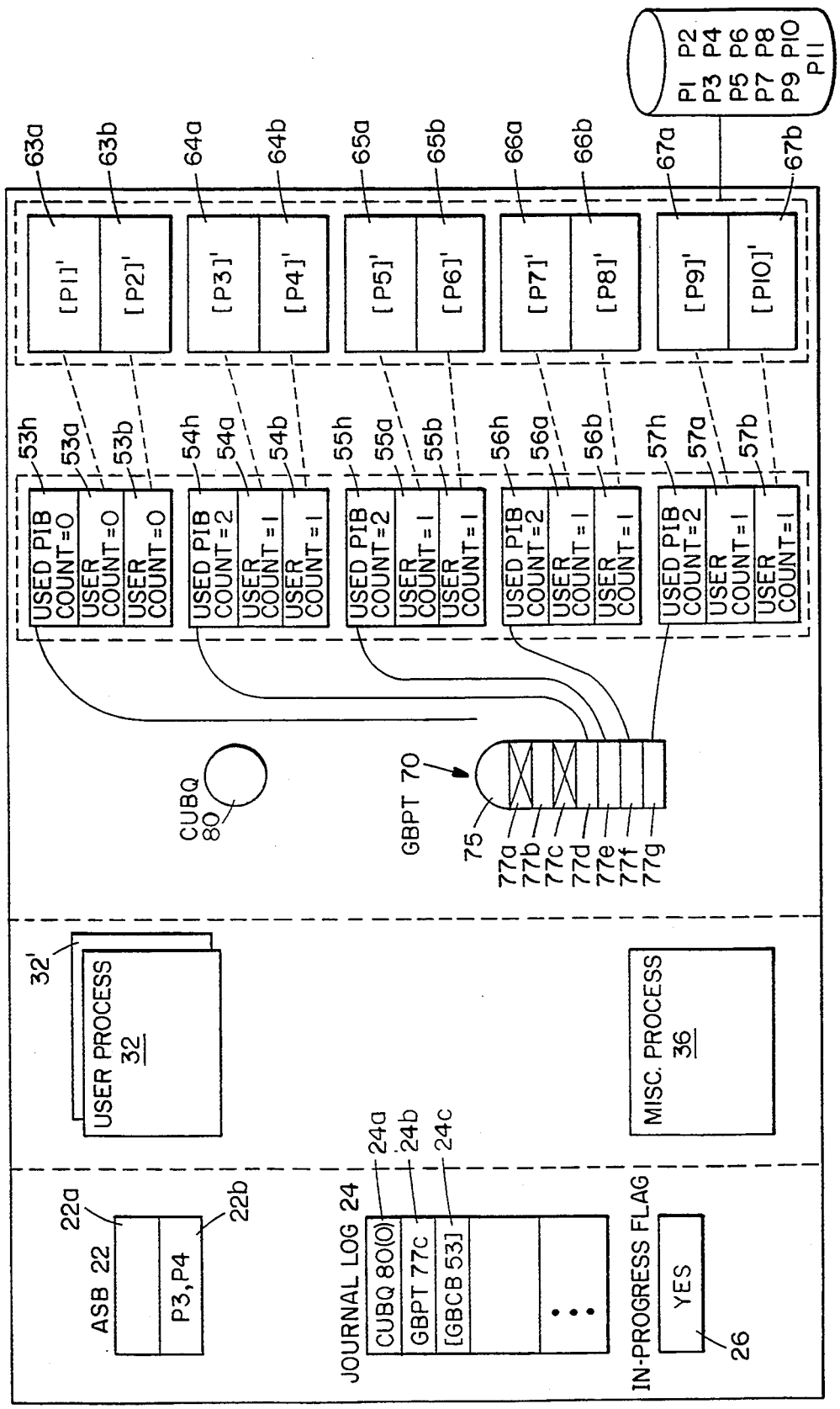

FIG. 13g illustrates the action of journaling in a journal block 24b the removal 416 of the victim Global Buffer Control Block 53 from the source buffer slot 77c. The queue removal is journaled as an operation function. FIG. 13h illustrates the actual removal 418 of the victim Global Buffer Control Block 53 from the source buffer slot 77c. FIG. 13i illustrates the journaling 420, in journal block 24c, of the removed Global Buffer Control Block 53. The contents of the Global Buffer Control Block 53 are physically journaled. As with all physical journaling of Global Buffer Control Blocks 50, the queue fields 5h1,5h2 are not journaled. The user process is now ready to swap the pages P1,P2 in the global buffer 63 to disk 100.

Figure 13J:
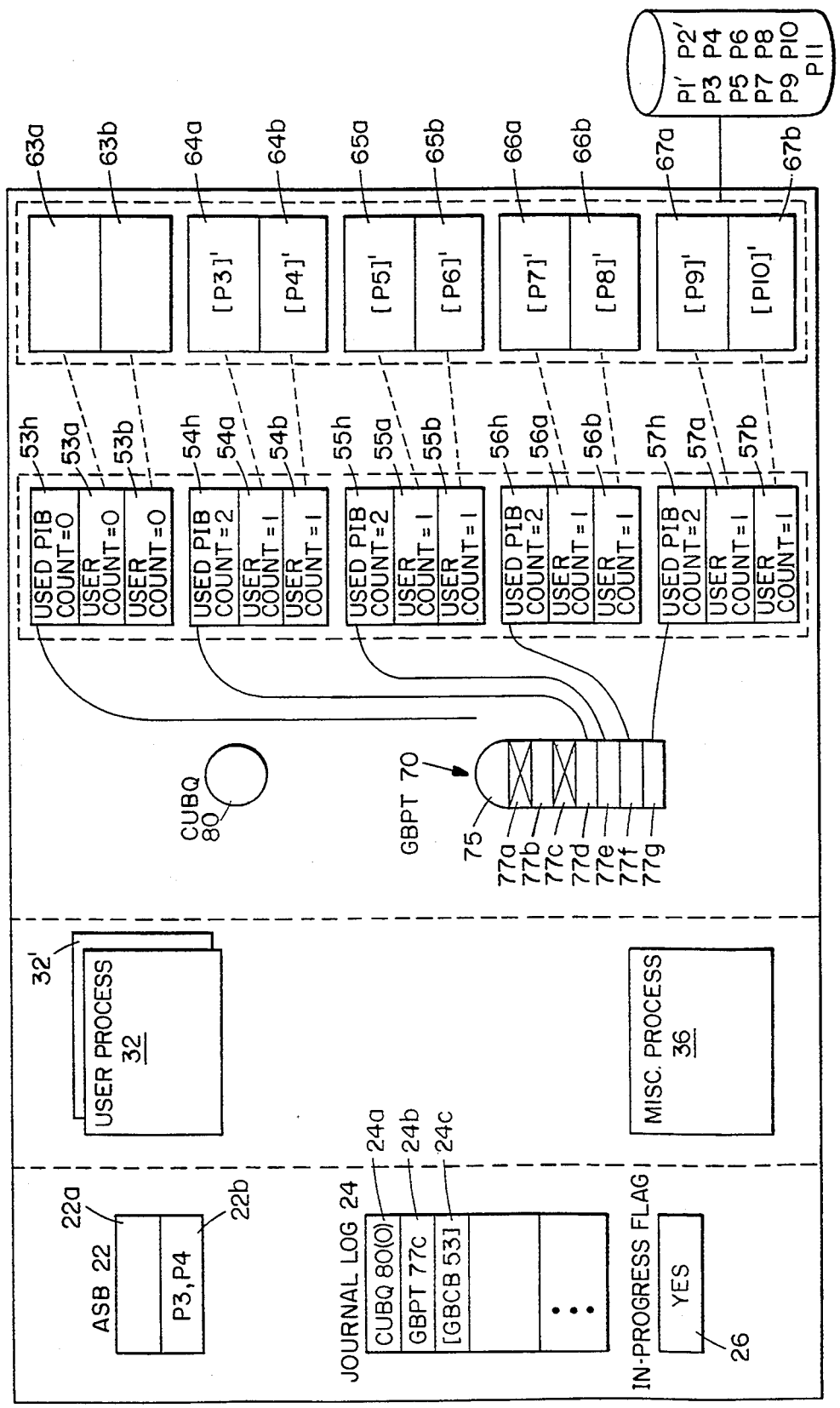

FIG. 13j illustrates the swapping of the updated pages P1,P2 to disk 100. The user process 32 initializes 422 header fields 5h of the Global Buffer Control Block 53. The user process 32 also initializes 424 the CLIST fields 5a,5b of the Global Buffer Control Block 53. The Global Buffer Control Block 53 no longer contains any references to the former data stored in the associated global buffer 63.

Figure 13K:
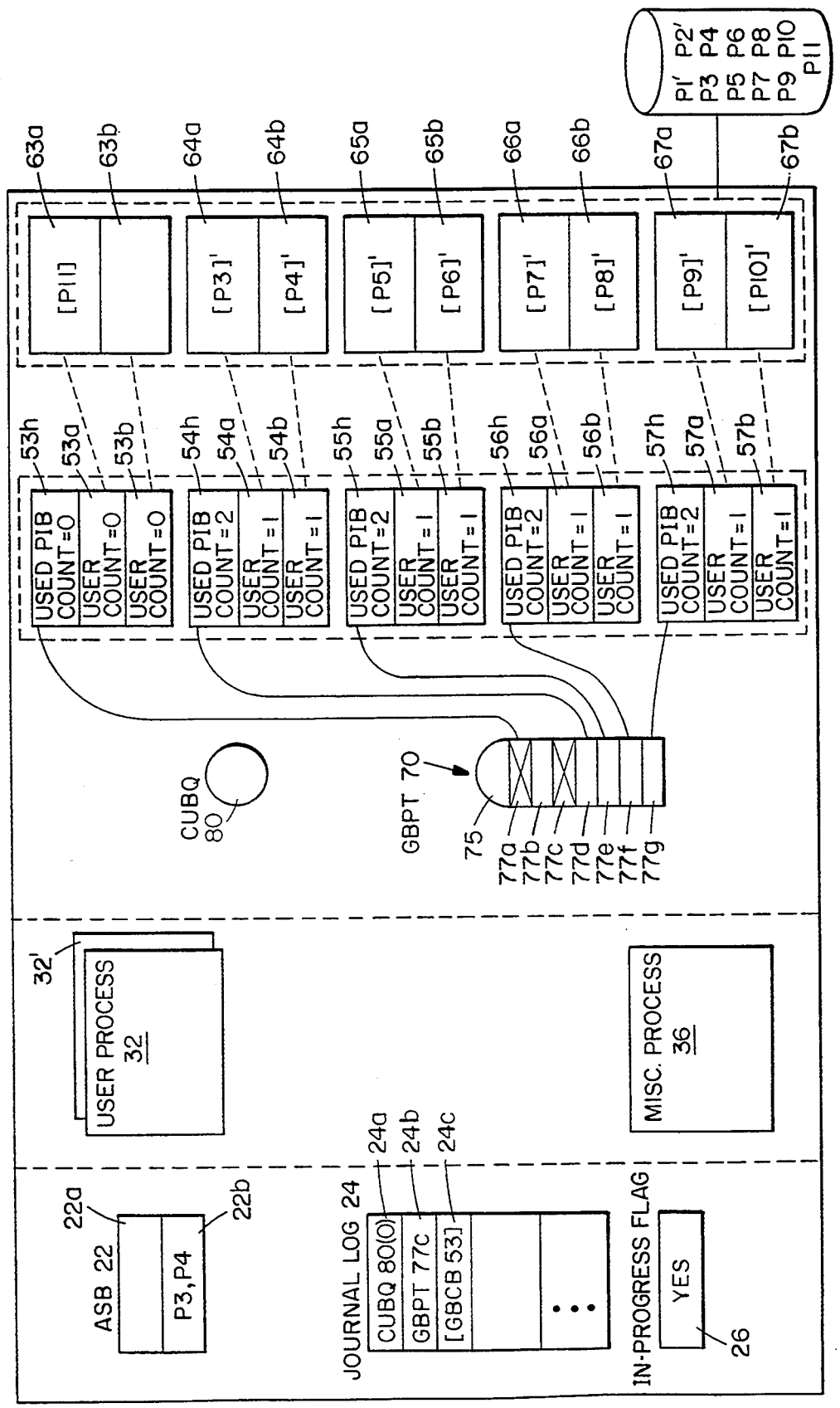
Figure 131:
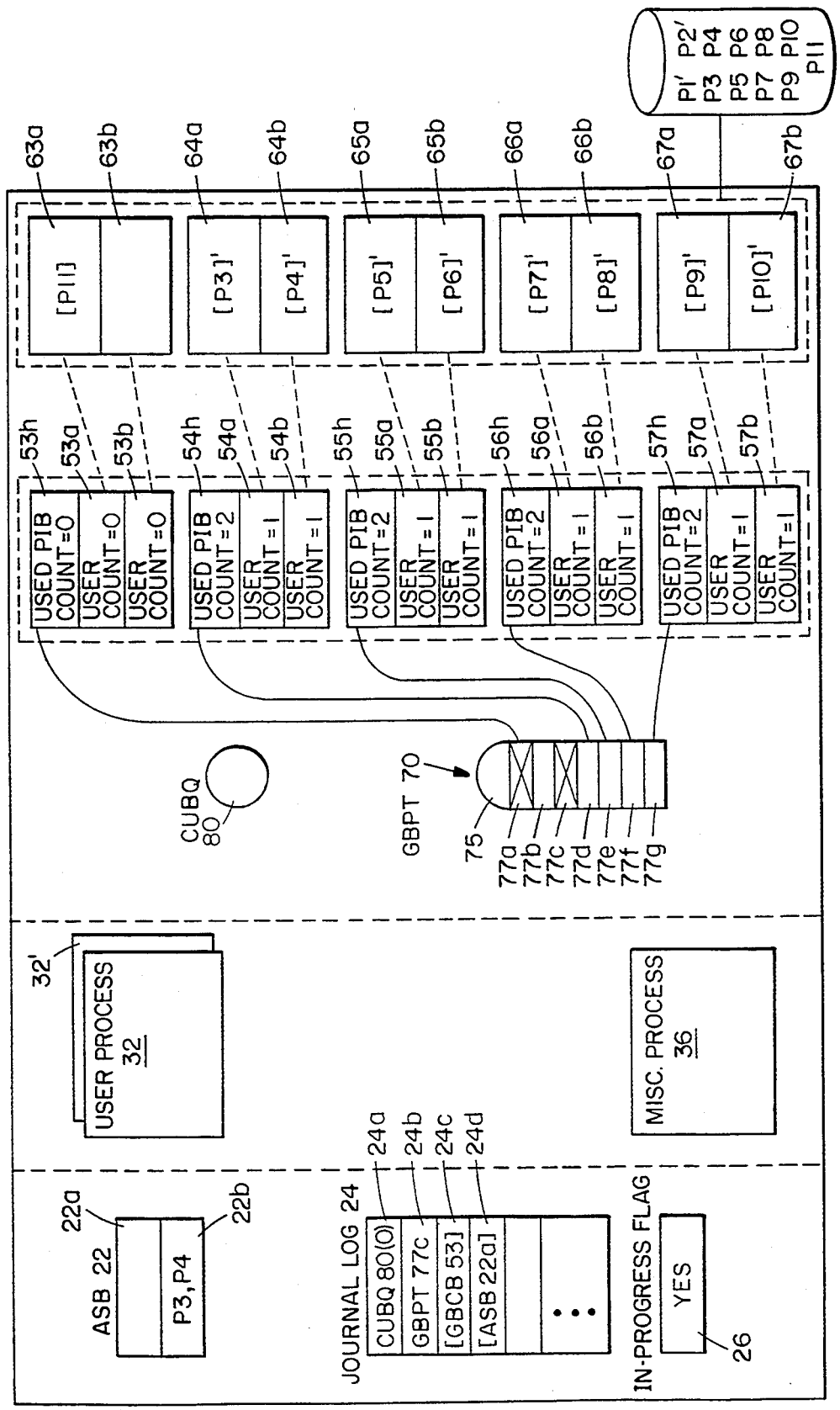

FIG. 13k illustrates the reading of the target page P11 into the global buffer 63. The user process 32 is shown inserting 426 the Global Buffer Control Block 53 into the target buffer slot 77a queue. Because the desired page P11 is now in the global buffer pool 60, processing continues to bring the page P11 into the user process' 32 allocate set.

Figure 13M:
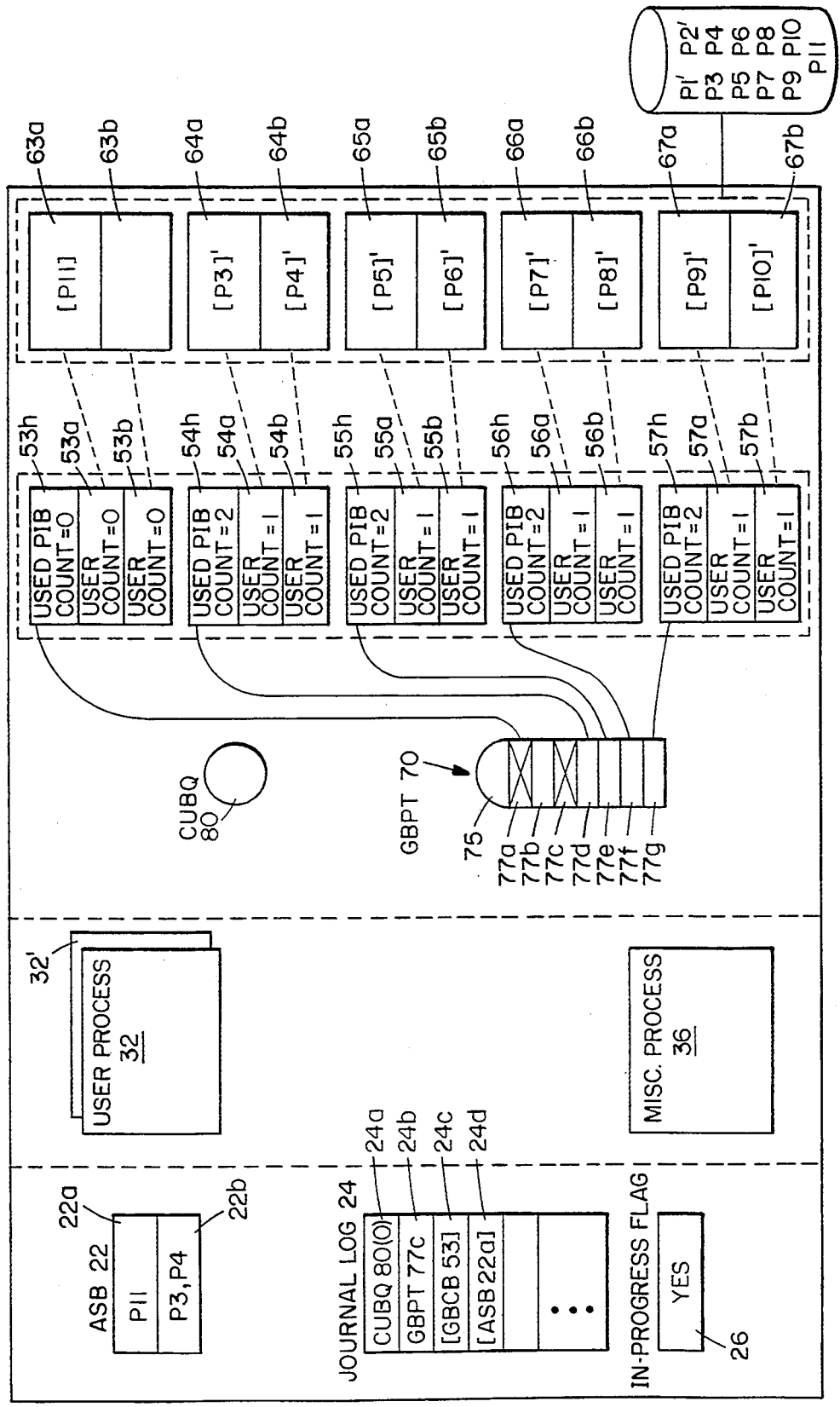
Figure 13N:
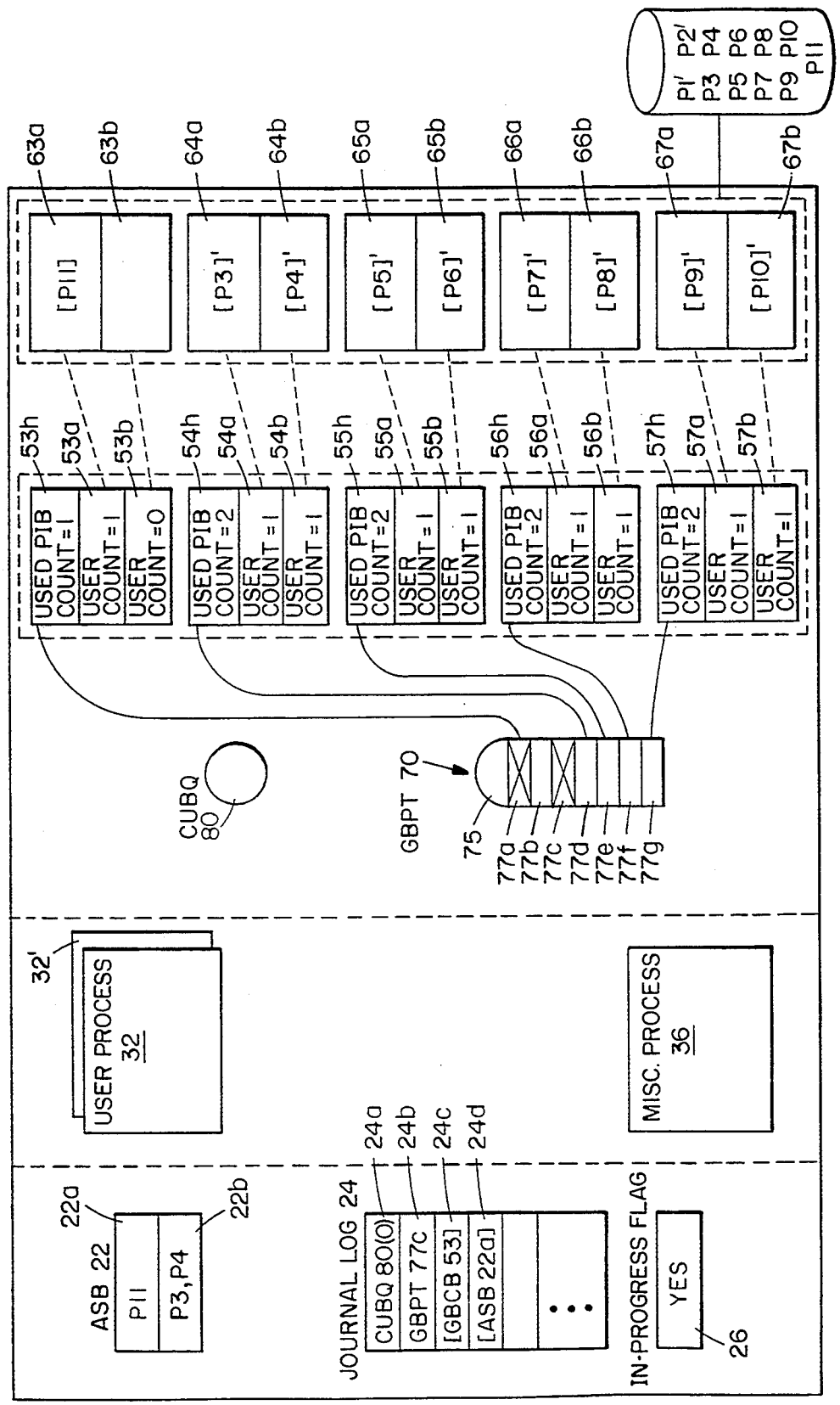

The bringing of the page P11 into the allocate set is similar to the steps described with respect to FIG. 8. However, because a victim Global Buffer Control Block 53 had to be selected, the atomic modification transaction has already been started and the Global Buffer Control Block 53 has been journaled. FIG. 13l illustrates the journaling 434 of the empty Allocate Set Block entry 22a to be used for the Global Buffer Control Block 53 into journal block 24d. Note that the Allocate Set Block entry 22a is physically logged. FIG. 13m illustrates the actual addition 436 of the page P11 to the allocate set. The Allocate Set Block entry 22a is marked to indicate that the page P11 is being used by the user process 32. As indicated in FIG. 13n, the used page-in-buffer count field 5h6 and the user count field 5a5 are incremented 438 from 0 to 1.

Figure 13O:
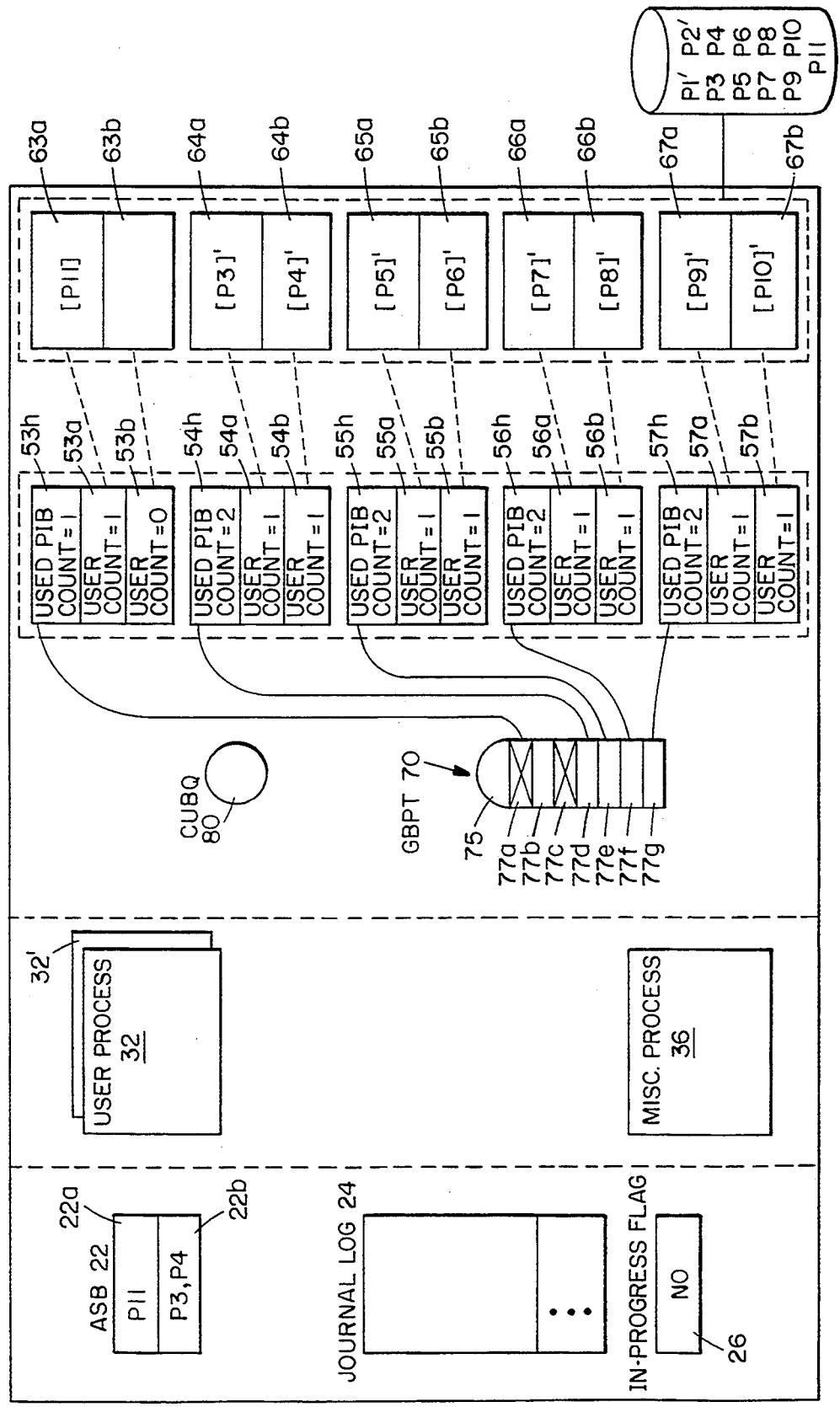
Figure 14:
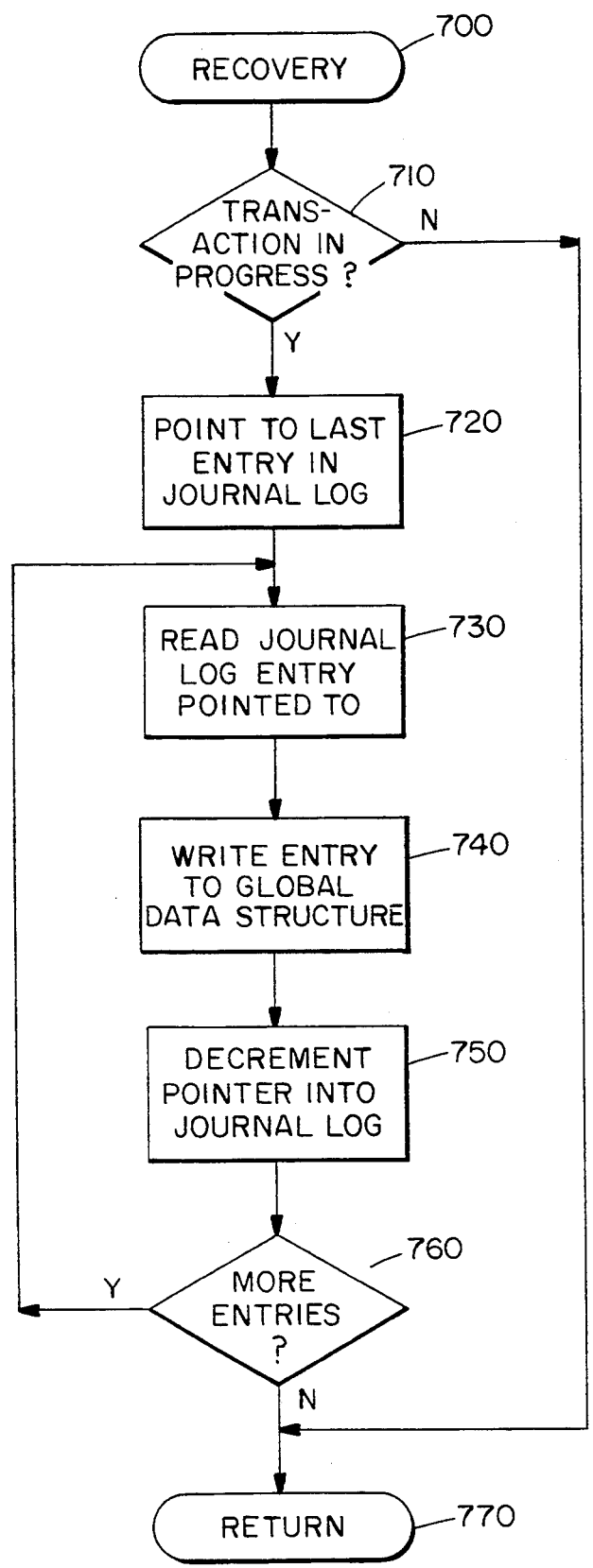
FIG. 14 is a flow chart of the global data recovery portion of the present invention.

Finally, the atomic modification transaction is ended 440 as shown in FIG. 13o. The transaction in-progress flag 26 is set to "No" and the journal log 24 is initialized. If the user process 32 terminates prematurely during a global data update, a recovery process 34 automatically starts. One recovery process 34 starts per failed user process 32. The recovery process 34 rolls back any changes to the control data structure 40 that were not completed atomically with other changes. The recovery process 34 identifies the user process 32 that terminated and accesses the associated data in the process specific global structure 20. A flow chart of the recovery processing 700 is shown in FIG. 14.

The first step of the recovery routine 700 is to check 710 the transaction in-progress flag 26a associated with the user process 32 that terminated abnormally. If the flag 26a does not indicate that the user process 32 was performing a global data transaction, then the recovery process terminates successfully 770. If the flag 26a indicates that the user process 32 was performing a global data transaction, then recovery processing continues.

The recovery process 34 loops backward from the last entry in the journal log 24a using the addresses supplied by the pointer 28 to the next available journal block and the previous journal block 24h1. Upon entering the loop, the recovery process 34 points to the last entry 720 in the journal log 24a. The recovery process 34 reads 730 the journal block 24n. The journal block 24n is then written 740 to the control data structure.

The recovery process 34 next points to the next previous entry 750 in the journal log. This processing continues until all journal block entries are restored 760 to the control data structure.

Those skilled in the art will know, or be able to ascertain using no more than routine experimentation, many equivalents to the specific embodiments of the invention described herein.

For example, the journal could contain only before-images of actual data being modified instead of an entire memory partition.

These and all other equivalents are intended to be encompassed by the following claims.

We claim:

1. In a computer having multiple processes, nonvolatile storage accessed by the multiple processes, and volatile memory including a buffer memory and a control structure having a plurality of control data items shared by the multiple processes for local access to data partitions retrieved from nonvolatile storage, the buffer memory having a state represented by the control structure, a method of managing a database system comprising the steps of:
   a) from a process, initiating an atomic modification transaction to modify a select control data item;
   b) in response to the initiated atomic modification transaction, storing in the volatile memory an image of the select control data item and maintaining the stored image until completion of the atomic modification transaction;
   c) modifying the select control data item; and
   d) in response to a termination of the process during the atomic modification transaction, returning the select control data item to a state determined by the stored images so as to maintain consistency between the control structure and the buffer memory.

2. The method of claim 1 wherein modifying the select control data item comprises the steps of:
   a) indicating the start of the atomic modification transaction using a transaction in-progress flag in global memory;
   b) obtaining locks on the select control data item;
   c) updating the select control data item;
   d) indicating the end of the atomic modification transaction using the transaction in-progress flag; and
   e) unlocking the select control data item.

3. The method of claim 1 wherein storing images comprises writing a before-image of the select control data item as a journal block to a journal log associated with the process, the journal log located in global memory.

4. The method of claim 1 wherein returning the control data item comprises the steps of:
   a) detecting a failure of the process during the atomic modification transaction;
   b) reading the stored images from a journal log associated with the process, the journal log located in global memory; and
   c) writing the stored images to the select control data item.

5. The method of claim 4 wherein reading the stored images comprises reading the images in reverse order of the order of storage of the images.

6. A database management system having multiple processes, nonvolatile storage accessed by the multiple processes, and volatile storage including a buffer memory and a control structure having a plurality of control data items shared by the processes for local access to data partitions retrieved from nonvolatile storage, the buffer memory having a state represented by the control structure, the system comprising:
   a) a user process to initiate an atomic modification transaction to modify a select control data item;
   b) a management mechanism to store in volatile storage an image of the select control data item prior to the atomic modification transaction, the image remaining stored until completion of the atomic modification transaction; and
   c) a recovery mechanism to restore the select control data item to a state determined by the stored images so as to maintain consistency between the control structure and the buffer memory, the recovery mechanism activated in response to a termination of the user process during the atomic modification transaction.

7. The database management system of claim 6 wherein the buffer memory comprises global buffers, each global buffer sized to hold at least one page of data from nonvolatile storage.

8. The database management system of claim 6 wherein the control structure comprises:
   a) a plurality of global buffer control blocks contained in global memory, there being one global buffer control block for a respective global buffer;
   b) a plurality of allocate set blocks contained in global memory, each concurrent user process having access to a respective allocate set block;
   c) an unused buffer queue in global memory, the unused buffer queue pointing to all global buffer control blocks associated with an unused global buffer;
   d) a global buffer page table in global memory, the global buffer page table containing at least one hashed slot; and
   e) each hashed slot of the global buffer page table forming a respective queue, the queue pointing to global buffer control blocks whose global buffers contain pages of data whose page number hashes to the respective hashed slot.

9. The system of claim 8 wherein each allocate set block comprises at least one allocate set entry, each allocate set entry referring to a global buffer being accessed by the respective process.

10. The system of claim 9 wherein the number of allocate set entries for each process is limited to a predetermined number.

11. The system of claim 10 wherein the number of global buffers at least equals the sum of all allocate set entry sizes of all processes.

12. The database management system of claim 6 wherein the management mechanism comprises a plurality of journal logs in a global memory for maintaining a before-image of the control data item, each journal log associated with and accessed by a respective concurrent process.

13. The system of claim 12 wherein the journal log stores before-images of the control data item being updated by multiple processes.

14. The system of claim 13 wherein each journal block of the journal log is identified by and associated with a respective process.

15. The database management system of claim 6 wherein the recovery mechanism comprises at least one recovery process for restoring the consistency of the control structures after a premature termination of a user process, the recovery process having access to a journal log written by the terminated user process.

16. In a concurrent user computer having a control structure with control data items in a global memory shared by all users, an atomic system for updating the control data items comprising:
  a) at least one journal log in global memory, each journal log sized to contain a plurality of journal blocks,;
  b) at least one journal block having stored therein a before-image of a select control data item being updated by a user process; and
  c) a recovery process for restoring the state of the control structure in response to a user process failure, the recovery process using the before-image of the control data item stored in the respective journal blocks of the journal log.

17. In a computer having volatile memory, a system for performing atomic updates of data in volatile memory, comprising:
  a) at least one user process for reading data from memory, writing a before-image of the data to a journal log in memory, modifying the data, and writing the modified data back to memory;
  b) an in-progress indicator to indicate that the user process is modifying data from memory and that the user process has not completed writing modified data back into memory,
  c) a recovery process for reading the before-image data from the journal log of a user process and writing the journal data to memory based on the in-progress indicator.

18. The system of claim 17 wherein the recovery process executes when the user process terminates.

19. The system of claim 18 wherein the termination of the user process is abnormal.

20. A database management system in a computer having multiple processes and volatile memory accessible by the multiple processes, the system comprising:
  a nonvolatile storage medium having stored therein a database having database data, the database maintained so as to have consistent database data;
  a plurality of global buffers in memory having stored therein database data from the database;
  a control structure in memory having a plurality of control data items shared by the processes for local access to the database data stored in the global buffers, the control data items being modified during an atomic modification transaction by a user process;
  a recovery structure in memory to record a state of the control structure at the beginning of the atomic modification transaction; and
  a recovery mechanism executed in response to a termination of the user process during the atomic modification transaction, the recovery mechanism accessing the recovery structure and therefrom maintaining consistency between the control structure and the global buffers.

* * * * *